US011915011B2

(12) United States Patent
Prem et al.

(10) Patent No.: US 11,915,011 B2
(45) Date of Patent: Feb. 27, 2024

(54) SYSTEMS AND METHODS OF DISTRIBUTED PROCESSING

(71) Applicant: NASDAQ, INC., New York, NY (US)

(72) Inventors: Kyle Prem, Croton-on-Hudson, NY (US); John Vaccaro, New York, NY (US); Hemant Thombre, Warren, NJ (US)

(73) Assignee: NASDAQ, INC., New York, NY (US)

( * ) Notice: Subject to any disclaimer, the term of this patent is extended or adjusted under 35 U.S.C. 154(b) by 116 days.

(21) Appl. No.: 17/390,781

(22) Filed: Jul. 30, 2021

(65) Prior Publication Data

US 2023/0033983 A1 Feb. 2, 2023

(51) Int. Cl.
| | | |
|---|---|---|
| *G06F 9/00* | (2006.01) | |
| *G06F 9/4401* | (2018.01) | |
| *G06F 9/50* | (2006.01) | |
| *G06F 9/38* | (2018.01) | |
| *G06F 9/46* | (2006.01) | |

(52) U.S. Cl.
CPC .......... *G06F 9/4418* (2013.01); *G06F 9/3836* (2013.01); *G06F 9/466* (2013.01); *G06F 9/5044* (2013.01)

(58) Field of Classification Search
CPC ...... G06F 9/4418; G06F 9/3836; G06F 9/466; G06F 9/5044; G06F 9/485; G06Q 10/0631; G06Q 30/06; G06Q 40/04; G06Q 50/32; G06Q 2220/00
See application file for complete search history.

(56) References Cited

U.S. PATENT DOCUMENTS

| | | | |
|---|---|---|---|
| 9,712,606 B2 | 7/2017 | Färnlöf et al. | |
| 9,996,879 B2 | 6/2018 | Djurdjevic et al. | |
| 10,049,404 B2 | 8/2018 | Weiss et al. | |
| 10,127,615 B1 | 11/2018 | Givot | |
| 10,922,751 B2 * | 2/2021 | Golubovsky | G06Q 40/04 |
| 11,151,122 B2 * | 10/2021 | Sato | G06F 16/2379 |
| 11,288,272 B2 * | 3/2022 | Lee | G06F 9/485 |
| 11,461,130 B2 * | 10/2022 | Koupy | G06F 9/4498 |
| 11,500,845 B2 * | 11/2022 | Tian | H04L 9/3236 |
| 2008/0021994 A1 | 1/2008 | Grelewicz et al. | |

(Continued)

FOREIGN PATENT DOCUMENTS

| | | | | |
|---|---|---|---|---|
| CN | 112527473 A | * | 3/2021 | ............. G06F 9/466 |
| TW | 202109513 A | * | 3/2021 | ........... G06F 9/4418 |

OTHER PUBLICATIONS

Securities and Exchange Commission (Release No. 34-93245; File No. SR-NASDAQ-2021-075), Self-Regulatory Organizations; The Nasdaq Stock Market LLC; Notice of Filing and Immediate Effectiveness of Proposed Rule Change to Amend the Discretion Attribute, at Equity 4, Rule 4703, in Light of Planned Changes to the System, 19 pages, Oct. 4, 2021.

(Continued)

*Primary Examiner* — Xuxing Chen
(74) *Attorney, Agent, or Firm* — Nixon & Vanderhye P.C.

(57) ABSTRACT

In some embodiments a distributed computing system is provided that includes a plurality of different feature modules and a matching engine. The different feature modules each provide different processing for handling parent requests and submitting, to the matching engine, commands for child data transaction requests that are associated with the parent request.

20 Claims, 17 Drawing Sheets

(56) References Cited

U.S. PATENT DOCUMENTS

| | | |
|---|---|---|
| 2012/0123925 A1 | 5/2012 | Daley et al. |
| 2014/0095371 A1 | 4/2014 | Galinov et al. |
| 2015/0066727 A1 | 3/2015 | Wepsic et al. |
| 2015/0073967 A1 | 3/2015 | Katsuyama et al. |
| 2015/0127519 A1 | 5/2015 | Melton |
| 2015/0302441 A1 | 10/2015 | Katsuyama et al. |
| 2015/0341422 A1 | 11/2015 | Färnlöf et al. |
| 2017/0004563 A1 | 1/2017 | Noviello et al. |
| 2017/0046783 A1 | 2/2017 | Hosman et al. |
| 2017/0103460 A1 | 4/2017 | Golubovsky et al. |
| 2018/0276751 A1 | 9/2018 | Kavanagh et al. |
| 2018/0349999 A1* | 12/2018 | Brandon ............... G06F 40/205 |
| 2020/0394710 A1* | 12/2020 | Konduru ............... G06Q 40/04 |

OTHER PUBLICATIONS

Securities and Exchange Commission (Release No. 34-92180; File No. SR-NASDAQ-2021-044), Self-Regulatory Organizations; The Nasdaq Stock Market LLC; Notice of Filing and Immediate Effectiveness of Proposed Rule Change to Amend Equity 4, Rules 4702 and 4703 in Light of Planned Changes to the System, 18 pages, Jun. 15, 2021.

Securities and Exchange Commission (Release No. 34-90793; File No. SR-NASDAQ-2020-090), Self-Regulatory Organizations; The Nasdaq Stock Market LLC; Notice of Filing of Proposed Rule Change to Amend Equity 4, Section 4703, seven pages, Dec. 23, 2020.

Securities and Exchange Commission (Release No. 34-91109; File No. SR-NASDAQ-2020-090), Self-Regulatory Organizations; The Nasdaq Stock Market LLC; Order Approving a Proposed Rule Change to Amend the Exchange's Rules at Equity 4, Section 4703(h) Relating to Reserve Orders, four pages, Feb. 11, 2021.

Securities and Exchange Commission (Release No. 34-90389; File No. SR- NASDAQ-2020-071), Self-Regulatory Organizations; The Nasdaq Stock Market LLC; Notice of Filing and Immediate Effectiveness of Proposed Rule Change to Amend Rules 4613, 4702, and 4703, 19 pages, Nov. 10, 2020.

RASHport$^{SM}$ Specification, Version 1.1, 25 pages, Updated Jul. 29, 2021.

O*U*C*H Specification, Version 4.2, 23 pages, Updated Jul. 27, 2021.

INET FIX Interface Specification, Version 4.2, 31 pages, Updated Jul. 29, 2021.

Securities and Exchange Commission, Washington, D.C., Form 19b-4, File No. SR-NASDAQ-2015-024, 247 pages, Mar. 16, 2015.

NASDAQ Global Trading and Market Services, Order Entry Reference Guide, two pages, 2018.

NASDAQ Global Trading and Market Services, Order Types and Modifiers, Delivering a Comprehensive Suite of Innovative Order Types & Modifiers, three pages, 2017.

NASDAQ Global Trading and Market Services, Trade-Now and Midpoint Trade-Now, two pages, 2018.

NASDAQ Fix, NasdaqTrader.com, https://www.nasdaqtrader.com/Trader.aspx?id=FIX, retrieved Feb. 16, 2022, two pages.

NASDAQ Ouch, NasdaqTrader.com, https://www.nasdaqtrader.com/Trader.aspx?id=OUCH, retrieved Feb. 16, 2022, two pages.

NASDAQ RASHport, NasdaqTrader.com https://www.nasdaqtrader.com/Trader.aspx?id=RASH, retrieved Feb. 16, 2022, two pages.

NASDAQ Global Trading and Market Services, Market Maker PEG Order, two pages, 2018.

NASDAQ Global Trading and Market Services, Midpoint Liquidity, two pages, 2018.

Loveless Jacob, "Barbarians at the Gateways, High-frequency Trading and Exchange Technology," ACM Queue, 13 pages, 2013.

Jericevich Ivan et al., "CoinTossX: An open-source low-latency high-throughput matching engine", arXiv:2102.10925, 21 pages, Feb. 23, 2021.

Mavroudis Vasilios et al. "Libra: Fair Order-Matching for Electronic Financial Exchanges", arXiv:1910.00321, 13 pages, Oct. 1, 2019.

Office Action for U.S. Appl. No. 17/390,586, six pages, dated Dec. 15, 2021.

Office Action for U.S. Appl. No. 17/390,688, six pages, dated Dec. 15, 2021.

* cited by examiner

SYSTEMS AND METHODS OF DISTRIBUTED PROCESSING

CROSS REFERENCE(S) TO RELATED APPLICATION(S)

This application is one of six related applications, all filed on even date herewith; this application incorporates the entire contents of each of the other five related applications. The related applications are:

U.S. patent application Ser. No. 17/390,055; U.S. patent application Ser. No. 17/390,586; U.S. patent application Ser. No. 17/390,627; U.S. patent application Ser. No. 17/390,688; U.S. patent application Ser. No. 17/390,754; and U.S. patent application Ser. No. 17/390,781.

TECHNICAL OVERVIEW

The technology described herein relates to distributed computing systems.

INTRODUCTION

In the area of computer technology, distributed computing is an important area of interest. Some computing tasks can take one processor or computer too long to complete. Distributed computing techniques seek to address these and other issues by allowing computers to answer or process data that would otherwise be too large (or take too long) to process. For example, rather than have 1 computer process data in a 100 years, 1000 computers (or 1000 processes working on 1000 different computers) can work to process that data in a month or two. Similarly, rather than one computer handling 1000 requests (for example, for accessing data from an online database), many computers can be programmed to handle such requests simultaneously.

Distributed computing can also be helpful in real time-data processing applications by allowing large amounts of data to be processed in a time-efficient manner. For example, systems that involve or relate to traffic information, weather information, electronic market data, operating systems, or internet commerce, as well as other real-time data processes, may be time-bound in some manner.

Accordingly, it will be appreciated that new and improved techniques, systems, and processes are continually sought after—particularly in the area of distributed computing and/or processing and how to apply such techniques within a distributed computing environment.

SUMMARY

In some embodiments, a distributed computing system includes a plurality of computing devices that communicate by using an electronic data network. One or more of the computing devices is responsible for executing a matching engine. Multiple different processing instances are executed across different ones of the plurality of computing devices. Some of the processing instances that are executed are feature processing instances. The distributed computing system handles parent requests that may have at least one data transaction request associated therewith; different ones of the feature processing instances include different functionality for handling different kinds of parent requests and causing data transaction requests to be generated and processed by the matching engine.

In some embodiments, the feature processing instances respond to triggering events that result in cancelation of parent requests and any associated data transaction requests. In some embodiments, only some quantity from at least one of the associated data transaction requests is removed in connection with a cancelation request.

In some embodiments, the different types of feature processing instances may include feature processing instances that handle different types of data transaction requests, such as discretion, different types of pegging, and reserve; additionally, the feature processing instances may include a "parent cancel" feature processing instances and a "late-open" feature processing instances.

In some embodiments, the distributed computing system provides for changing which one of the feature processing instances is an owner of a parent request. In some embodiments, the distributed computing system provides for changing a pending parent request into a data transaction request that is handled by the matching engine and is not associated with a parent request.

In some embodiments, the distributed computing system uses a child sequence number in order to validate requests submitted to the matching engine to create new data transaction requests for parent requests. In some embodiments, the distributed computing system uses a "match now" sequence number in order to validate match now requests submitted from at least one of the feature processing instances. In some embodiments, the distributed computing system uses a quantity value to validate replace requests for pending data transaction requests that are associated with parent requests.

In some embodiments, feature processing instances of the distributed computing system can suspend a parent request. This causes all pending data transaction requests that are associated with the suspended parent requests to be canceled. In some embodiments, one of the feature processing instances may issue a cancelation command for the suspended parent request based on a determination that a period of time has expired.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 1A:
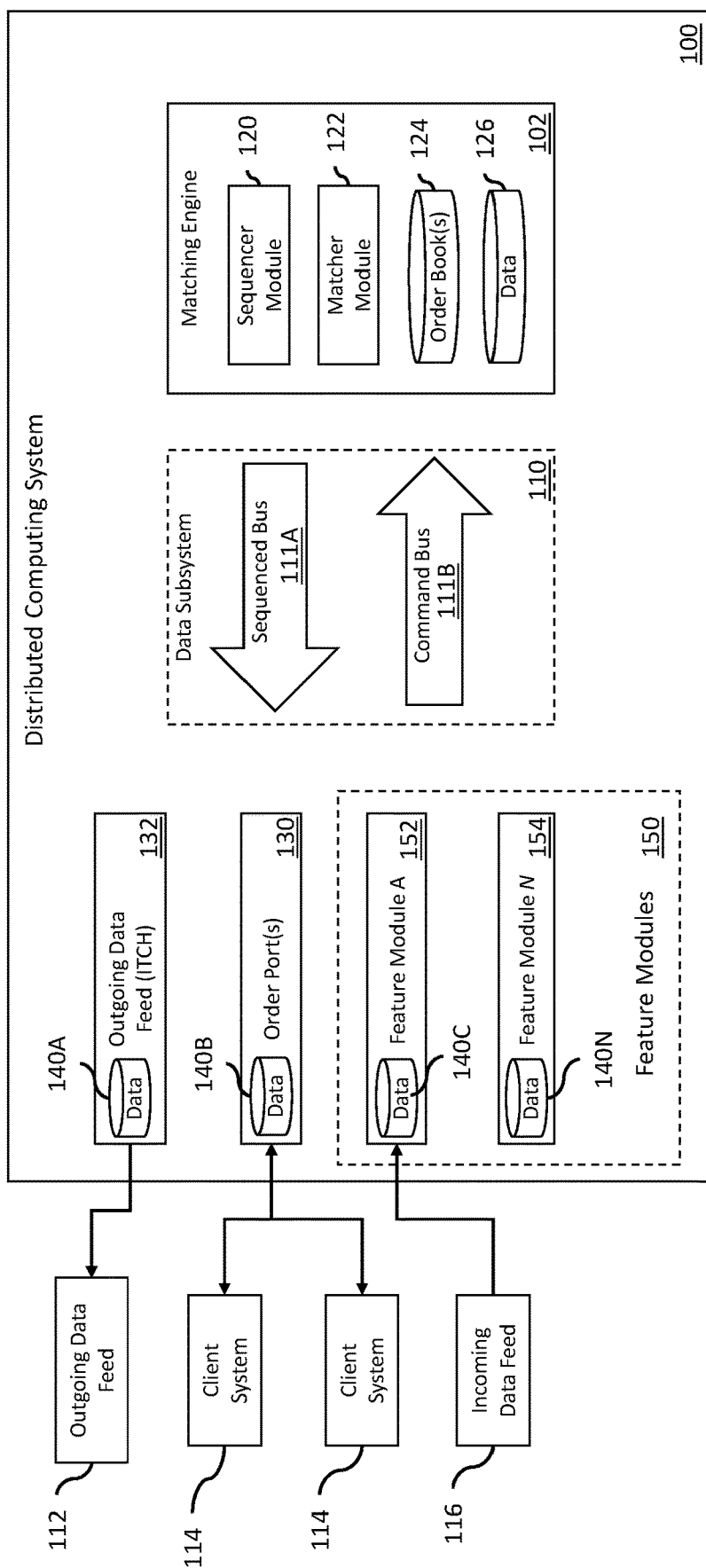
FIG. 1A shows a distributed system architecture according to some embodiments.

Sections are used in this Detailed Description solely in order to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be provided below, the distributed computing system 100 first shown in FIG. 1A is also referenced and described in connection FIG. 1B, FIG. 3, FIG. 4, and others.

1. Overview

Some embodiments described herein relate to distributed computing systems and techniques for implementing distributed processing on such systems. In particular, this specification describes a distributed computing system that includes "feature modules" (which may also be referred to as "feature processing instances"), which are modules that handle various aspects of the distributed computing system's functionality. But before an overview of this distributed computing system is provided, information regarding the manner of operation of distributed computing systems in general will be provided.

Examples of distributed computing systems include telecommunication networks, payment processing systems, industrial control systems, parallel scientific computation systems, distributed databases, blockchain-based smart contracts systems, electronic trading platforms, and others. Many distributed computing systems are configured to process messages that they receive. In particular, many distributed computing systems are configured to receive and process data transaction requests and other types of requests, which specify in some fashion operations for the distributed computing system to perform (or, in some instances, to perform upon the satisfaction of certain conditions). As an example, a parallel scientific computation system may receive a data transaction request that specifies some operations to be performed in parallel; as another example, a distributed database system may receive a data transaction request that specifies a data operation (e.g. the addition, update, or removal of some data) that should be performed on the data store managed by the database system. Processing performed in a distributed computing system is often handled by different modules that are distributed among the computing resources within the overall distributed computing system.

As noted above, one example type of distributed computing system is an electronic trading platform. In many implementations, an electronic trading platform includes (a) one or more modules for receiving data transaction request messages, (b) one or more modules for transmitting data from the electronic trading platform to recipient systems (via e.g., "data feeds" or "electronic data feeds"), and (c) a matching engine, for performing data processing based on the data transaction request messages received by the electronic trading platform.

A data transaction request message received by an electronic trading platform may indicate, for example, a request to enter an order (e.g., an electronic order) to buy or sell a particular asset that is traded on the platform. An electronic trading platform may be configured to handle (i.e., may be programmed to perform operations for) different types of orders, with each type of order having its own associated set of data attributes and expected behaviors. The different types of orders include managed orders such as discretion orders, pegged orders, reserve orders, and others In electronic trading platform implementations, the matching engine is a module within the platform that is programmed to perform, and performs, the matching of orders against each other. For example, if a data transaction request message is received that indicates an order to buy an asset (or some quantity thereof), the matching engine may perform processing to compare the buy order against corresponding/complementary sell orders (e.g., those that are already stored in the platform) to determine whether a match can be made. This processing performed by matching engine to determine whether a match can be made may be referred to as "match processing" or "match operations," or as performing or executing a "matching process," or similar.

In many implementations, a matching engine maintains and/or has access to an order book data structure (which may also be referred to as an "order book," "central limit order book (CLOB)," "CLOB data structure," or similar) to store pending (previously received) orders that are available to match against incoming orders. A separate order book may be used for each asset that is traded on an electronic trading platform. For example, if two different cryptocurrencies are traded on an electronic trading platform, the platform's matching engine will maintain an order book for each of the two cryptocurrencies. An order book is often structured as including two list data structures, with one of the list data structures for the buy orders and the second list data structure for the sell orders; each list in the order book may be referred to as a "side" of the order book, and the order book data structure can be referred to as a "dual-sided" data structure. In many electronic trading platforms where an order book for an asset is used, processing performed by a platform's matching engine may include use of the order book, by e.g. comparing the characteristics of a newly-received order to the characteristics of contra-side orders stored in the order book for the asset to determine if a match can be made.

Electronic trading platforms, like other types of distributed computing systems, can be subject to challenging technical constraints. For example, many electronic trading platforms are simultaneously expected to be very high-throughput (e.g., be able to handle millions of incoming messages per second), very low-latency (e.g., be able to process each incoming message in a tiny fraction of a second), fault tolerant (e.g., be able to continue to operate if a portion of the platform fails), resilient (e.g., be available and operate as expected when expected, even in the face of challenging conditions), and, in some instances, deterministic (e.g., given the same inputs a platform should always produce the same outputs). Additionally, it is often desirable for the software code that defines an electronic trading platform to be maintainable. For example, software code that it is suitably written to be "easy" to repair, extend, and/or be adapted to new requirements can be desirable in such systems. Electronic trading platforms—both individual components (e.g., the matching engine) as well as the overall architecture of the distributed computing system (including, for example, how the components within the system interact with each other)— can thus be designed to address such technical challenges.

In certain examples, a distributed computing system may include multiple processing instances that implement different aspects of the distributed computing system. When the distributed computing system is implemented as an electronic trading platform, processing instances can include a matching engine and different "feature modules" that implement different features of the an electronic trading platform. For example, some feature modules may be responsible communicating with the matching engine and managing particular types of data transaction requests that involve complex and/or elaborate behaviors, such as data transaction requests that indicate discretion orders, peg orders, and reserve orders (the behaviors of which will be described below). Such particular data transaction requests are referred to herein as "managed data transaction requests," "parent requests," "parent data transaction requests," "parent orders," "managed orders," and similar terms.

In the described distributed computing system, a large amount of processing logic may be implemented in the feature modules (which as noted above may also called "feature processing instances"). The feature modules provide input data (in the form of data transaction requests and various commands) to the matching engine to control how the matching engine operates, in order to achieve the behaviors required by the managed data transaction requests. This apportionment of logic and processing load between the feature modules and the matching engine, along with the specific ways in which the feature modules and the matching engine communicate, achieves a number of benefits, including (a) a more straightforward design for the matching engine (which facilitates enhanced matching engine performance), (b) enhanced overall performance of the system (with regards to throughput, latency, fault tolerance, resiliency, and determinism), and (c) maintainability of the system.

Figure 1B:
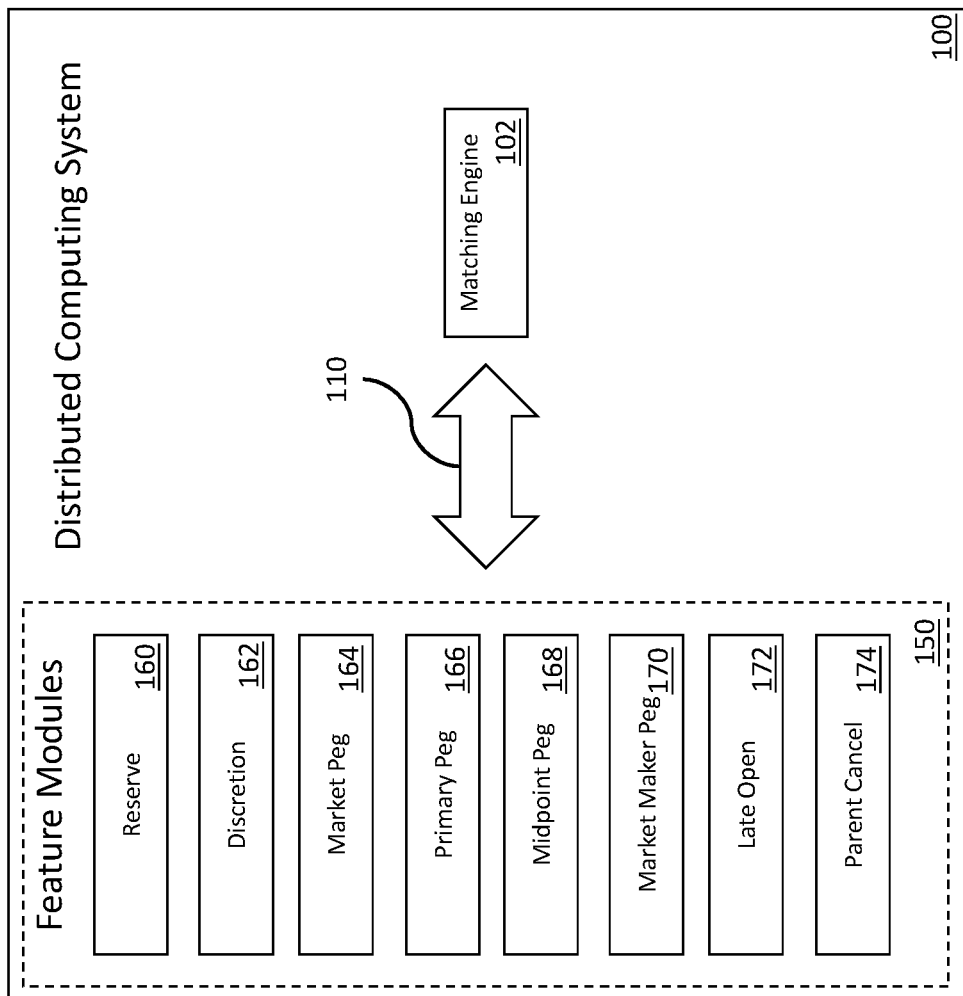
FIG. 1B is an example implementation of the system shown in FIG. 1A and a diagram of different feature modules used in an example electronic trading platform according to some embodiments.
Figure 2A:
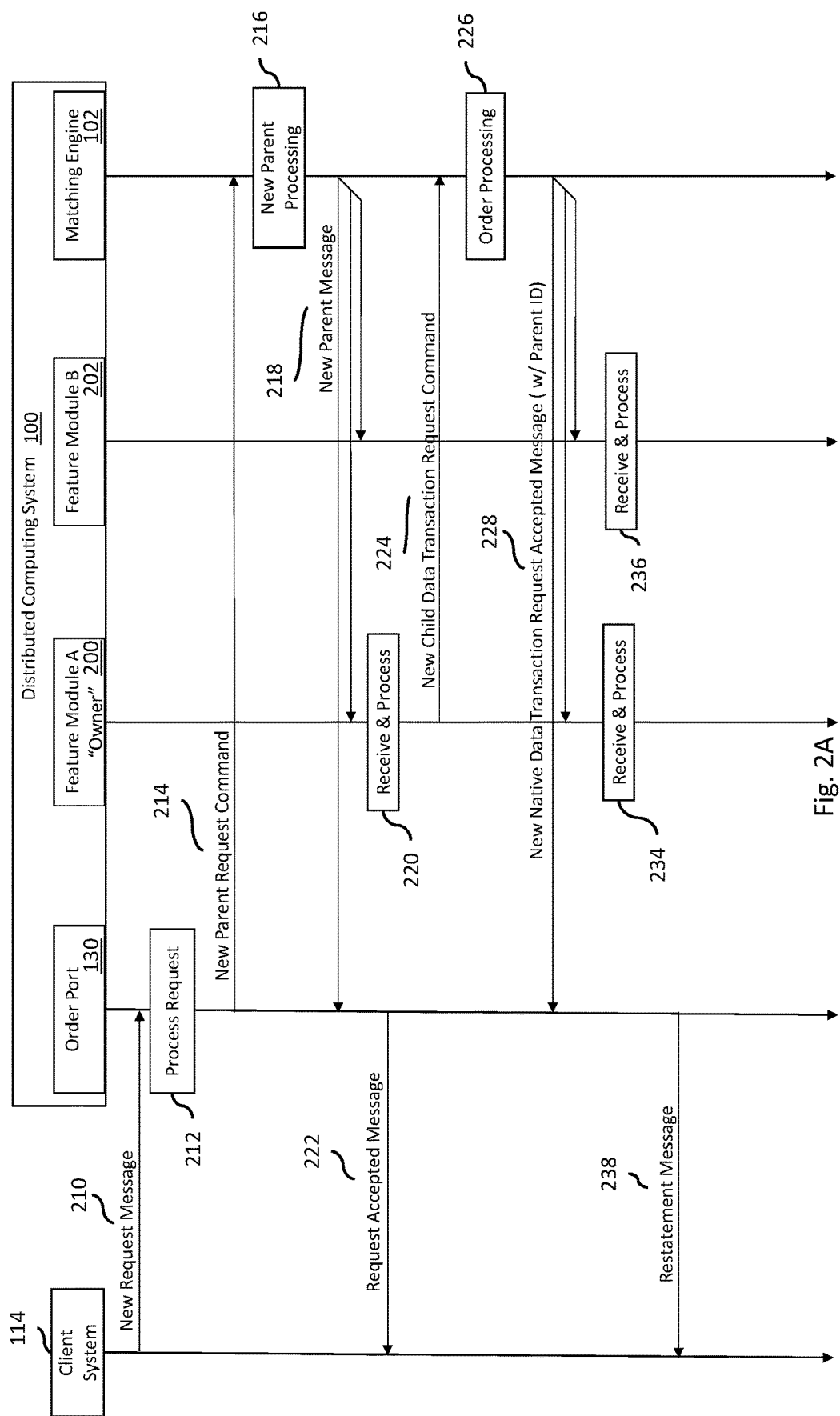
FIG. 2A is a sequence diagram showing an example of how a parent request is implemented within the system shown in FIG. 1B.
Figure 2B:
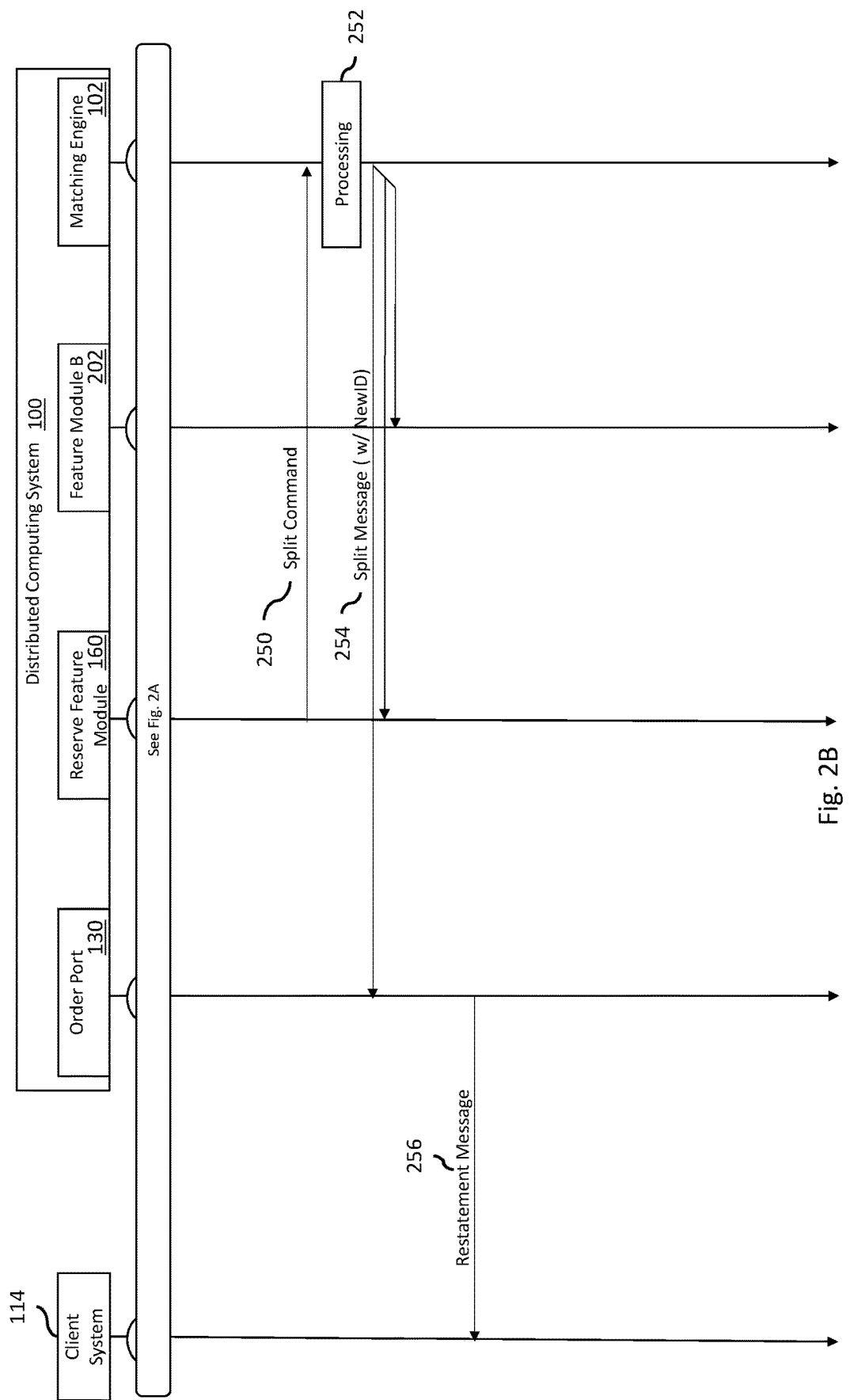
FIG. 2B is a sequence diagram showing example processing that may be performed after the processing shown in FIG. 2A when the parent request includes a reserve feature according to some embodiments.
Figure 3:
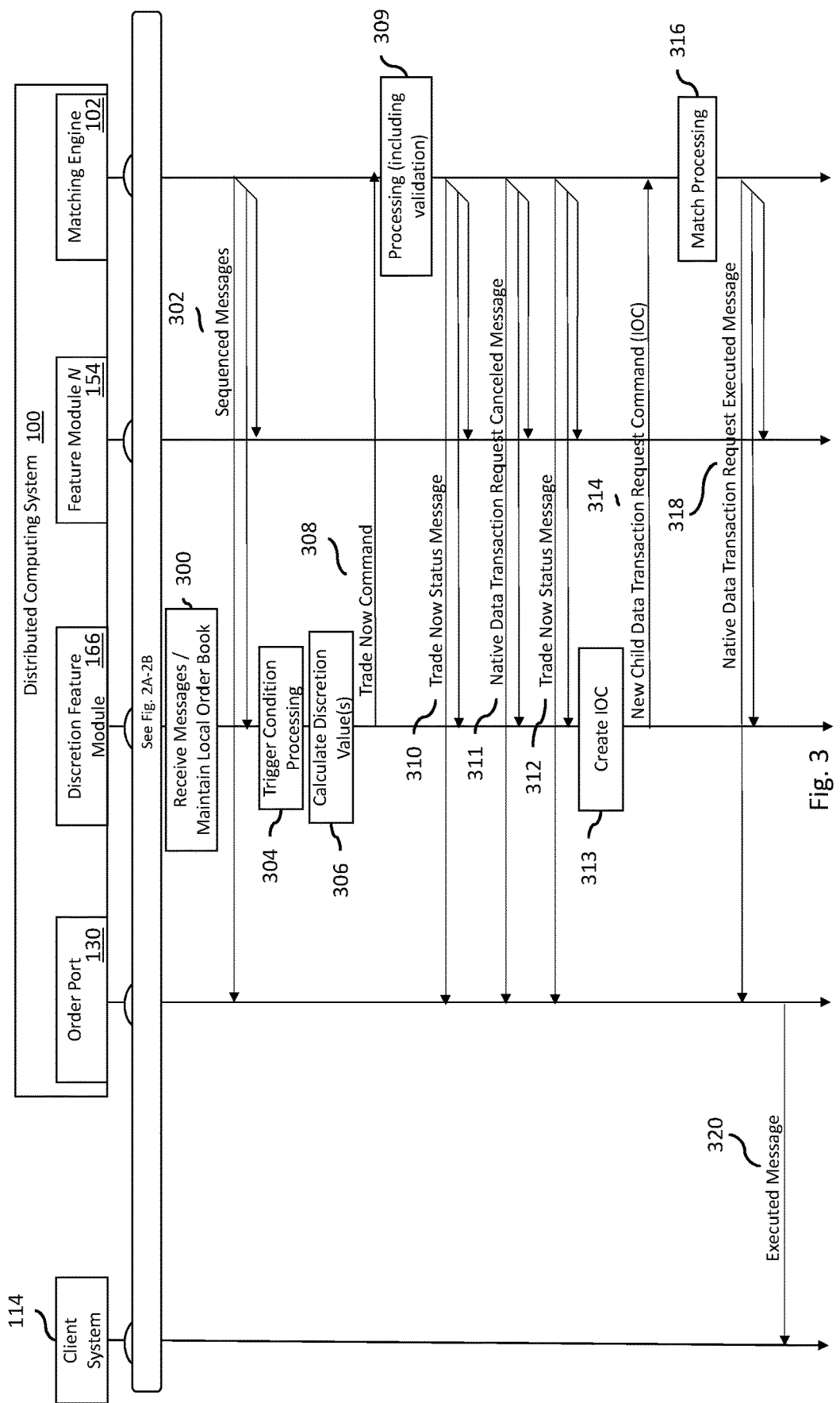
FIG. 3 is a sequence diagram showing an example implementation of how the discretion feature module shown in FIG. 1B may be implemented according to some embodiments.
Figure 4:
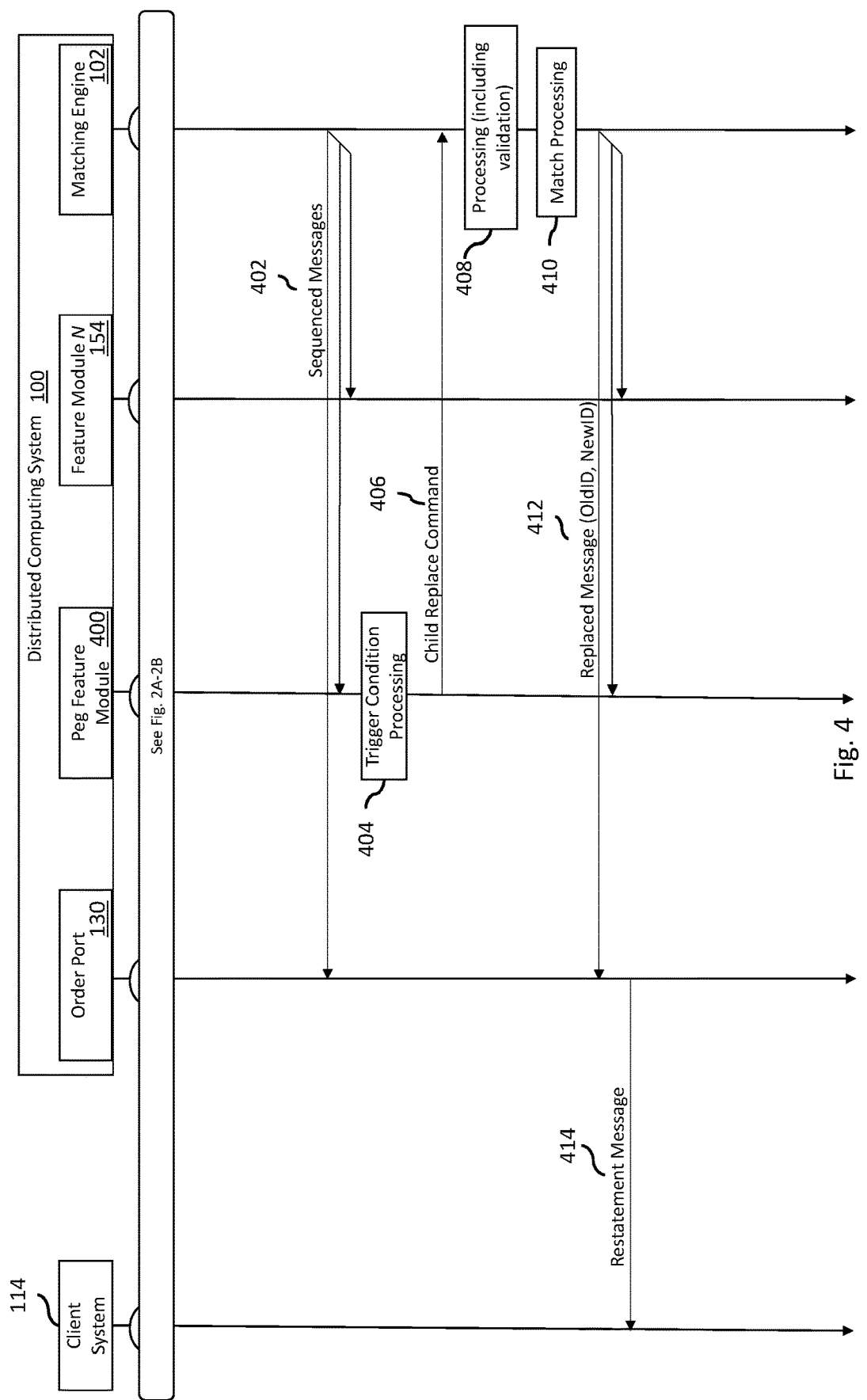
FIG. 4 is a sequence diagram showing an example implementation of pegging used in the peg feature modules shown in FIG. 1B may be implemented according to some embodiments.
Figure 5:
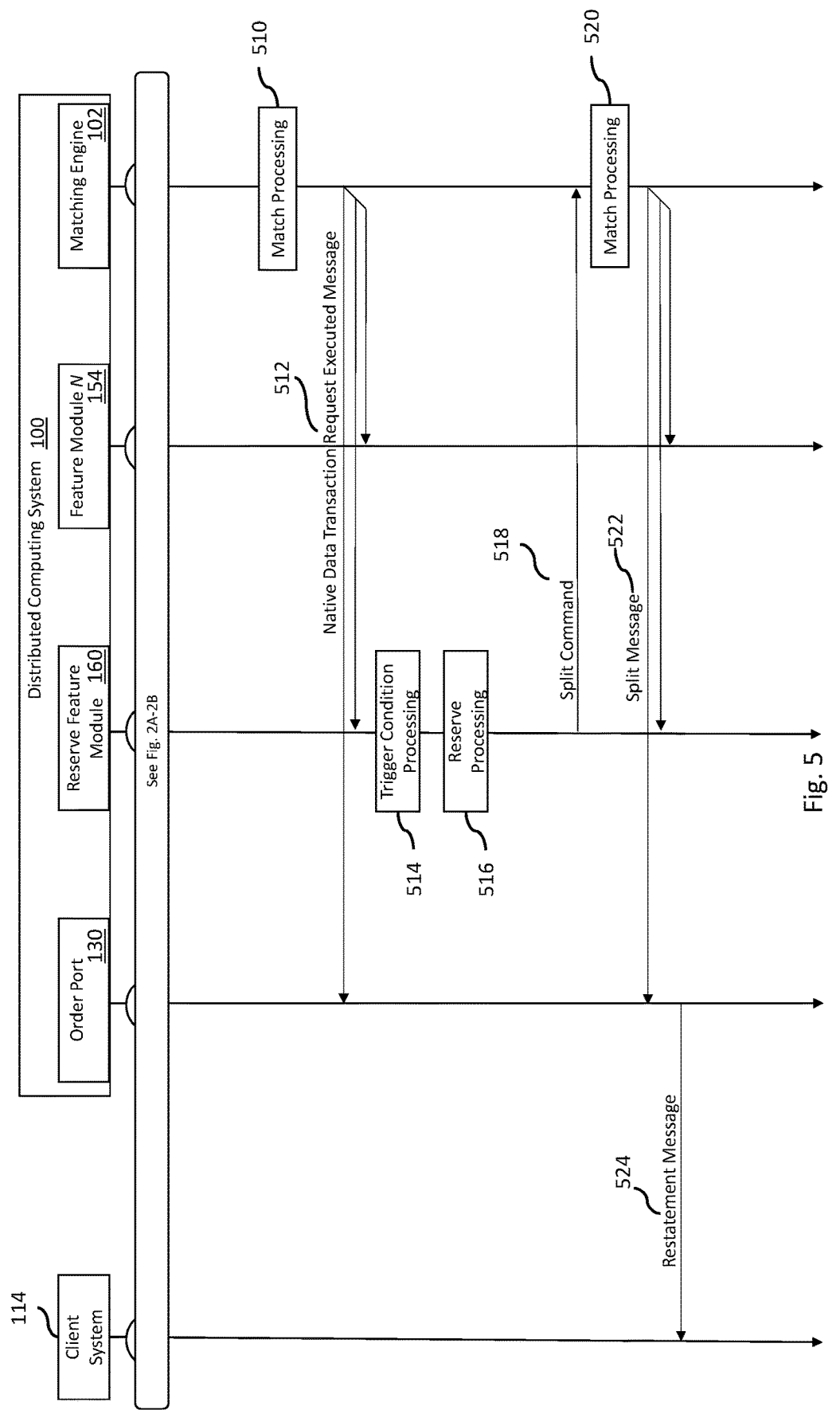
FIG. 5 is a sequence diagram showing an example implementation of how the Reserve Feature Module shown in FIG. 1B may be implemented according to some embodiments.
Figure 6:
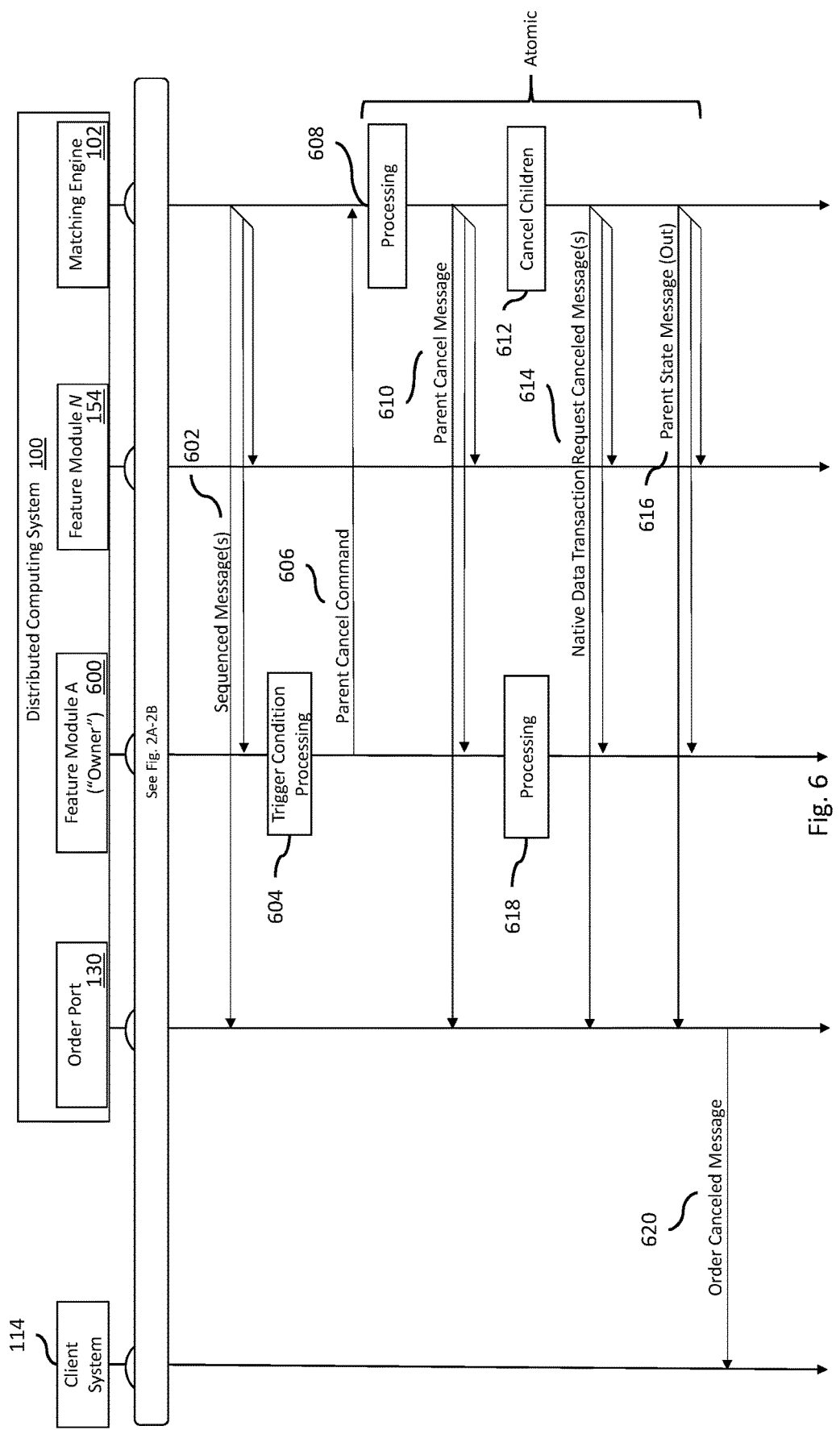
FIGS. 6 and 7 are sequence diagrams showing example implementations of how a parent request can be canceled using the system shown in FIG. 1B according to some embodiments.
Figure 7:
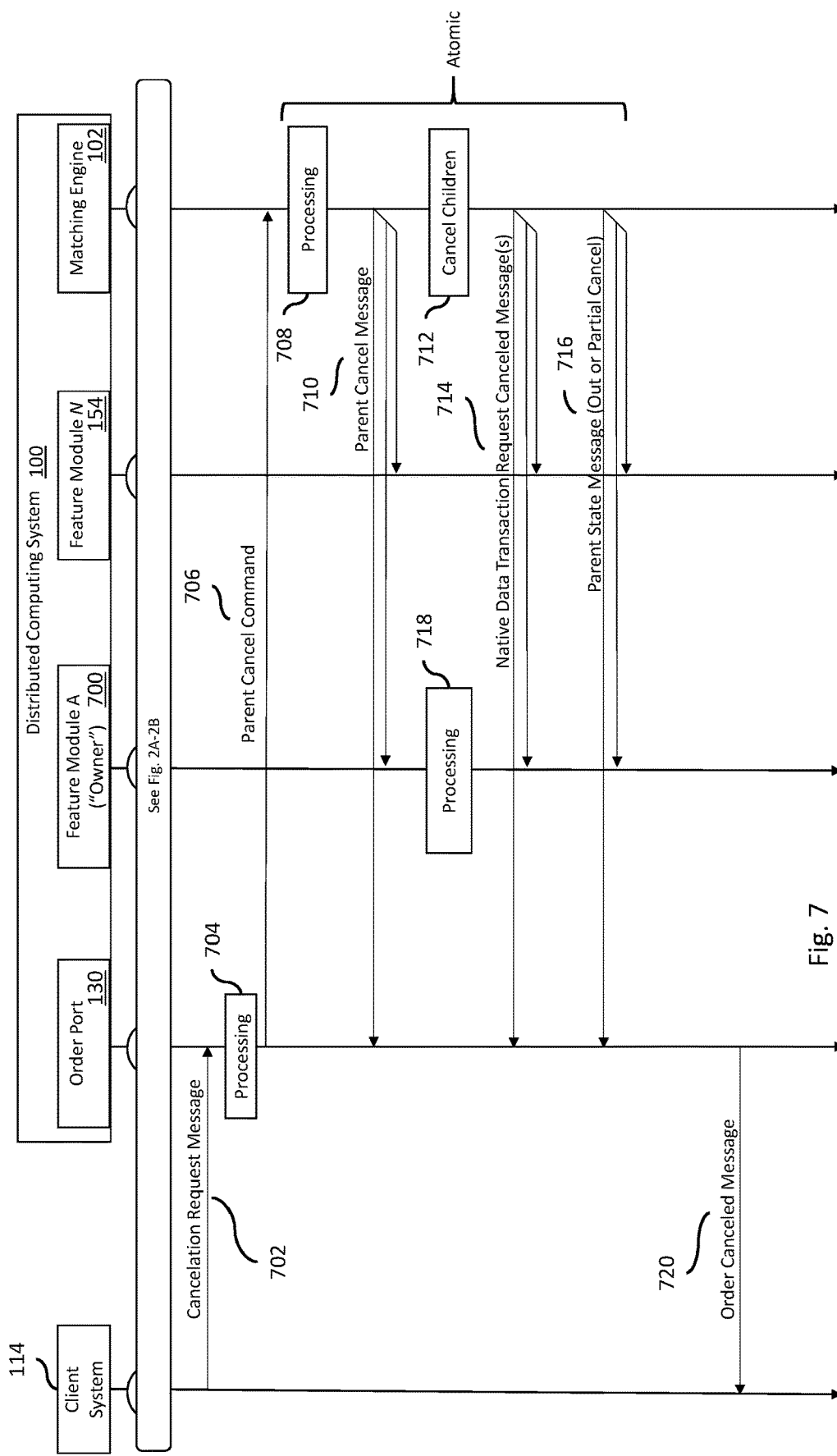
Figure 8:
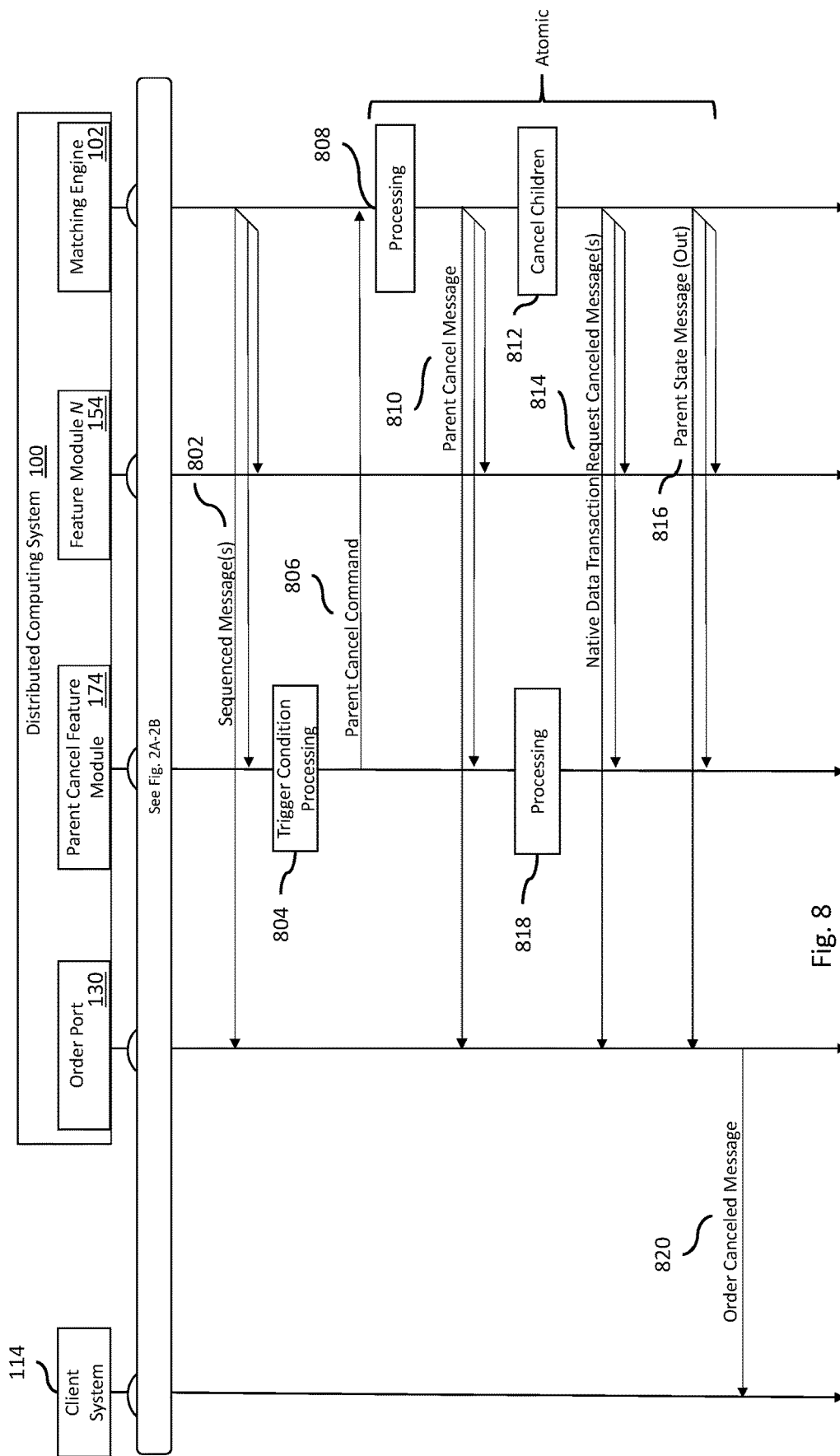
FIG. 8 is a sequence diagram showing an example implementation of how the Parent Cancel Feature Module shown in FIG. 1B may be implemented according to some embodiments.
Figure 9:
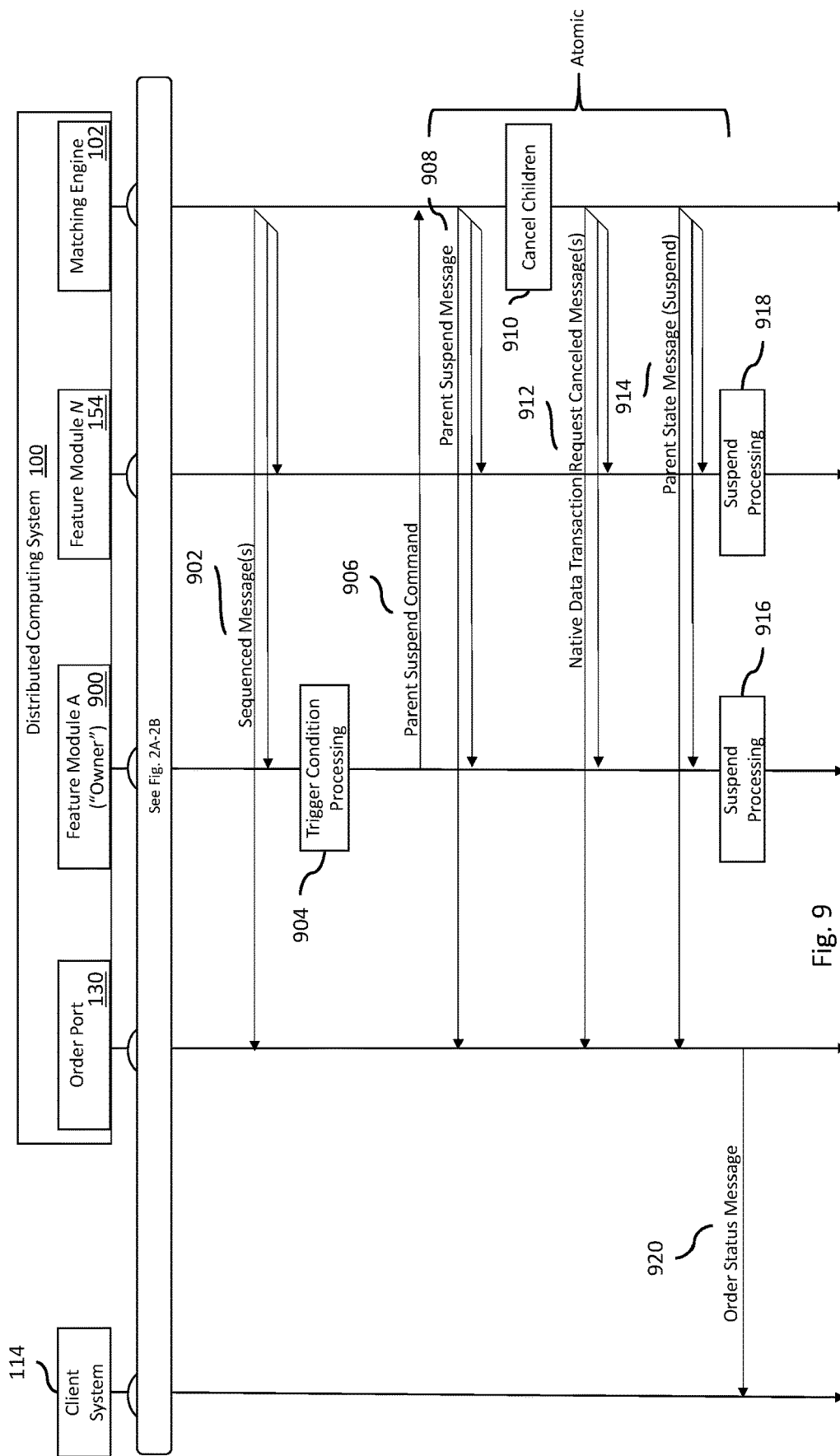
FIG. 9 is a sequence diagram of an example implementation of suspending a parent request using the system shown in FIG. 1B according to some embodiments.
Figure 10:
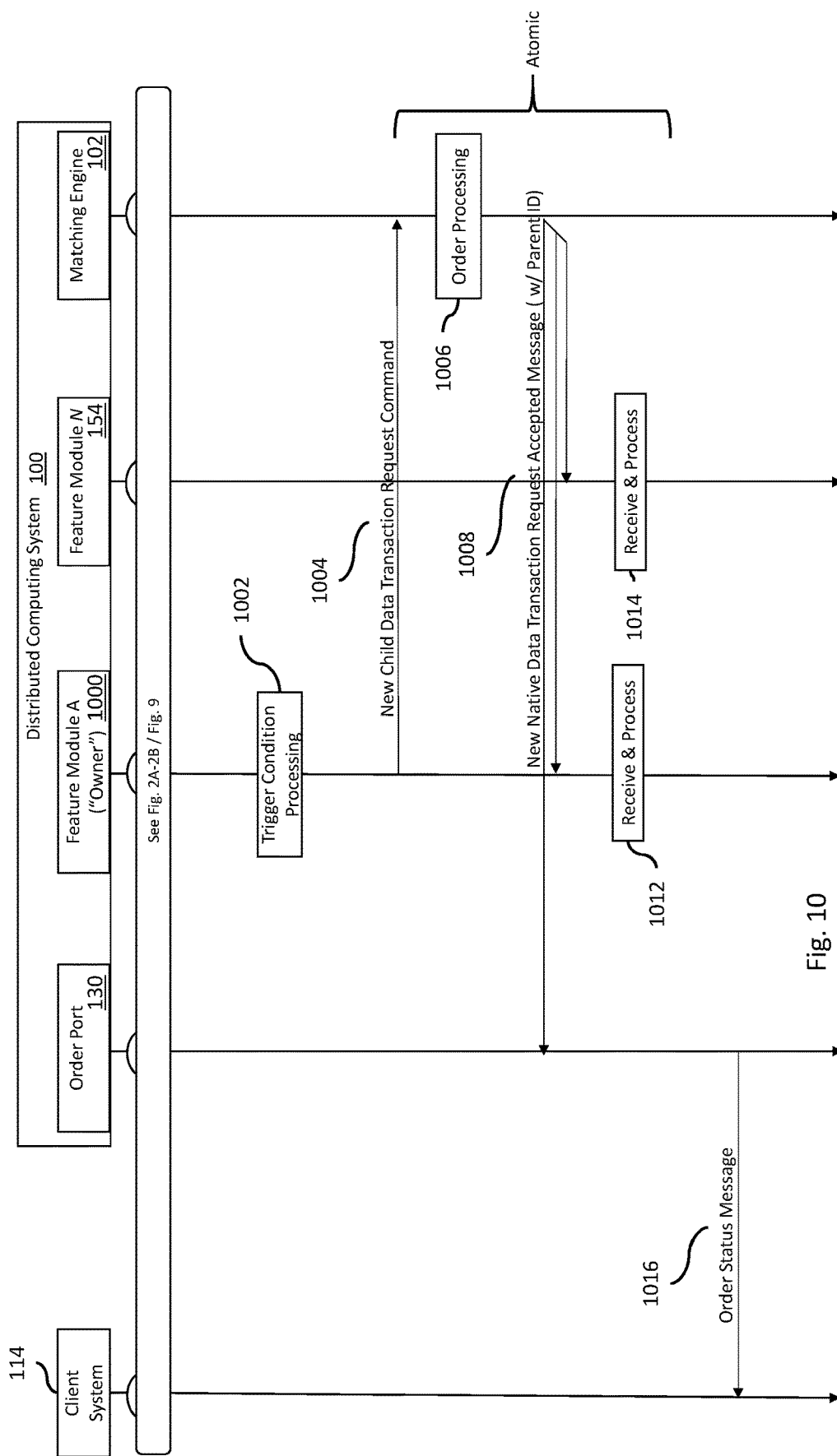
FIG. 10 is a sequence diagram of an example implementation of resuming a parent request that has been suspended using the system shown in FIG. 1B according to some embodiments.
Figure 11:
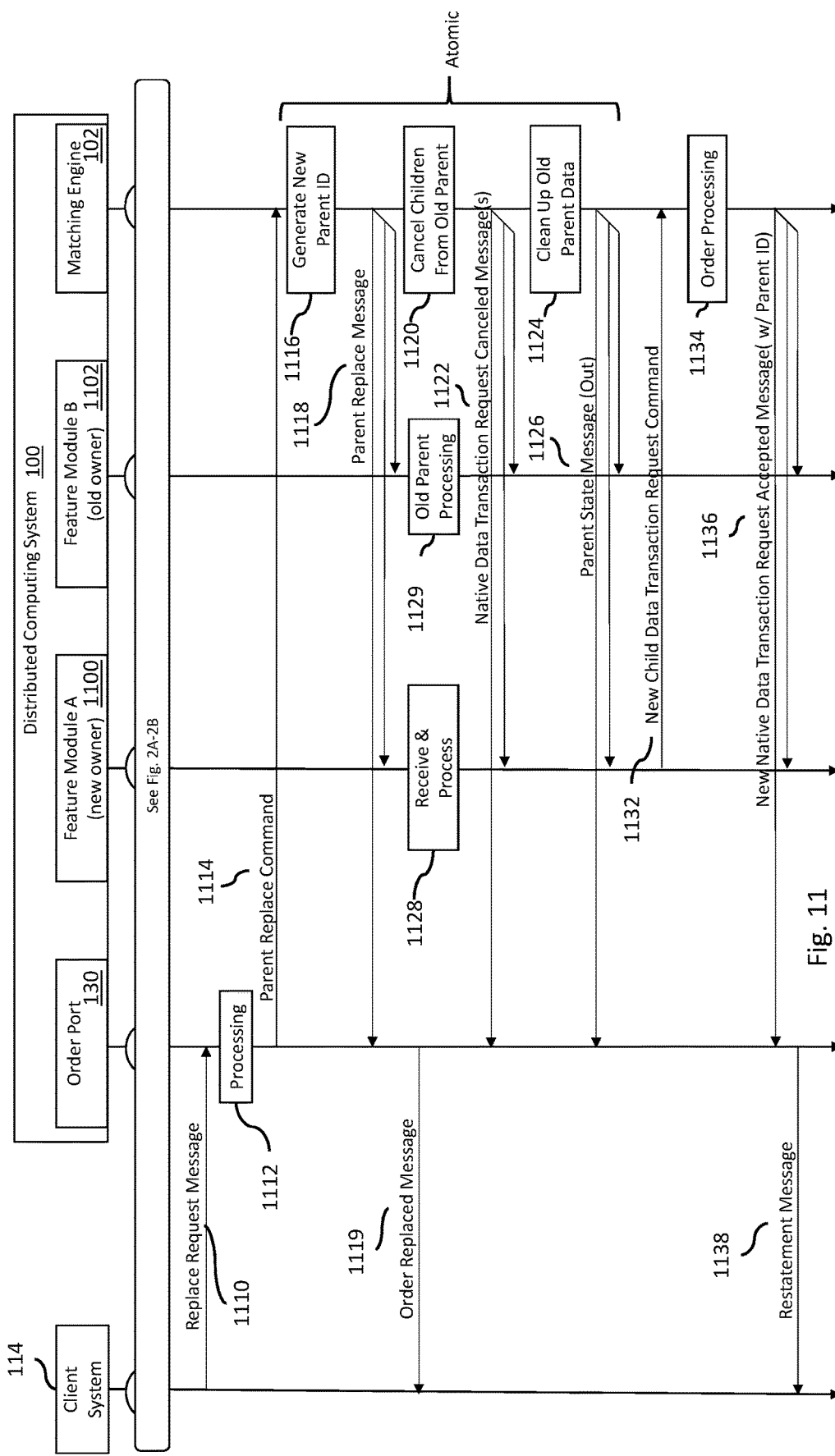
FIG. 11 is a sequence diagram of an example implementation of replacing an existing parent request with a new parent request in the system shown in FIG. 1B according to some embodiments.
Figure 12:
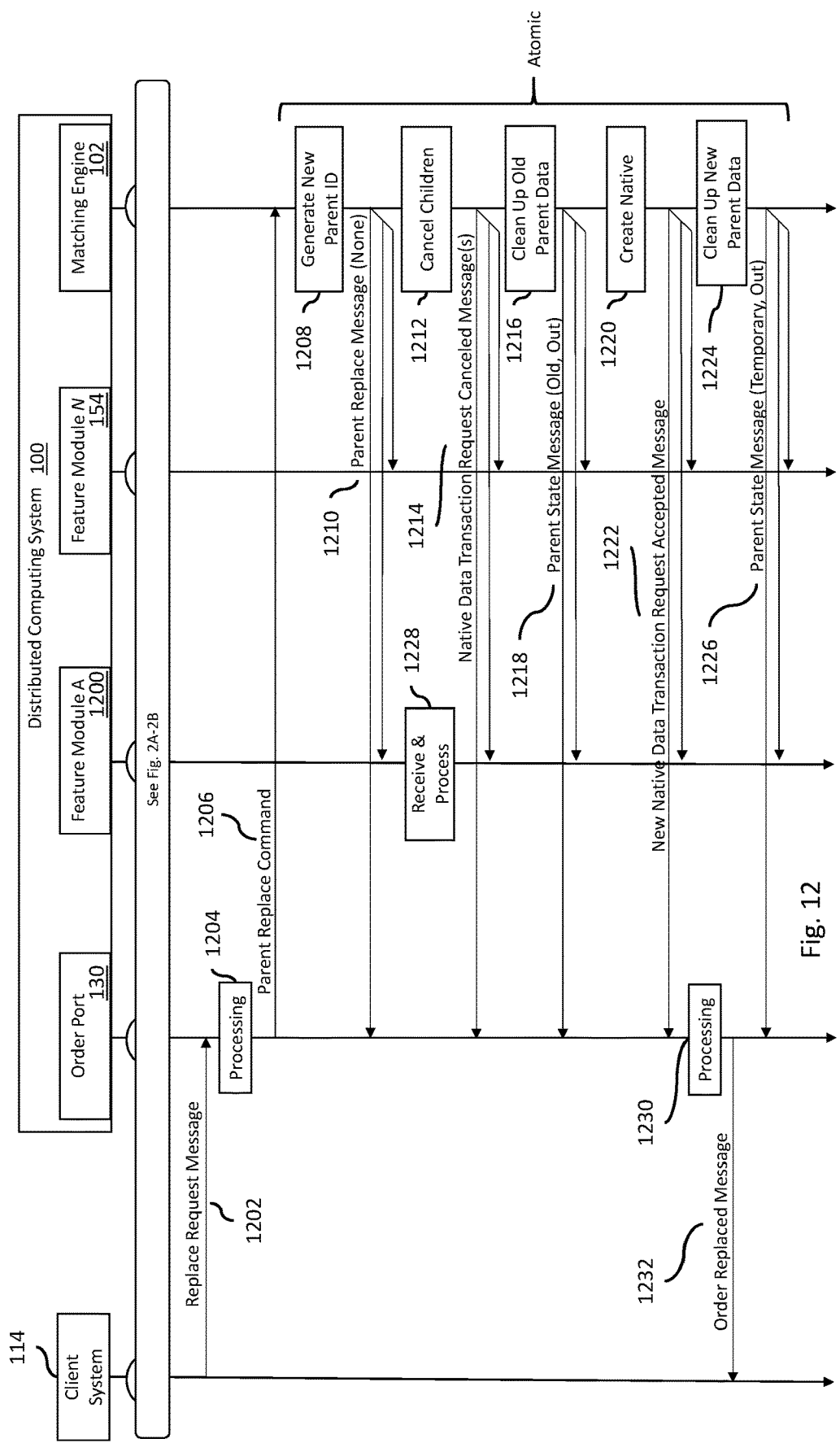
FIG. 12 is a sequence diagram showing an example implementation of changing an existing parent request to a new native data transaction request in the system shown in FIG. 1B according to some embodiments.
Figure 13:
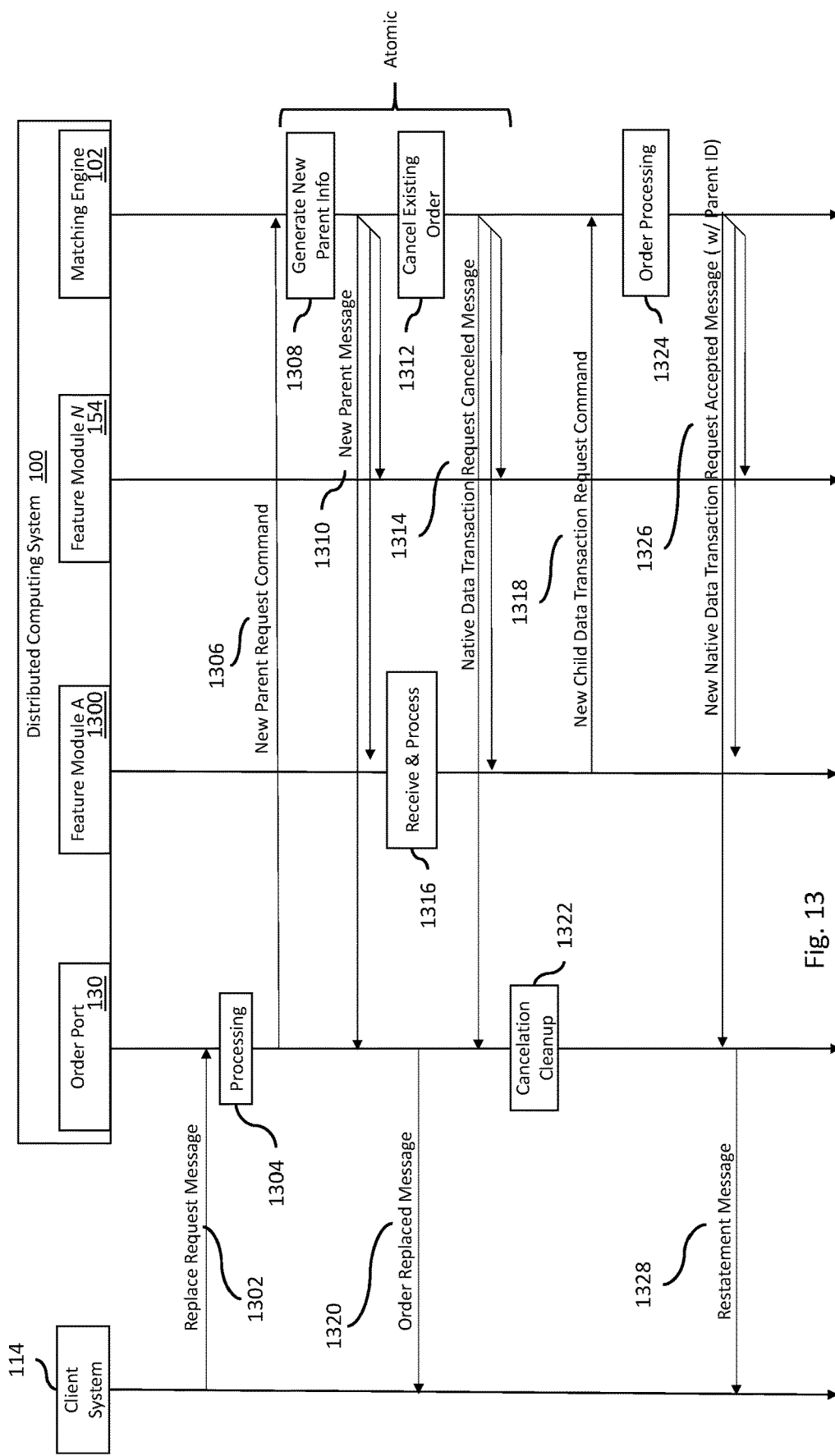
FIG. 13 is a sequence diagram showing an example implementation of changing existing native data transaction request to a new parent request in the system shown in FIG. 1B according to some embodiments.
Figure 14:
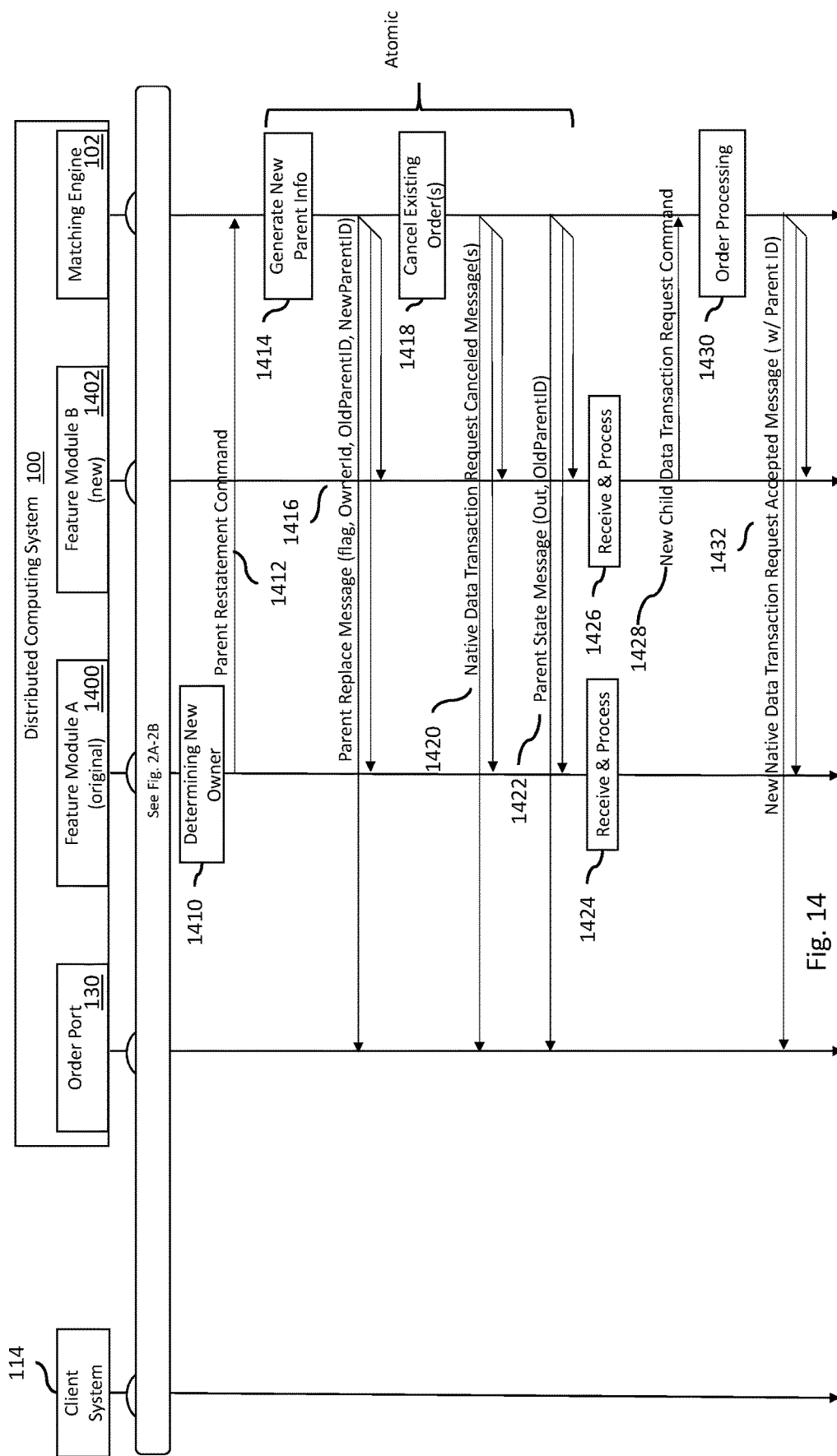
FIG. 14 is a sequence diagram showing an example implementation of changing the owner feature modules for an existing parent request in the system shown in FIG. 1B according to some embodiments.
Figure 15:
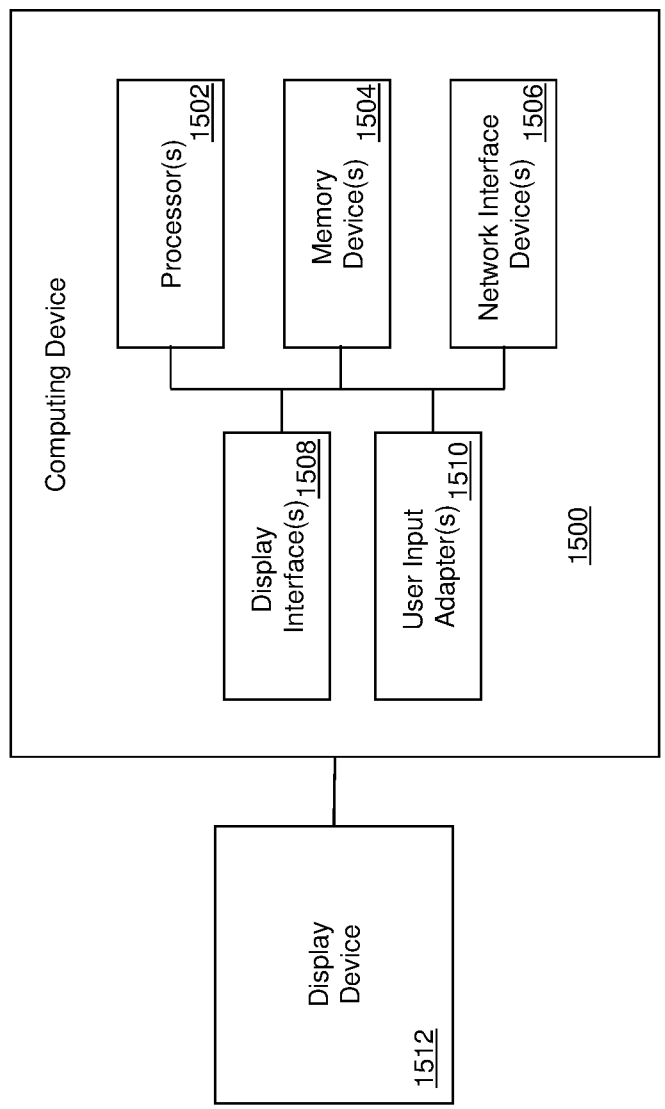
FIG. 15 shows an example computing device that may be used in some embodiments to implement features described herein.

FIG. 1A and FIG. 1B are architecture diagrams that show the distributed computing system that is the subject of this specification, with FIG. 1B showing the feature modules that are included in the system. FIG. 2A and FIG. 2B are sequence diagrams that show how parent requests may be first received and processed or "booked" into the system. FIG. 3, FIG. 4, and FIG. 5 show operations performed by feature modules in the system for the management of booked parent requests that include discretion, pegging, and reserve, respectively. FIGS. 6-8 show operations performed by features modules in the system for handling the cancelation of booked parent requests. FIGS. 9 and 10 show operations performed by the feature modules in the system for "suspending" and "resuming" parent requests. FIGS. 11-13 show operations related to changing or replacing orders in the system (which may involve changes in feature module "ownership" of parent requests in the system); and FIG. 14 shows operations for changing the feature module that "owns" a parent request in the system. FIG. 15 shows an example computing device that may be used for the distributed computing system shown, including an electronic trading platform, where one or multiple such devices may be used to implement the system.

In many places in this document, software (e.g., modules, software engines (e.g., a matching engine), processing instances, services, applications and the like) and actions (e.g., functionality) performed by such software are described. This is done for ease of description and it should be understood that, whenever it is described in this document that software performs any action, the action is in actuality performed by underlying hardware elements (such as a processor and a memory device) according to the instructions that comprise the software. As also discussed herein, such functionality may, in some embodiments, be provided in the form of firmware and/or hardware implementations. Further details regarding this are provided below in, among other places, the description of FIG. 15.

This specification was originally filed with an original claim set comprising claims 1-120. Each claim of this original claim set finds support in many places throughout this specification. However, the following original claims find support in at least the following specified Figures and the description/discussion corresponding to such specified Figures: claims 1-20 in FIG. 2A; claims 21-40 in FIGS. 6-8; claims 41-52 in FIG. 3; claims 54-57 in FIG. 5; claims 58-60 in FIG. 4; claims 61-70 in FIG. 12; claims 71-80 in FIG. 11;

claims 81-100 in FIGS. 1A-1B, FIG. 2 (at 224), FIG. 3 (at 308), FIG. 4 (at 406), and FIG. 9 (at 906); and claims 101-120 in FIGS. 9-10.

2. Description of FIG. 1A

FIG. 1A shows a distributed computing system 100 (which may also be referred to as a "computing system," "computer system," or similar) according to some embodiments.

The distributed computing system 100 may be implemented in some embodiments as an electronic trading platform (which may also be referred to as an "electronic exchange," "electronic trading system," "trading system," "platform," or similar), and may be configured to receive and process messages (which may also be referred to as "electronic messages," "electronic data messages," or similar). Some of the messages that the distributed computing system 100 may receive and process may be data transaction request messages (which may also be referred to as "requests," "request messages," "data transaction requests," "order messages," "electronic orders," "electronic order messages," "data operation request messages," "data operation requests," or similar), which indicate a request for the distributed computing system 100 to take some action.

The distributed computing system 100 may include a matching engine 102 (which may also be referred to as a "matching engine module"), which is a module that, among other functionality, performs match processing. Additionally, the distributed computing system 100 may include an outgoing data feed module 132, one or more order ports 130, one or more feature modules 150 (which may include Feature Module A 152 through Feature Module N 154, which may represent any one of the feature modules discussed herein in connection with the below discussed figures). Any or all of the outgoing data feed module 132, one or more order ports 130, and one or more feature modules 150 (A-N) may each have their own local data store 140 (which, when specific to a given one of these modules types, are referenced as 140A, 140B, 140C, 140N herein) that are accessible in local memory of the computing resources on which these modules are executing. The components in the distributed computing system may communicate via a data subsystem 110, which includes a sequenced bus 111A and a command bus 111B. Or, in other words, communication between the components of the distributed computing system is controlled via the data subsystem 110. More specifically, communication from the matching engine 102 (or, in some embodiments, the sequencer module 120 within the matching engine 102) and other processing instances is controlled by using the sequenced bus 111A while communication from the other processing instances to the matching engine 102 (or, in some embodiments, the sequencer module 120 within the matching engine 102) is controlled using the command bus 111B.

The distributed computing system 100 may be configured to receive (and then process) different types of data transaction request messages. In some embodiments, the data transaction request messages that the distributed computing system 100 may process can include "managed data transaction request messages" and "unmanaged data transaction request messages" (which may also be referred to as "unmanaged orders," "native orders," "unmanaged/native orders," or native data transaction requests). Unmanaged orders include orders that tend to have less elaborate behaviors; for example, unmanaged orders may include orders such as market orders, limit orders, and immediate-or-cancel orders. Managed orders, on the other hand, have more complex behaviors; for example, managed orders may include orders such as peg orders, discretion orders, and reserve orders. Details regarding the behaviors of these various types of orders (market orders, limit orders, peg orders, and so on) are provided below.

When a data transaction request message is received at the distributed computing system 100, it may be received at one of the order ports 130, via a protocol such as OUCH (discussed below). The distributed computing system 100 then translates the data transaction request message into another format that is internal to the distributed computing system 100 (e.g., by taking the received data transaction request message and modifying it or generating a new data transaction request message). The translated data transaction request message is then communicated to the matching engine 102. The matching engine 102 then determines how to handle the translated data transaction request message that is received. If the translated data transaction request message represents a native order, then the matching engine 102 performs match processing on that native order. On the other hand, if the translated data transaction request message represents a managed order, then information regarding the managed order is, in connection with processing performed by the matching engine 102, transmitted to one or more of the feature modules 150, which then manage functionality associated with the managed order.

Management of the managed order by the feature modules 150 may include the feature modules 150 generating one or more corresponding data transaction requests based on the managed order. These generated one or more corresponding data transaction requests may be, in terms of content and formatting, similar or identical to the native data transaction requests mentioned above. The generated corresponding data transaction requests may be referred to as "child orders," "child/native orders," "child data transaction requests," or similar. After being generated by the feature modules 150, these child/native orders may be transmitted by the feature modules 150 to the matching engine 102 for match processing.

With this architecture, the feature modules 150 are able to translate the received managed orders (or orders that require such management) into corresponding child/native orders that are then provided to the matching engine 102 for processing (e.g., match processing). This allows for the logic that is required to handle a managed order (e.g., which may be more complex in terms of rules or processing than unmanaged/native orders) to reside in feature modules 150, while having other processing (e.g., potentially less complex processing, which may include logic for processing unmanaged/native orders) reside in the matching engine 102.

In some embodiments, the matching engine 102 may treat unmanaged/native orders and child/native orders in the same manner in regards to match processing. Whenever it is described herein that the matching engine 102 performs some operation/functionality with respect to a native order, it should be understood that, unless it is otherwise noted or should be apparent from the context, the matching engine 102 would treat a unmanaged/native order or a child/native order in the same way with respect to such operation/functionality (i.e., would perform such operation/functionality with a unmanaged/native order or a child/native order in the same manner). Further, when a data transaction request message (e.g., an OUCH message, a FIX message, or the like) is initially transmitted by one of the client systems 114 and received at one of the order ports 130, the fact that the data transaction request message may be categorized and processed by the distributed computing system 100 as a managed order or an unmanaged order is entirely internal to the distributed computing system 100. In other words, the fact that the data transaction request message may be categorized and processed by the distributed computing system 100 as a managed order or an unmanaged order can be opaque to the client system 114. From the perspective of the client system 114, the client system 114 may only be "aware" that it transmitted, for example, an OUCH message to the distributed computing system 100.

OUCH is a messaging protocol that can be used to communicate with certain example electronic trading platforms. In certain instances, this protocol allows customers, via client systems 114, to submit messages (OUCH messages) that include data transaction requests and also receive status updates on previously submitted requests (e.g., that the message was received and is being or has been processed by the platform). In some examples, handling of OUCH messages (reception and/or transmission) may be performed by a FPGA.

The distributed computing system 100 may communicate with external systems in a number of different ways. For example, as noted above, the distributed computing system 100 may receive data (such as incoming data transaction request messages) via the one or more order ports 130. In some embodiments, each client of the distributed computing system 100 may have their own order port module that is dedicated to handling requests from that client. For example, a client may have multiple different client computer systems that each communicate with distributed computing system 100 via a dedicated order port that that specific client. Each of the order port modules 130 may be separated logically and/or physically, and/or may be executed in separate computer processes (e.g., within separate processing instances). The order port modules 130 may include a number of different types of order ports. For example, one type of order port may only handle unmanaged/native data transaction requests (i.e., not managed data transaction requests) and another may handle managed data transaction requests. An example of an order port is an OUCH port that handles sending and/or transmitting OUCH messages to/from client systems 114. In some instances, the order ports 130 referred to herein may be called "order entry gateways" or "gateways" and may be used in a manner that is the same or similar to that discussed in connection with the order port 130 that is described herein. In some embodiments, one or more of the order ports may be called "FIX gateways" and may be programmed to handle protocol messages that use the FIX message protocol. In some embodiments, the gateways/order ports of the system 100 may support multiple different types of messaging protocols (such as FIX and OUCH), which may allow for multiple different message protocols to be used when communicating to/from system 100. In some embodiments, different order ports/gateways may be used to support such different types of messaging protocols. In some embodiments, the same order port/gateway may support such different types of messaging protocols.

The outgoing data feed module 132 may communicate (by sending, receiving, or both sending and receiving) messages to external systems via the outgoing data feed system 112. The outgoing data feed module 132 may transmit and/or receive data as a data feed, and/or via using one or more protocols such as the ITCH protocol. Some of the information transmitted over this data feed may be updates regarding changes to the order book 124, which will be described in further detail below, and/or actions performed by the matching engine 102. The outgoing data feed module 132 may have a local data store 140A that stores data relevant to the processing performed by the outgoing data feed module 132. The outgoing data feed module 132 may, for any or all of the messages that are communicated via the sequenced message bus 111A (including those discussed elsewhere herein), generate and transmit a corresponding message via the outgoing data feed 112. The message that is generated and transmitted in this manner may have less information than the message received from the sequenced message bus (e.g., data related to certain fields may not be included in the message communicated from the outgoing data feed module 132), may have additional information that was not included in the message received from the sequenced message bus (e.g., such information may instead be derived from the local data store 140A).

In some embodiments, communication from client systems 114 may occur via a network connection in which the client system 114 establishes a socket or similar connection to the order port 130 (e.g., via the Internet or other network). In some embodiments, the connection between client systems 114 and the order port 130 may be more direct; for example, the client system 114 may be directly connected via a cross-connect cable (or similar) to the computing resource that is hosting the order port 130. In some embodiments, communication between order port 130 and client system 114 may occur via a message queue or the like where a dedicated space of memory or the like is used to write incoming message and a dedicated space of memory is used to write outgoing messages. In some embodiments, client systems may be computing nodes in a cloud-based computer system and may communicate with order nodes in the cloud-based computer system that makeup system 100. Accordingly, it should be appreciated that different communication techniques between client systems 114 and order port 130 are contemplated in connection with use of distributed computing system 100 by client systems 114.

The incoming data feed 116 is a system via which the distributed computing system may receive one or more data feeds transmitted from other electronic trading platforms. This incoming data feed may include market data from these other electronic trading platforms, and may be received by Feature Module A 152, other feature modules 150, and/or other modules in the system 100. As an example, data regarding the current national best bid and offer (NBBO), and/or similar data, may be communicated via the incoming data feed 116. In some examples, data from external sources, such as incoming data feed 116, may not be received or processed by the matching engine 102.

As noted above, the distributed computing system 100 may include a matching engine 102. In some embodiments the matching engine 102 may include a sequencer module 120 (which may also be referred to as the "sequencer" or similar, and/or which may be described as performing a "sequencing process," "sequencer process" or similar) and a matcher module 122 (which may also be referred to as "the matcher," or as a "match processing module," "matching process module," or similar). The sequencer module 120 is responsible for receiving messages via the command bus 111B of the data subsystem 110 and sequencing those messages before communicating sequenced versions of those messages back out on the sequenced bus 111A of the data subsystem 110. For ease of description in connection with the example embodiments described herein, messages that are communicated on the command bus 111B (e.g., to the matching engine 102) may be referred to as commands (e.g., a New Child Data Transaction Request Command as shown in 224 in FIG. 2A) and messages communicated via the sequenced bus 111A (e.g., from the matching engine 102) may be referred to as messages (e.g., New Parent Message as shown in 218 in FIG. 2A). Thus, commands that are to be processed by the matching engine 102 (or the sequencer 120 in connection with certain examples) are received via the command bus 111B and then may be echoed back onto the sequenced bus 111A as messages, which have been sequenced by the sequencer module 120. The messages communicated via the sequenced bus 111A may include a message sequence number that is used to indicate the relative ordering of the message with respect to other messages being handled by the distributed computing system 100. For example, the sequencer 120 may receive a command via the command bus 11B to add a new order; in response to that command, the sequence module 120 may generate a corresponding sequenced new order message, and then transmit that sequenced message via the sequenced bus 111A with a message sequence identifier.

The sequencer 120 may include functionality for maintaining a logical clock and annotating or otherwise creating messages that include a message sequence number or identifier that is generated from the logical clock that is maintained by the sequencer 120. Example implementations for sequencing messages and use of a logical clock within a distributed computing system are provided in connection with, for example, U.S. Pat. No. 9,712,606, the entire contents of which are hereby incorporated by reference. In some examples, the sequencer 120 may operate by incrementing/increasing a message sequence number (which may be a "global" message sequence number) for each message that it processes and/or transmits. For example, if the distributed computing system 100 operates within specified hours on particular days, then the sequencer 120 may assign the number "1" to the first message that it processes on a given day, and then may increment the message sequence number for each subsequent message that it processes on that day by one. Accordingly, as the sequenced messages are communicated out via the sequenced message bus 111A, the various modules in the distributed computing system 100 may be able to determine the order in which the messages were processed by the matching engine 102. This use of message sequence numbers can be used to ensure proper ordering of the messages within the entirety of distributed computing system 100. It also allows other modules (e.g., any of the modules shown in FIG. 1B and/or otherwise described herein as included in the distributed computing system 100) to know the order in which the messages arrived and/or were processed at the matching engine 102 and avoid processing messages out of order. This can be important because of the latency between the matching engine 102 and any other modules operating within the computing system 100. In other words, the matching engine 102 is the only module that may be considered "current," with all other modules operating based on some unknown or variable delay. The delay may be due to network latency, cache hits or misses, or any other number of various factors that can affect how quickly data can be communicated between the matching engine 102 and any other module within the distributed computing system 100. The "message sequence number" that is discussed above (which may be associated with each message communicated over the sequenced message bus 111A) is different from other sequence numbers that discussed elsewhere herein (e.g., a Trade Now sequence number or a child sequence number).

Returning to FIG. 1A, in some embodiments, the matching engine 102 has access to and uses local data storage (e.g., memory devices 1506, such as cache memory, DRAM, etc.). Data that is stored locally and accessed by the matching engine 102 includes the order book 124 and the data store 126.

The order book 124 is a data structure that stores pending (e.g., unmanaged/native orders and child/native orders) data transaction requests. Each pending data transaction request may include one or more fields with values specified for some or all of the fields for a corresponding data transaction request. For example, each pending data transaction request may have one or more of the following fields: an order identifier, a listed value (also called a "list value," "list price," or "match value," "book value," "book price", "matching value" or similar—e.g., the price that has been assigned to this data transaction request at which the matching engine 102 will use to determine a match), a quantity value (e.g., how many shares of the security is being listed), a visible attribute, a timestamp, and others. In some embodiments, these pending data transaction requests are data transaction requests that have already been processed by the matching engine 102 (e.g., they have been placed into the order book 124). Data transaction requests that have been placed in, and are stored in, the order book 124 may be referred to as "pending data transaction requests," "pending orders," "resting data transaction requests," "resting orders," or similar. The order book 124 may be organized as a dual or two-sided data structure that stores both data transaction requests for a first side (e.g., buy orders) and a second side (e.g., sell orders). The data structure may store each of the sides using different lists and/or other data structures as no (e.g., in an array, linked list, graph, binary search tree, and/or other data structure). In some embodiments, the lists may be sorted/ordered based on one or more criteria that includes, the price value of each order, the displayed/hidden value of each order, a timestamp (or a message sequence number) of each order, the quantity value of each value. For example, the lists may be sorted/ordered according to price/time (e.g., each list is sorted by price of the order, then time) or price/display/time, or price/quantity/time, or other combinations.

In some embodiments, a separate instance of the order book 124 may be allocated for each security (e.g., each ticker symbol or other identifier) that is traded or processed by the matching engine 102. Alternatively or additionally, in some embodiments, multiple different orders books 124 of different types may be used for each of the individual securities processed by the matching engine 102, with the different order books 124 storing different types of orders therein and/or facilitating different types of processing by the matching engine 102. Examples of different types of order books include a continuous book (e.g., that is continuously) updated throughout a trading day), an open or cross book (discussed below), an auction book, and others.

In some embodiments, the matching engine 102 and/or the data subsystem 110 may operate with and/or include input and/or output modules that are designed to facilitate the messaging architecture herein. In some examples, the matching engine 102 includes such input and output modules. In other examples, the input and/or output modules are provided separately from the attaching engine (e.g., they may be part of the data subsystem 110). The input module may receive and process commands communicated via the command bus 111B before such commands are provided for processing by the matching engine and/or sequencer as discussed elsewhere herein. When messages are received, the input module may perform low level validation checks to ensure the message is properly formed and the like and then place the message into a buffer (as discussed below) for further processing by the matching engine 102. The output module may be configured for facilitating communication of the sequenced messages out onto the sequenced message bus 111A. In some embodiments, the output module may be responsible for annotating and/or generating a message sequence number (which is discussed below) to the message that is communicated over the sequenced message bus 111A. In some embodiments, the output module may include some or all of the functionality that is associated with the sequencer module 120. In some embodiments, these input and output modules may operate as separate computer processes, but share/have access to a common memory space with the computer process that is running the matching engine 102 (e.g., by using inter-process communication (IPC), such as by writing/reading from shared memory or using other IPC techniques). Accordingly, additional modules may be provided within the system 100 in order to provide the functionality discussed herein.

In some embodiments, one input module and/or output module may operate and provide messages to/from multiple different instances of a matching engine. For example, in some embodiments where multiple instances of a matching engine are combined with a single input module, the input module may be responsible for writing to a buffer in a memory space of the appropriate matching engine. Thus, if there are four instances of a matching engine, then the single input module may determine (e.g., based on the ticker symbol, or other data included in the message) which matching engine is responsible for the given message and then write that message to the buffer in memory that is shared with that particular matching engine instance.

Among other operations, the matching engine 102 (or, in some embodiments, more specifically the matcher module 122) may perform match processing, which may involve comparing one or more data transaction requests against one or more contra-side data transaction requests to determine if one or more (full or partial) matches can be made. This match processing may involve comparing an incoming data transaction request against contra-side data transaction requests that are resting in the order book 124 to determine if there is a match. In some instances (depending on the characteristics of the incoming data transaction request), if there is no match, then the matching engine 102 may store the incoming data transaction request in the order book data structure 124 on the side indicated by the incoming data transaction request. Alternatively or additionally, in some examples, this match processing may involve only resting data transaction requests; this may occur, for example, if the match processing is triggered based on a change in market data versus being triggered by an incoming data transaction request. In some embodiments, this match processing may involve both unmanaged/native orders and child/native orders; thus, for example, the match processing may involve the matching of a child/native order to a resting unmanaged/native order or vice versa.

In some embodiments the distributed computing system 100 is configured to process data transaction requests that are (or relate to) what are referred to as "limit orders." Every limit order involves a "limit price," which defines the price (a) at or below which the entity behind the order is willing to buy an asset (or some quantity thereof) or (b) at or above which the entity behind the order is willing to sell an asset (or some quantity thereof). In other words: a buy limit order specifies a request to buy the asset (or quantity thereof) at or below the given limit price, and a sell limit order specifies a request to sell the asset (or quantity thereof) at or above the given limit price. As an example, if a new data transaction request is received in the system 100 that is a limit order for buying a given number of shares of a particular security, then as part of the match processing for the received data transaction request the matching engine 102 (or, more specifically, the matcher module 122) will determine whether that data transaction request can match against any resting contra-sided data transaction requests (e.g., those sell side data transaction requests) for that security that are already stored in the order book 124; this determining may include comparing the limit price of the new data transaction request to the limit prices of the resting contra-side orders. If it is determined that a match can be made, then a match is made (which results in the resting data transaction request(s) that is/were matched against (or portions thereof) being removed from the order book 124); on the other hand, if the matcher module 122 determines that a match cannot be made (or that only a partial match can be made), then the incoming data transaction request (or portion thereof that could not be matched) will be placed in the order book 124.

In some embodiments, the distributed computing system 100 is configured to process (native) data transaction requests that are (or relate to) what are referred to as "market orders." A market order may include data such as a side (i.e., whether the order is a request to buy or sell) and a quantity, and a market order indicates a willingness to match against the best price on the contra side of the order book. In other words, (a) a buy market order indicates a request to buy an asset (or quantity thereof) at the lowest price available, while (b) a sell market order indicates a request to buy an asset (or quantity thereof) at the highest price available. When the matching engine 102 (or, more specifically, the matcher module 122) performs match processing for an incoming market order, the matching engine 102/matcher module 122 will determine whether there are any orders on the contra side of the order book 124 and against which the incoming market order can be matched. If it is determined that a match can be made, then a match is made (which results in the resting order(s) that is/were matched against (or portions thereof) being removed from the order book 124); on the other hand, if the matcher module 122 determines that a match cannot be made (or that only a partial match can be made), then the incoming data transaction request (or portion thereof that could not be matched) will be discarded by the matching engine 102 (i.e., it will not be stored in the order book 124).

Alternatively or additionally, in various embodiments the distributed computing system may be configured to process data transaction requests that are (or relate to) the following: requests to cancel existing/pending orders that are resting in the order book 124; requests to modify existing/pending orders that are resting in the order book 124; immediate or cancel (IOC) orders (which are canceled if no match is immediately found, instead of being placed into the order book 124); and/or other types of data transaction requests that relate to how the distributed computing system has handled or is handling orders that have submitted to the distributed computing system).

In connection with the features discussed herein, whenever it is described that a native order (whether a child/native or unmanaged/native, or quantity from such an order) is "canceled," "removed", "canceled down", or similar, the distributed computing system 100 (e.g., the matching engine 102, feature module(s) 150, etc.) may perform "cancelation processing" or "cancel processing." In some embodiments, cancellation processing may also be applied to the cancelation of parent requests and other data. Such cancelation processing includes modifying or deleting data from memory (e.g., 1504) of the computing resources storing or otherwise using the data of the element that is being canceled. For example, if a native order is resting in order book 124 and that corresponding native order is canceled in connection with a cancelation request, then the matching engine 102 may perform cancelation processing by, for example, deleting the data for that native order from order book that is stored in the memory of the computing resources on which the matching engine 102 is operating. In certain instances, cancelation processing may involve modifying the value of a field of a native order. For example, if a request includes the cancelation of a certain quantity from a native order, then the cancelation processing that is performed may include modifying the quantity field of the native order to carry out that cancelation request (e.g., changing the value of the quantity field from 200 to 100 if the request is to cancel 100). As another example, if an IOC order is received and a match is not found, then the data for that IOC order may be subject to cancelation processing by having, for example, the data marked as being canceled in the memory of the computing resources on which the matching engine 102 is operating. Techniques that may be used to carry out cancelation processing may include: (a) modifying a value of a field (e.g., the quantity field of a native order), (b) marking data as being deleted (e.g., by changing the value for a "deleted" bit field in an object that is storing the data to be true or the like), (c) overwriting data with other data, or (d) otherwise causing the data that is stored within computing resources of the distributed computing system 100 to be modified such that it is understood by the distributed computing system 100 (or components thereof, such as the matching engine 102 or feature modules 150) that the element (whether a native order, a parent request, or the like), or data thereof, has now been canceled.

The distributed computing system 100 (e.g., the matching engine 102, feature module(s) 150, etc.) may perform "cleanup processing" that includes resetting or cleaning the state of the computing resources on which the functionality of the distributed computing system 100 is operating. For example, in cleaning up the state of the parent data structure when a parent request is canceled, removed, or otherwise deleted, cleanup processing may be performed. Cleanup processing can include: (a) setting a pointer to null or updating a pointer that pointed to a data structure(s) to no longer do so, (b) performing garbage collection, (c) freeing up memory corresponding to and/or associated with data that has been canceled (e.g., such as a native order that has been canceled), (d) deleting data (or an index to data), (e) overwriting data (e.g., overwriting data to all 0s) and the like. As an example of cleanup processing, if there are no pending child orders for a parent request and there is no additional quantity to be matched for the parent request (e.g., as indicated in the parent request data structure), then the distributed computing system 100 may perform cleanup processing for the parent request to remove it from the distributed computing system 100 (e.g., as the parent request is no longer being used).

In some examples, data that is subject to cancelation processing may also be subject to cleanup processing as computing resources are available to handle such processing. For example, data for a native order may be marked as canceled (e.g., by setting bit in memory for that native order that it has been canceled) during cancelation processing and then overwritten with 0s during cleanup processing that is subsequently performed. As another example, if the quantity field for a native order is set to 0 (as a result of the above cancelation processing or being fully executed as a result of a match), then the cleanup processing may perform cleanup processing on the memory that had been allocated to that native order. Cleanup processing may also be performed in connection with the parent request data structure, data store 126, and other data locally stored in connection with processing instances other than the matching engine. Cleanup processing may be performed automatically (e.g., without being based on messages from external computing systems or manual prompts) by components (e.g., matching engine 102, feature modules 150, etc.) of system 100.

As described in further detail herein, multiple operations may be performed by the matching engine 102 in response to reception of commands received via the command bus 111B. The matching engine 102 may perform multiple operations for such commands in an atomic manner, or performing the operations "atomically." Such processing that involves performing multiple operations atomically may also be referred to as performing an "atomic transaction" (e.g., the multiple operations are performed as an atomic transaction). In some embodiments, performing operations "atomically" means that there will be no other messages communicated from the matching engine, from the output module, and/or over the sequenced message bus 111A that have message sequence numbers that are between/within the range of message sequence numbers used in connection with the messages generated for the operations being performed within the atomic transaction. In some embodiments (e.g., where multiple instances of a matching engine operate within the system 100) this may mean that other instances are "blocked" from communicating messages out over the sequenced message bus 111A until the messages associated with the atomic transaction have been communicated. Thus, for example, if operations being performed atomically result in five messages being generated (e.g., such as may occur in connection with FIG. 11 for example when there are three child orders), then there will be no messages communicated in connection with other operations (e.g., by the same matching engine instance or another instance of the matching engine) that have a message sequence number between the "first" message communicated and the "last" message communicated in connection with this atomic transaction.

Alternatively, or additionally, in some embodiments, performing operations atomically means that the matching engine 102 will not switch to performing operations for other commands that are to be processed by that matching engine 102 until all of the operations for a given command have been completed by the matching engine 102.

Processing of atomic transactions may ensure that, for example, once the matcher module 122 (or more generally the matching engine 102) has begun processing request A, it will not block and switch to processing request B prior to completing the operations performed for request A. Such processing may also ensure that the stream of messages communicated via the sequenced message bus 111A of system 100 in connection with the atomically performed operations is, for example, sequential (e.g., there is no gap in messages communicated for atomically performed operations).

In some embodiments, other operations may be performed during atomically performed operations by, for example, other matching engine instances. However, the sequenced messages for such operations may not be communicated via the sequenced message bus 111A until the completion of an atomic transaction. Additionally, the above discussed input/output modules that work with the matching engine 102 (e.g., to process reception/transmission of messages), and/or other components of system 100 (e.g., data subsystem 110, feature modules 150, etc.) may perform operations during an atomic transaction.

In some embodiments, and even when there are multiple instances of a matching engine, the atomically performed operations in one instance may be atomic with respect to other instances in connection with how the message sequence numbers for the messages associated with those atomically performed operations are generated.

The matching engine 102 may handle different types of requests in different manners. Some may include multiple operations that are performed atomically. An example of performing multiple operations in an atomic manner for a command is shown in the atomic processing discussed in FIG. 12. Other types of requests may involve multiple commands communicated to the matching engine 102 that are each discretely performed by the matching engine 102. An example of this type of processing is shown in connection with FIG. 3 and the described example implementation of the Discretion Feature Module 166 where multiple commands to the matching engine are used to implement discretion matching. As noted herein, commands that are received at the matching engine 102 may be stored in a queue until they are ready to be processed by the matching engine 102.

In certain examples, atomic processing of operations may be performed with respect to each matching engine 102 instance. In other words, a single instance of the matching engine 102 may be used to handle processing for multiple types of securities. In such a case, the atomic operations performed by that instance of the matching engine 102 may be with respect to all of the securities handled by that instance (with each security having its own order book for storing native orders therein).

As noted above, the matching engine 102 may not directly perform matching processing on managed data transaction requests. However, the matching engine 102 may perform other types of processing in connection with handling managed data transaction requests, and the matching engine 102 may store data regarding managed data transaction requests in its data store 126. Such data may include, and be stored in a corresponding data structure: (a) identifiers of the managed requests and/or the Locate identifier for that managed request; (b) for a given managed request, identifiers of child/native data transactions requests associated with the managed request; (c) for a given managed request, data that identifies or is used to determine which feature modules 150 will handle or manage at least some of the functionality associated with a managed request; (d) for a given managed request, data that identifies which of the feature modules 150 is the "owner" of the parent request; (e) for a given managed request, additional sequence numbers (e.g., a Trade Now sequence number and a child sequence number, both discussed below) that are used by the feature modules 150 and the sequencer 120 to control which commands or messages sent by the feature modules 150 will be acted upon by the matching engine 102; (f) for a given managed request, account or customer information to indicate which customer owns or is associated with the request; (g) a reference to the security that a given request is associated with; (h) how many shares are remaining for the request (e.g., order "leaves"); (i) number of shares canceled via AIQ (Anti-Internalization), (j) the side of the order book that the request is associated with (e.g., buy or sell), (k) time in force (threshold value for how long the request is to be active), (l) a pointer or reference into the order book data structure 124 to where at least one of the children associated with the associated parent request is located, (m) a Max Floor field that includes a value to indicate the quantity or number of shares that are to be displayed (e.g., in child orders) for the given parent request, and other fields. In some embodiments, every parent request is stored in the data store 126 in an object (e.g., a parent object or parent data structure) with one or more of the above attributes. As used herein, the collection of data that is stored in data store 126 that relates to parent requests may be referred to as a parent data store or a parent request data structure and individual entries (e.g., that are associated with a given parent request) may be referred to as "parent data."

As indicated above, the matching engine 102 may maintain different sequence numbers. Such sequence numbers may be incremented/increased or otherwise updated for each data transaction request, each order, each type of command associated with a given parent request, and/or each parent request that is processed by the matching engine 102. These different sequence numbers are separate/distinct from the message sequence number that is maintained by the sequencer 120. The sequence numbers handled by the matching engine 102 may be stored in data store 126 and in association with each maintained or stored parent request object that is stored in the data store 126. In various embodiments, these sequence numbers and associated data may include: (a) different child sequence numbers (discussed below); and/or (b) a Trade Now sequence number (discussed in connection with FIG. 3 and the Discretion Feature Module 162). These sequence numbers are maintained in connection with certain parent requests and may be used to protect against conflicting messages (or duplicate messages) sent by one or more feature modules 150 to the matching engine 102. Such sequence numbers may be maintained on an individual parent request basis (e.g., within the parent object).

The above noted child sequence number is maintained by the matching engine 102 (in data store 126) and is incremented each time a new child/native order is accepted by the matching engine 102. For example, the child sequence number may be incremented in conjunction with the sending of a new child/native data transaction message as described with respect to operation 224 in FIG. 2A. Other message types or actions may also cause the child sequence number to be incremented. In some embodiments, the same child sequence number may also be incremented when a command of a particular type (and/or having particular characteristics) is processed by the matching engine 102; an example of this is seen with a Parent Suspend command is processed as shown in FIG. 9. In some embodiments, each time a new order identifier is generated in connection with a given parent request, the child sequence for that parent request may also be incremented. For example, upon reception of a data transaction request to create a new order (a child/native order) for a given parent request, the matching engine may generate an order identifier (orderID) that is used to subsequently identify this new order. At this time the child sequence number may be incremented for the relevant parent request. In some embodiments, replacing a child order (discussed in connection with FIG. 4), does not use the child sequence number for validation.

Child sequence numbers may be maintained on an individual parent request basis such that each parent request has its own corresponding child sequence number that is maintained by the matching engine 102 (e.g., is stored in the data structure along with the other parent request specific information). Thus, when one of the actions discussed above is taken, the child sequence number that is stored in the matching engine 102 may be incremented. The child sequence numbers are also maintained in each feature module. These child sequence numbers may be referred to as local child sequence values or local child sequence numbers and may be incremented or otherwise updated when the feature module receives one of the messages that cause an increase. In some embodiments, the child sequence number may be carried by the message.

The child sequence numbers may be used by the feature modules when sending requests/commands to the matching engine 102 to add new orders for the given parent. The child sequence number included in the request may be based on or the same as the child sequence number stored in the feature module. In some embodiments, the child sequence number included in the message may be the next expected child sequence number (e.g., 1+the current child sequence stored with the feature module). In some embodiments, the sequence number may include any alphanumeric value and thus may be a sequence value or a child sequence value.

When such commands are received by the matching engine 102 (e.g., as with the New Child Data Transaction Request Command 224 of FIG. 2A or Parent Suspend Command 906 in FIG. 9), the matching engine 102 will validate the command by comparing the provided child sequence number (e.g., an expected child sequence value) in the command to the child sequence number (e.g., a current child sequence value) that is stored in data store 126. For example, the matching engine will compare the child sequence number provided in the command to 1 plus the current child sequence number stored in data store 126. Thus, if the expected child sequence number does not match, then the matching engine 102 may drop the command. Generally, this drop will not be reported back to the feature module 150 that submitted the command. Instead, the feature module 150 may be informed that its previous message was out of date due to receiving a further message (e.g., that was caused by some other process) that includes the next child sequence number. When the child sequence numbers match, the matching engine will process the message and increment the child sequence and communicate an acceptance message.

The sequencer 120 and matcher module 122 may be implemented in different ways depending on implementation needs. For example, in some embodiments the sequencer 120 and matcher module 122 are implemented in separate threads or may be on the same thread within an example computer process. In some embodiments, the sequencer 120 and the matcher module 122 are included within the same computer process (e.g., the matching engine 102 operates as a single computer process that includes the functionality of the sequencer 120 and the matcher module 122). Such an implementation may be beneficial from a performance perspective as it may decrease the amount of time the system 100 needs to process new data transaction requests and take action to determine if newly received requests are matchable. This is because the matcher module 122 may operate on a message (e.g., a new data transaction request) in nearly the same instant that that message is sequenced by the sequencer 120. In some embodiments, the process of sequencing a newly received data transaction request message and then performing match processing for that request may be executed atomically by the matching engine 102.

In a variation on what is shown in FIG. 1A, in some embodiments, the sequencer 120 is implemented outside of the matching engine 102, as a separate module (e.g., as a separate computer process or a separate thread). In such an implementation, the matching engine 102 (and the matcher module 122) may receive sequenced messages that have been processed by the sequencer 120 via the sequenced bus 111A, in the same manner that other modules (e.g., feature modules 150) receive sequenced messages via the bus 111A. In other words, the sequencer 120 may receive messages (e.g., via command bus 111B as discussed herein), sequence those messages, and provide such sequenced messages for any interested modules (including the matching engine 102) via the sequenced bus 111A.

In some embodiments, the matching engine 102 may be physically co-located with the sequencer 120 on the same computing device or even use the same processor (or core) of a given computing device. This may decrease the latency between when the matching engine 102 receives messages from the sequencer 120 and can act on them (e.g., in comparison to a design where the matching engine 102 is not physically co-located). In other embodiments, the matching engine 102 may be deployed on separate computing hardware and receive messages from the sequencer 120 via, for example, a network or other communications technology (e.g., cross-connect cables, fiber backplane or other technologies that allow different computing systems or the like to communicate within the same or different data centers). This design may enhance the speed or throughput at which messages are sequenced by the sequencer, with a trade-off with respect to the latency of when a matching process is performed by the matcher 122.

In the example implementation shown in FIG. 1A, the sequencer 120 and the matcher 122 are implemented within the matching engine 102. In some places in this specification, the matching engine 102 will be referred to as a synecdoche for its constituent components (i.e., for the sequencer 120 and/or the matcher 122), and it should be understood that (a) whenever the matching engine 102 is described in this specification as performing operations such as sequencing messages or similar, such operations may be performed in some embodiments by the sequencer 120, and (b) whenever the matching engine 102 is described in this specification as performing operations such as match processing or similar, such operations may be performed in some embodiments by the matcher module 122.

In some embodiments, multiple matching engine 102 instances may be included in the distributed computing system 100. Each instance of matching engine 102 may be used to handle data transaction requests of a given type or types, and/or to handle data transaction requests for particular assets that are traded in the system 100. For example, in an instance where the system 100 is used to trade a set of securities, multiple matching engine 102 instances may be used, with each instance responsible for handling a subset (e.g., one or more, 10 or more, or possibly thousands of different securities—each having thousands or millions, or more transactions per day) of the set of securities. In connection with understanding the scope of system 100, each command that is communicated over the command bus 111B (e.g., a command to generate a new parent request, a command to modify a native order, a command cancel a parent request, the other commands noted herein, and others) may be considered a "transaction" for purposes of understanding the architecture and/or scope of system 100.

System 100 may be designed to handle a large number of securities (e.g., thousands or tens of thousands), with each instance of the matching engine being tasked with handling the transactions that are associated with a subset of the total number of securities. In some instances, the matching engine instances may be balanced to handle a roughly similar number of transactions per day. Thus, for example, if the system is expected to handle 1 billion transactions per day, and 4 matching engine instances may be configured to such that approximately 250 million transactions are being handled by each instance of the matching engine. It will be understood, however, that the load balance between the instances of the matching engine may fluctuate as the number of transactions for a given security may vary from day to day. In some embodiments, all transactions concerning one security are handled by the same instance of the matching engine. Accordingly, one instance of the matching engine may be assigned fewer total securities than others (e.g., because those securities may tend to have more transactions associated with them—they are more active).

As noted herein, the matching engine may be executed within its own virtual machine and/or virtual container. For example, by using a Java Virtual Machine (JVM) or the like. In some embodiments, multiple virtual machines (e.g., partitions or instances) may be executed on the same underlying physical computing resources (e.g., computing device 1500). For example, multiple JVMs (e.g., 2, 3, 4, or more) may be deployed to the same computing device 1500, with each virtual machine or container being used to execute a corresponding instance of the matching engine 102. In some embodiments, each core of a multi-core processor may be assigned to a given JVM (and the instance of the matching engine 102 that is executing therein).

In some embodiments, instances of the matching engine 102 may be deployed on an ad-hoc basis. For example, an instance of matching engine may be deployed within system 100 to handle an initial public offering (IPO) or other circumstances that could results in a very large amount of transaction being submitted a short amount of time. The system 100 described herein is designed accommodate such deployment scenarios and can thus be configured to meet periods of high demand.

Computing system 100 uses a data subsystem 110 to communicate between processes that are executing therein. The data subsystem 110 includes a sequenced message bus 111A and a command bus 111B.

The sequenced message bus 111A communicates messages that have been sequenced by the sequencer 120. Accordingly, whenever a message is discussed herein as being communicated via the sequenced message bus or the like, this also requires sequencing of the message by the sequencer 120 (e.g., using a logical clock or other clock to generate a message sequence identifier/number, annotate the message with that message sequence identifier/number, and then increase the message sequence identifier/number for the next message). Whenever a message is communicated on the sequenced bus 111A, any/all of the modules in the system 100 that are listening on the sequenced bus 111A will receive the message; and it is up to each module that received a message to determine if the message is relevant to the module and if it should take action/perform some operation in response to/based on the message.

As discussed above, sequenced messages allow for a logical ordering of the state of the distributed computing system 100. In general, prior to a message being sequenced it is not considered to be "within" the distributed computing system 100. As a simple example, consider an implementation where a client system 114 transmits a message (via the order port 130) with data indicating whether a particular light is red, yellow, or green. Once the order port 130 receives the message, it will (a) communicate the message to the sequencer 120 for processing or (b) generate a corresponding message in a format that is internal to/understood by the distributed computing system 100 and components within it, and then communicate the corresponding message to the sequencer 120 for processing. In either case, the sequencer 120 will receive a message from the order port, sequence that message, and then communicate a sequenced message back out via the sequenced message bus 111A to be received by the order port 130 and/or other processing instances that are part of distributed computing system 100. With this type of implementation, a report for a color yellow light is not acknowledged by the system 100 until a sequenced version of that message is communicated from the sequencer 120 back to the order port, and then back to the client system. Accordingly, for example, if the order port 130 crashes after sending the message to the sequencer, it may still resume functioning once the sequenced message for the yellow light is received (even though it may have no record of receiving such a message from a client system 114).

The command bus 111B of the data subsystem 110 is used by other modules to communicate messages to the matching engine 102 for sequencing. In general as used herein, messages that are communicated via the command bus are "Command" messages and may be referred to as Commands for ease of description. Thus, in the case of the traffic light example above, an Update Light Color Command could be communicated from the order port 130 to the matching engine 102 via the command bus when the light changes to yellow. In some embodiments, only the matching engine 102 will be able to listen and/or receive commands communicated on the command bus 111A.

It should be noted that different terms other than communicated may be used herein in connection with describing the communication of messages via the sequenced message bus 111A and/or the command bus 111B. Other terms include sent/sending, transmitted/transmitting, received/receiving, submit, picked up, and the like. In some implementations, the communication of messages via the sequenced message bus 111A may be carried out by broadcasting the messages. In other words, when broadcast, the messages are communicated to all destinations on the sequenced message bus 111A (or do not specify a specific destination). In some implementations, messages that are communicated from the matching engine may specify a specific destination (e.g., a specific feature module or other processing instance).

Accordingly, in general (and except for external communications and for communication of messages performed via the command bus 111B), as related to the communications relevant to the description herein, modules within the distributed computing system 100 receive and operate based on messages that are communicated from the matching engine 102 (or more specifically the sequencer 120 in certain examples) via the sequenced message bus 111A.

However, in some embodiments, other, non-sequenced data may also be communicated to the modules within the distributed computing system. For example, the incoming data feed 116 may be a separate part of the data subsystem 110 that communicates data to the modules in the distributed computing system 100. In other embodiments, data (or certain data) from the incoming data feed 116 may be sequenced.

Although not shown in FIG. 1A, the distributed computing system 100 may also include backup processing instances that may host or be configured to host any or all of the matching engine 102, sequencer module 120, matcher module 122, feature modules 150, order ports 130, outgoing data feed 132, or any other component or module that is executing within the distributed computing systems 100. In some embodiments, a backup matching engine is executing in parallel with a "primary" matching engine 102. In case of failure of the primary, the backup may automatically take over and continue processing. Other types of modules that may, in some embodiments, be included in the distributed computing system 100 and that are not shown in FIG. 1A include modules that handle routing to external electronic trading platforms, and/or other types of modules or computing systems.

The distributed computing system 100 may be composed of one or more computing nodes. In some embodiments, the one or more computing nodes may be implemented using the example computing device of FIG. 15. Each computing node includes its own computing resources (e.g., hardware components such as electronic memory or storage, input/output (I/O), hardware processors, and the like). In some embodiments, the computing nodes that comprise the distributed computing system 100 may be referred to herein as the "computing resources" of the distributed computing system 100.

The distributed computing system 100 includes a plurality of processing instances (which may also be referred to as "processing modules" or similar herein) that are distributed across computing nodes of the distributed computing system 100. Each processing instance includes program logic (e.g., in the form of software code, firmware, and/or hardware) that is used to process data, or otherwise provide the indicated functionality within the given processing instance. Any or all of the matching engine 102, the outgoing data feed module 132, one or more order ports 130, and any of the one or more feature modules 150 are examples of processing instances that can be implemented, hosted, and/or executed by the distributed computing system 100 in some embodiments.

Each processing instance in the distributed computing system 100 (including those noted in the preceding paragraph) may be implemented via program logic (e.g., in the form of software code, firmware, and/or hardware) that is used to process data that is stored and/or accessible by the given processing instance. The data may be stored locally in connection with the respective processing instance. Data may also be received to/from processing instances and/or transmitted onto the data subsystem 110 and/or to external systems as described. In some embodiments, two or more processing instances (e.g., one of which may be the matching engine 102) may be executed at the same computing node. In some embodiments, the two or more processing instances may be executed by the same processor or on the same core of a multi-core processor. In such cases, the processing instances may share the on-chip cache memory for faster processing.

Each of these various processing instances may be implemented in different ways—e.g., to take into account design considerations of the distributed computing system 100 and/or the task(s) a given processing instance is designed to perform. For example, in some embodiments, one or more processing instances may be implemented in the form of a software application (e.g., an .exe or a daemon computer process) that, when instantiated and executed, runs with its own computer process space using the underlying computing resources (e.g., processor(s), memories, and/or other hardware resources) of the distributed computing system 100. Alternatively or additionally, in some embodiments, different ones of the processing instances may be different threads or other sub-processes within a given computer process. In some embodiments, each, any, or all of the processing instances may be implemented by using a virtualized container or more full virtualized system. For example, each processing instance may be its own Docker container. Each virtual container may include the program logic that, when executed, carries out the tasks associated with that specific processing instance. Alternatively or additionally, in some embodiments, each, any, or all of the processing instances may be implemented as field programmable gate arrays (FPGAs) or Application Specific Integrated Circuits (ASICs). Alternatively or additionally, in some embodiments, a variety of the various approaches noted above for implementing these processing instances may be used; e.g., one processing instance may be implemented using a Docker container, another may be implemented as a software application that is running in a non-virtualized environment, and another may be implemented in the form of an FPGA. Accordingly, the techniques herein may be flexibly employed depending on the needs of a particular implementation for a distributed computing system and/or electronic trading platform.

3. Description of FIG. 1B

FIG. 1B shows an example of the different types of feature modules 150 that may be included in the distributed computing system 100 of FIG. 1A in some embodiments. In particular, FIG. 1B shows a series of example feature modules 150 that include a Reserve Feature Module 160, Discretion Feature Module 162, Market Peg Feature Module 164, Primary Peg Feature Module 166, Midpoint Peg Feature Module 168, Market Maker Peg Feature Module 170, Late Open Feature Module 172, and Parent Cancel Feature Module 174. In this example, the distributed computing system 100 may be used to trade instruments such as equities (i.e., stock), and so the following description will include corresponding language (e.g., describing quantity of orders in terms of numbers of shares, and by referencing the National Best Offer (NBO) and the National Best Bid (NBB), and so on); though it should be understood that equities are just one example asset that the features described herein may be used with.

As will be described in further detail below, some of the feature modules 150 may be designated as "owners" of a particular parent request. In certain embodiments, the feature module that is designated or determined (described in greater detail below) to be the owner for a particular parent request is the feature module that is responsible for generating and/or submitting the first child/native order for the particular parent request to the matching engine 102 to be processed. In some embodiments, a feature module that is an owner may be responsible for canceling the parent request or otherwise causing the matching engine 102 to issue a Parent State Message with a status of "Out."

The Reserve Feature Module 160 handles parent requests that have orders with a hidden or reserve component (these orders may also be referred to as "iceberg" orders). When the Reserve Feature Module 160 is the owner of a parent request, it may be responsible for submitting or causing at least two corresponding child orders to be processed by the matching engine 102. One of the child/native orders may be marked as hidden (e.g., the reserve portion), with the other child/native order marked as visible (e.g. not hidden). For example, a parent request for 1000 with 900 as reserve may translate to a hidden order for 900 and a visible order for 100. These may be separate orders tracked and managed by the matching engine 102. In some embodiments (e.g., as shown in FIG. 5), the hidden component of a reserve request is first submitted from the Reserve Feature Module 160 to the matching engine 102 for processing before the visible portion is submitted to the matching engine 102 for processing (or added to the order book 124). In some embodiments, and even when the Reserve Feature Module 160 is not the owner, the Reserve Feature Module 160 may be responsible for sending a "Split" Command message (which may also be referred to as a "Split Command") to the matching engine 102. The Split Command is used to split of a portion of quantity from the "hidden" order and generate a new order that has the split of portion of the quantity. For example, if a hidden order has 1000 quantity and a Split Command is received by the matching engine to cancel that quantity down to 900, then a new order (which is not hidden) will be generated for 100. The Split Command may be viewed as combining a cancelation command (e.g., to cancel some amount from the hidden order) and a new order command into one command for which the operations may be atomically performed by the matching engine 102. The Split Command may be used in connection with child/native orders (e.g., in connection with a request from a feature module 150) or unmanaged/native orders (e.g., as a request received from a client system).

In general, the operations performed by the Reserve Feature Module 160 may have the effect of ensuring that the total number of displayed shares (e.g., which may be split between multiple children for a given parent) is satisfied depending on the nature of the reserve.

In some embodiments, the Reserve Feature Module 160 may end up tracking or managing multiple different displayed child/native orders. This is because partial matches (i.e., those that do not satisfy the full amount of the displayed child order) may reduce the total display shares below some threshold amount. This causes the Reserve Feature Module 160 to issue another Split Command (even though there is a pending displayed child order) to increase the total displayed amount for the parent request (e.g., as a sum of the quantity indicated in the child/native orders associated with the correspond parent request).

The Reserve Feature Module 160 may store, to its local data store, the identifier for a parent request, the identifiers for the children of that parent request (e.g., an Order Identifier), a count of how many shares or the like are allocated to the pending child orders, and a total number of displayed shares for each parent.

The Discretion Feature Module 162 handles parent requests that include a discretion attribute. In general, discretion allows orders that are submitted at a submitted price to match against contra-sided orders that are within a given range of the submitted price. For example, if an order is submitted at a price of X, then it may still match at a more aggressive price level (up to a threshold indicated by the discretion attribute). The amount of discretion may vary as specified by the client on whose behalf the original order was submitted. In some embodiments, the discretion price may be a flat or absolute value. For example, if the submitted price is a bid of 100, a discretion price that is specified by the client may be 101. In other embodiments, the discretion amount may be a number of increments or ticks (e.g., a tick being a valid or matchable price level) from the submitted price. Accordingly, a submitted price may be 100 and the client specified discretion amount may be 5 ticks, where a tick is 0.1 or 0.01.

The Discretion Feature Module 162 may thus determine, for child orders that are associated with a parent request that includes a discretion attribute, if there are any contra-sided orders that the child order could match against at a more aggressive price level. The Discretion Feature Module 162 may store, to its local data store, the identifiers for parent requests that have discretion, the identifiers for the child orders of each parent request that has discretion, and a count of how many shares or the like are allocated to the pending child orders. The Discretion Feature Module 162 may also store its own version of an order book data structure that is based on messages received via the sequenced message bus 111A. The Discretion Feature Module 162 may use its own order book data structure to determine if any contra-sided orders are within the discretion range for a child order that is being tracked by the Discretion Feature Module 162. In some embodiments, the Discretion Feature Module 162 may also store a sequence number that is incremented each time a particular command that is communicated from Discretion Feature Module 162 to the matching engine 102 is successfully processed by the matching engine 102. This stored sequence number may be stored on a per parent request basis and updated upon the Discretion Feature Module 162 recognizing that a Trade Now Command has been processed by the matching engine 102. In some embodiments, this sequence number is a "Trade Now" sequence number and is associated with a "Trade Now Command" that is discussed in greater detail below in connection with FIG. 3. As discussed elsewhere herein, this sequence number may be used to prevent duplicate commands.

The peg feature modules (Market Peg Feature Module 164, Primary Peg Feature Module 166, Midpoint Peg Feature Module 168, Market Maker Peg Feature Module 170) are different feature modules that handle different types of pegging functionality. When requests are initially received in the system 100 from client systems 114 (e.g. OUCH peg orders of various types, such as Market Maker Peg orders, Primary Peg orders, and so on), the system 100 (e.g., the order port 130) may determine which of the peg feature modules will be associated with a parent request. That feature module will then be responsible for managing the pegging functionality that will be associated with the child/native orders that will be associated with the corresponding parent request. In general, the adjectives "peg," "pegging," and "pegged" may be used herein interchangeably; thus, "peg order," "pegging order," and "pegged order" may be used interchangeably, and "peg feature module," "pegging feature module," and "pegged feature module" may be used interchangeably.

Each of the peg feature modules 164, 166, 168, 170 may store, to its corresponding local data store, the identifiers for those parent requests that have the indicated peg attribute, the identifiers for the child order(s) of each parent request that has the indicated peg attribute, a count of how many shares or the like are allocated to the pending child orders, and, for each child order, a limit value that specifies the limit for how much the pegged value can vary (e.g., if it exceeds the limit value, then the child order may be canceled). Each or any of the peg feature modules 164, 166, 168, 170 may also receive and store the NBO and/or the NBB (which collectively comprise the NBBO). This data may be received from the matching engine 102 (e.g., via the sequenced message bus 111A), the incoming data feed 116 (e.g., from external electronic trading platforms, computing systems operated by regulatory bodies, or the like), or both. This data may be used to price the child orders that are being managed by the respective peg feature modules 164, 166, 168, 170.

The Market Peg Feature Module 164 is responsible for pegging the price attribute of a child/native order to a price that is relative to (or possibly at) the national best offer (NBO) or the national best bid (NBB). A market peg is the opposite of a primary peg in that market peg orders follow the opposite side of the market. For example, a sell order is set based on the NBB and buy orders are set based on the NBO. In some embodiments, the Market Peg Feature Module 164 may set the price of a child/native order based on the NBBO price, by offsetting from the NBBO price based on e.g. +/−a percentage, a flat amount, a number of ticks, etc.

The Primary Peg Feature Module 166 is responsible for pegging the price attribute of a child/native order to a price that is relative to (or possibly at) the NBO or NBB. A primary peg is the opposite of a market peg in that orders follow the side of the market that they are on. For example, a sell order is set based on the NBO and buy orders are set based on the NBB. In some embodiments, child/native orders managed by the Primary Peg Feature Module 166 may be set at the NBBO. In some embodiments (or depending on the attributes of a parent request), the Primary Peg Feature Module 166 may set the price of a child/native order based on the NBBO, by offsetting from the NBBO based on e.g., +/−a percentage, a flat amount, a number of ticks, etc.

The Midpoint Peg Feature Module 168 is responsible for pegging the price attribute of a child order to a price that is relative to (or at) the midpoint between the NBO and the NBB. Accordingly, for example, if the NBBO is 100-101, then the midpoint would be 100.5. In some embodiments, the Midpoint Peg Feature Module 168 may set the price for child orders it is managing to the midpoint of the NBBO. In some embodiments (or depending on the attributes of a parent request), a child order may be priced at an offset of the midpoint price (e.g., +/−a percentage, a flat amount, a number of ticks, etc.).

The Market Maker Peg Feature Module 170 manages pegging functionality of the system 100 that is available to market makers and may be used to assist market makers in meeting their quoting obligations under Rule 4613(*a*). Child orders that are managed by the Market Maker Peg Feature Module 170 may be initially priced at the level required by Rule 4613(*a*) based on the then prevailing NBBO, or if unavailable, a reported last sale. The clients may optionally specify a more aggressive price by specifying an offset (e.g., in terms of ticks or percentage, etc.). The parent request with a market maker peg may have a defined limit amount. When a child order is determined to reach the limit, the price for the child order may be adjusted by the Market Maker Peg Feature Module 170 away from the then-current NBBO (e.g., has a percentage, etc.), or if unavailable, the last sale. If a market maker peg order is submitted with an offset that is within the specified limit, the child order will be adjusted by the Market Maker Peg Feature Module 170 to that offset each time a new NBB or NBO is received. If the offset specified places the order outside of the order's limit attribute, then the child order may be canceled or rejected.

The Late Open Feature Module 172 is used to handle late on-open orders. The job of this feature module is to accept parent requests and place a child order into the opening auction order book (which may also be referred to as the "opening cross book," "cross book," "open book," "opening book," or similar). In general, the cross book and/or the open book is a type of order book 124 that allows clients to submit orders prior to "opening" of a market (e.g., prior to the matching engine 102 determining matches) that are designed to be executed at the open (e.g., 9:30 am EST) of a trading day. Thus, for example, one order book data structure holds orders that are "normal" (e.g., that are not necessarily designed to execute on the open); this may be referred to as the "continuous book." Another order book data structure may then hold orders that are designed to execute on the open of the market; this may be the open book. Upon open, both of these books may be combined to determine a cross price and match processing may be performed for those orders in the open book. If the parent request includes another feature, then upon completion of the handling of the open book, then the owner feature module may be changed to that other type of feature module for the parent request. This is discussed in connection with FIG. 14. In some embodiments, if there are no other features on the parent request, the child order may be submitted as discussed in connection with FIG. 2A and the parent request managed by the Late Open Feature Module 172 may be kept there until expiration, cancelation, or execution of the submitted child order for that parent request. Thus, the Late Open Feature Module 172 may remain the owner even if its primary "job" (e.g., handling a late on-open request) is complete.

The Parent Cancel Feature Module 174 is used to track parent requests and manage cancelation of such parent requests (along with all of their associated child/native orders) if one or more criteria are met. Some of the conditions/criteria that the Parent Cancel Feature Module 174 may analyze include: whether a child order that is managed by one of the peg feature modules has been repriced more than a threshold amount (e.g., 10,000 times, etc.); whether if there are not enough shares left on the remaining child orders (e.g., shares have been executed, canceled, etc. and only a few remain, less than a threshold amount); whether a parent request has been suspended for more than a threshold amount of time; if a parent request has exceeded a time in force (TIF) threshold. The Parent Cancel Feature Module 174 is used to track these various criteria and issue commands to the matching engine 102 to cancel parent requests that violate these criteria (which, in turn, may cause the matching engine to cancel all of the child orders as well).

In some embodiments, the same parent requests may be associated with multiple different feature modules (e.g., a single parent request is associated with both reserve and discretion). In such instances, a process of determining which feature module is the owner may be used—in other words, which feature module has priority for becoming the "owner" feature module. The priority for selecting the owner feature module starts from one of the peg feature modules 164, 166, 168, 170. This is because the price of an order submitted from a client is unknown at the time the request is submitted and also when the parent request is created by the matching engine 102 (e.g., at 216 in FIG. 2A). Placing the peg feature modules 164, 166, 168, 170 at the highest priority allows for the child orders to be booked immediately upon processing by the respective feature module (e.g. at 224 in FIG. 2A). Next in priority is the Reserve Feature Module 160, and then the Discretion Feature Module 162. Accordingly, for example, if a data transaction request that is received from a client indicates that the request should be handled with peg, reserve, and discretion functionality, then the feature module that corresponds to the type of peg will be selected as the owner. In an embodiment that includes the use of the Late Open Feature Module 172, the Late Open Feature Module 172 may be the owner for parent requests that include pegging functionality. As discussed elsewhere herein, the process of selecting which feature module will be the "owner" may be handled by the order port 130. In some examples (e.g., when features associated with an existing parent request are changing), the process of determining the owner may be performed by a feature module (e.g., the old "owner").

Although not shown in FIG. 1B, in some embodiments additional feature modules 150 may be included in the distributed computing system 100; such additional feature modules 150 may include a feature module that handles IPO offerings, a feature module that is configured to handle execution of orders at a particular time (e.g., execute an order at 3 pm), and/or other feature modules.

With the architecture of the distributed computing system 100 shown in FIG. 1A and FIG. 1B, the feature modules 150 are able to manage complex managed orders (such as discretion orders, peg orders, and so on, as well as orders that have multiple complex attributes, such as an order that operates with discretion, pegging, and reserve all at the same time), while having other processing (e.g., potentially less complex processing, which may include logic for processing unmanaged/native orders) reside in the matching engine 102. In some embodiments, the matching engine 102 is required only to "know" how to perform matching processing for native orders; in such embodiments, the program logic for the matching engine 102 may not include program logic such as (a) the program logic described herein as attributed to the Reserve Feature Module 160 for managing reserve (e.g., for ensuring that the proper number of shares is displayed), (b) the program logic described herein as attributed to the Discretion Feature Module for managing discretion (e.g., for determining if there are contra-sided orders for matching against), and/or (c) the program logic described herein as attributed to the peg feature modules 164, 166, 168, 170 for managing pegging (e.g., for pegging against a reference price). The architecture discussed herein allows for increases in the system 100 in terms of functionality (e.g., new orders with elaborate behaviors can be added via new feature modules 150), while allowing the implementation of the matching engine 102 to remain focused on quickly processing native orders. This can substantially improve the flexibility, maintainability, and performance of the distributed computing system 100.

4. Description of FIG. 2A

FIG. 2A is a sequence diagram that shows a process by which, in some embodiments, data transaction requests may be received by the system 100 and how initial processing around a new parent request is performed. FIG. 2A shows how, in some embodiments, system 100 arrives at an initial state to begin management of a new parent request. The process shown in FIG. 2A may be referred to as "booking" a new parent request. As will be described in further detail below, a number of subsequent Figures describe operations of the system 100 after the process of FIG. 2A is performed (e.g., after a parent request is booked with system 100).

At 210, the client system 114 sends an electronic data message to the distributed computing system 100, and the message is received by the order port 130 in the distributed computing system 100; this message may be a data transaction request message. In some embodiments, this communication from the client system to the order port is performed using one or more a communication protocols. In some embodiments, communication such as the OUCH protocol may be used. In some embodiments, the FIX protocol may be used. In some embodiments, the SOUP protocol, or other protocols (e.g., transport layer protocols, such as TCP, and the like) may be used to facilitate delivery of messages to/from order port 130 that are in the OUCH (or FIX) message format. The order port 130 that received the message may be dedicated for the client on whose behalf the client system 114 operates. The message may include details of a new order that the client is submitting and may indicate one or more features for the new order. For example, data in the message (e.g., one or more fields) may specify that the order is to pegged to the midpoint and/or that the order can execute with discretion, etc. As discussed below, the features or attributes provided by the client in the order may then be used by the order port 130 to determine how the order should be handled by the system 100.

At 212, the order port 130 processes the received message. The processing at 212 may include determining what type of data transaction request has been communicated from the client system 114. As noted herein, different types of requests can be communicated from client system(s) 114. For example, the message may include a request to cancel an existing order, modify an existing order, cancel an existing order, add/create a new order, or otherwise handle an order (whether new or existing).

In the example of FIG. 2A, the processing at 212 includes the order port 130 determining that the message communicated from the client will be handled as a managed/parent request or an unmanaged/native request based on the contents of the message (e.g., based on one or more fields in the received message that indicate whether the message relates to a "feature," such as reserve, discretion, pegging, etc.). As an example, the message may include data (e.g., one or more fields) that indicate that the message has a "reserve" attribute or a discretion attribute. The order port 130 may determine, based on this data in the message, that this type of order (a reserve order or an order that has reserve in this example) may be classified as a parent request by the order port 130.

In addition to determining whether the message will be handled as a parent request or an unmanaged request, the order port 130 may also determine at 212 (e.g., when a request has been determined to be handled as a parent request) what feature module(s) 150 and/or what type(s) of feature module(s) 150 will be the "owner" of this parent request. In some instances, only one feature module 150 will be involved in the management of a parent request. In such a case, that parent request will be owned by that feature module 150. In other instances, the management of a parent request may involve processing by multiple different feature modules 150. For example, a parent request may involve reserve, discretion, and a market peg; in such an example, the order port 130 may determine which of the multiple feature modules 150 is to be the owner for that request. Details of this prioritization as discussed above.

The processing performed at 212 may also include performing symbol lookup information based on data stored in data store 140B and/or any information related to the client that submitted the request (e.g., they are a market maker, etc.).

Based on the processing performed by the order port 130 at 212, a message (which may be referred to a "New Parent Request Command" message or simply a "New Parent Request Command") is generated by the order port 130 and transmitted to the matching engine 102 at 214. This message may be communicated via the command bus 111B of the data subsystem 110 to the matching engine 102. In various embodiments, this message may include info such as: (a) the data included in the original message received at step 210 (including e.g., order information), or any portion thereof; (b) details such as the symbol lookup information performed by the order port 130 based on data store in data store 140B and/or any information on the client (e.g., they are a market maker, etc.) that submitted the request; (c) data indicating which feature module(s) will be involved in handling the parent request; and (d) the information indicating which feature module 150 is the owner for the request.

It will be appreciated that, in some embodiments, the New Parent Request Command may be different from the original message received at the order port 130 at 210. In other words, in some embodiments, the New Parent Request Command is not simply the order port 130 forwarding the original message to the matching engine 102. Instead, in such embodiments, the New Parent Request Command is an entirely new message generated by the order port 130, based on the contents of the original message and how the order port 130 has processed the original message those contents at 212. Alternatively, in other embodiments the New Parent Request Command may be the originally-received message, but then annotated by the order port 130 with additional data (e.g., the owner, the type of request, etc.) based on the processing performed by the order port 130 at 212.

In some embodiments, once the New Parent Request Command is sent along to the matching engine 102 for processing, the order port 130 may store no data regarding the message (e.g., in 140B) and thereby effectively "forget" about the contents of the message (either or both of the message received at 210 and the command communicated at 214). However, the order port 130 may store data in response to reception of sequenced message(s) received from the matching engine 102 (e.g., at 218). On the other hand, in some embodiments, the order port 130 may store the transmitted New Parent Request Command (or portions thereof), and/or or keep track of the fact that the New Parent Request Command was sent to the matching engine 102 for processing.

In a variation on the example that is shown in FIG. 2A, in some instances the message received by the order port 130 at 210 may, rather than relating to a parent order, instead relate to an unmanaged/native order. In such an instance, instead of generating a New Parent Request Command as described above, the order port 130 generates a different command message that describes the native order (this different command message may be referred to as a "New Native Order Command message," "New Native Order Command", "New Unmanaged/Native Order Command," or similar) and then transmits that New Native Order Command to the matching engine 102 via the command bus 111B. Upon receipt of the New Native Order Command, the matching engine 102 may proceed to accept the command and then perform further processing based on the contents of the command. For example, if the New Native Order Command indicates a request to add a new unmanaged/native order, then the matching engine 102 may perform match processing (e.g., attempting to find a match for the new unmanaged/native order or adding it to the order book 124) for the New Native Order Command upon reception (e.g., without handling or processing other tasks between starting to process of the message (e.g., sequencing it) and performing match processing). In some examples, commands communicated to the matching engine 102 may be buffered or queued until the matching engine 102 is able to start processing them. In some examples, a circular buffer may be used to buffer incoming commands until they are processed by the matching engine 102.

Returning to the example in FIG. 2A, the New Parent Request Command is accepted and processed at 216 by the matching engine. The processing performed at 216 is referred to herein as "new parent processing" or the "new parent process" and may include, as will be described below, operations for (a) generating a new parent identifier, (b) generating and storing information that is related to the new parent request, (c) generating or determining a "parent locate identifier" (which will be described below), and/or (d) other relevant operations. In some embodiments, the parent identifier may be a sequence number (e.g., such that each successive parent identifier is greater than a previously generated parent identifier). In some embodiments, generation of the parent identifier may rely on taking a number from a common "pool" of numbers from which identifiers for both parent requests and native orders are generated. In some examples, the identifiers may be generated such that each successive identifier that is generated is increased in value relative to the last-generated identifier (e.g., which may be used to infer a sequence in which each parent request and/or native request was first received by the matching engine 102). For example, the first request (whether for a new parent request or a new native request) that is processed during a day may be 1, and each successive parent or native request may be incremented/increased from that initial value. The new parent processing may include the matching engine 102 storing data to data store 126 (e.g., parent data store) regarding the parent request. Data store 126 may be located in local memory (e.g., cache memory, RAM, volatile or non-volatile memory, etc. that is accessible on the computing device that is hosting or otherwise executing the matching engine 102) that is accessible by the matching engine 102. Data that is stored in data store 126 (e.g., as part of the new parent process) may include the generated parent identifier, information that identifies the type(s) of feature modules that will be handling the parent request, an identifier of the feature module that is the owner, and/or other data. The data that is stored in the data store 126 by the matching engine 102 may also include a number of shares in the initial request, the number of shares remaining (which may also be referred to as "leaves"), the number of shares executed (e.g., across all of the child orders for this associated parent request), the number of shares canceled by anti-internalization (AIQ), and/or other information. This quantity-related information may be used to ensure that any child/native order associated with this parent request does not exceed available leaves (which may be checked upon subsequent submission of such a child/native order to the matching engine 102). This data stored in data store 126 may be stored using a data structure such as a linked list, array, or other data structure type.

The location of where the data is stored in memory (e.g., the in-memory location) and/or within the data structure may also be noted for future use using a data element referred to as a "parent locate identifier." (e.g., to facilitate quicker access for future retrieval of the data within the data structure) For example, if the data structure used to store data for a parent request is an array, then the parent locate identifier may be the index for where the data for a given parent request is located within that array; if a different type of data structure is used, then an analogous type of parent locate identifier may be used for that different type of data structure.

At 218, based on/in connection with the new parent processing performed at 216, the matching engine 102 generates a New Parent message at 218 and sends (e.g., broadcasts) the message via the sequenced message bus 111A to indicate that the New Parent Request Command has been accepted by the matching engine 102 (and the system 100). As with other messages that are sent via bus 111A, this New Parent message may be received by all of the feature modules 150, and/or all of the other modules in the system 100 that are listening on the bus 111A, including feature modules 150/other modules in the system 100 that are not shown in FIG. 2A. This New Parent message may include the generated parent identifier, the parent locate identifier, and/or an identifier that identifies the "owner" (which feature module is the owner) of the parent request corresponding to this New Parent message (which may be as indicated in the New Parent Request Command from 214). In some embodiments, the fields or attributes of the New Parent message may be used by the feature modules 150 receiving such a message to determine if they should process (e.g., react to) the message. For example, a New Parent message with a Max Floor field set to a non-null or non-zero value may indicate this new parent request has some reserve functionality (which would be handled by the Reserve Feature Module 160). In another example, a discretion field may have a non-null or non-zero value to indicate that the Discretion Feature Module 162 may operate on the message. In another example, a peg type field of the New Parent message that is non-null or non-zero may be used to indicate that one of the peg feature modules 164, 166, 168, 170 is responsible for pegging for this parent request (with the specific type value of the peg field indicating which peg feature module 164, 166, 168, 170 is responsible for the pegging functionality for this parent request). In some embodiments, the owner identifier information may be indicated in the New Parent message using a multi-bit field, where each number represents a different feature module. Alternative or additionally, in some embodiments an alphanumeric code may be assigned to each feature module type (e.g., the characters "AA" are used to identify the Discretion Feature Module 162, or "R" is used for the Reserve Feature Module 160, and/or "P" for the peg feature modules 164, 166, 168, 170).

In some embodiments, the New Parent message may also include a bit array, parameter, or other field that is used to identify all of those feature modules that will participate in managing this new parent request. For example, each bit in the array may correspond to different feature modules 150. Accordingly, the various feature modules (including non-owner feature modules) 150 may recognize whether or not they will be performing processing for this new parent request. Upon receiving the New Parent message, the non-owner feature modules 150 may generate a record and store the parent-specific information for this parent request (e.g., the parent identifier, parent locate identifier, etc.). Accordingly, when future messages are transmitted over the sequenced bus 111A that reference that parent identifier (such as part of order accept, order execute, etc. messages from the matching engine 102), the various feature modules may take appropriate action.

The information included in the New Parent message regarding which feature modules are to be associated with a parent (or its child) may be used by the feature modules 150 to both (a) identify to those feature modules 150 who are not the owner that they will nonetheless be handling some aspect associated with this parent request and (b) assist in letting a given feature module 150 determine which other feature modules 150 are associated with this parent request. This information can be relevant, for example, when the processing that is performed by a first feature module 150 may depend on whether a second feature module 150 is also operating on child orders of the parent request. One example of this would be where a parent request includes both reserve and discretion attributes. In such a case, the Discretion Feature Module 162 may use this information to prioritize matching the hidden child order ahead of the visible child order.

In some embodiments, the feature module 150 that is the owner of a parent request may be responsible for, in accordance with the behavior required by the feature type (e.g., reserve, discretion, peg, etc.) and/or other characteristics of the parent order, the following: (a) generating and submitting one or more initial child/native data transaction requests to the matching engine 102; and (b) based on data changing within the system 100 (e.g., the initial one or more child/native transaction requests being executed or canceled, and/or other state within the system 100 changing, such as other data in the order book 124 changing), generating and submitting one or more initial child/native data transaction requests to the matching engine 102. The owner feature module 150 may also perform operations to ensure that there are enough shares allocated to child orders of the parent request (e.g., in the case of parent request with reserve).

In some embodiments, the responsibilities of a feature module that is an owner may not involve creating or submitting one or more child/native orders to the matching engine 102, but rather may instead relate to taking some other action(s) (e.g., routing an order to another electronic trading platform, pinging one or more services, holding for a given amount of time or until a set time—for example in the case of an IPO or the like, etc.). In some embodiments, the feature modules 150 that are not owners that are determined to be associated with a parent request may operate by reacting to data received (e.g. via the sequenced message bus 111A) for the child/native order that is being processed by the matching engine 102. One way to view the differences between owner and non-owner feature modules 150 is that the owner feature module 150 may take action (e.g., being active) based on the requirements of the given parent request, whereas a non-owner feature module 150 may wait to take action (e.g., being reactive) until additional data is received regarding any child orders that relate to the parent request.

In some examples, when messages are communicated via sequenced message bus 111A from the matching engine 102, each of the feature modules 150 in the system 100 may review each of the messages and determine, based on the message's contents, whether that feature module 150 should take action based on the message. In this example, each of the feature modules 150 may analyze the type of the message (i.e., that it is a "New Parent" message) and the owner identifier included therein, to determine whether that feature module should action based on the message. Thus, for example, both Feature Module A 200 and Feature Module B 202 receive and analyze the New Parent message at 218 to see if they should do any further processing. In this case, Feature Module A 200 determines, based on the contents of the New Parent message, that it is the owner of the new parent request and performs further processing at 220. Feature Module B 202 may also look at the message and determine that it is to be associated with this parent request. Additional processing that may be performed for the various different types of features (e.g., discretion, reserve, etc.) are discussed in greater detail in connection with the Figures discussed below.

Order port 130 may receive the New Parent message that is communicated at 218 and store the data related to the new parent request in local memory 140B of the order port 130. For example, the order port 130 may store the parent locate identifier and the parent identifier, along with the data that was stored as part of 212. At 222, the order port 130 may also communicate a request accepted message (e.g., an acknowledgement or acceptance message, such an OUCH accepted message) back to the client system 114, to indicate that the distributed computing system 100 received the request that was submitted by the client at 210 and has accepted that new request for processing.

As noted previously, when a new parent request is generated and then subsequently communicated via the sequenced bus 111A at 218, the feature module that is to be owner of the new parent request is responsible for overseeing/managing that parent request. Also, as noted previously with respect to the example of FIG. 2A, Feature Module A 200 may determine at 220 that it is the owner of the new parent request based on the contents of the New Parent message.

At 224, based on and/or in response to the determination from 220, Feature Module A 200 may generate a New Child Data Transaction Request Command message (which may also be referred to as a "New Child Data Transaction Request Command") and communicate the New Child Data Transaction Request Command to the matching engine 102 via the command bus 111B. This New Child Data Transaction Request Command may specify a new child/native order for the matching engine 102 to process. The exact contents of the New Child Data Transaction Request Command may vary depending on the which type of feature module 150 is generating the request. The New Child Data Transaction Request Command may include a value for a quantity parameter, a value for a price parameter, whether the order is to be hidden or not, and the like. The New Child Data Transaction Request Command may also indicate the parent identifier of the parent request. The New Child Data Transaction Request Command may include data that is similar to data that is included in commands to add new unmanaged/native orders. This new native data transaction request that is specified in the New Child Data Transaction Request Command can be thought of as the "child" of the parent request that is being managed by Feature Module A 200.

At 226, the New Child Data Transaction Request Command is received by the matching engine 102. The matching engine 102 may use the information in the New Child Data Transaction Request Command to both determine (a) that this request is for an order that is to be associated with the indicated parent request (e.g., a "child" order) and (b) to associate (by storing data in data store 126) the new data transaction request (the child order) to the parent request (e.g., based on the provided parent ID). In some embodiments, the matching engine 102 may validate the quantity included in the new order upon reception to ensure that no more than the quantity that is stored in data store 126 for that parent identifier is being used for the quantity of this child order. In other words, the matching engine 102 may validate that the quantity value included in the New Child Data Transaction Request Command is valid with respect to the total quantity remaining for the overall parent request (e.g., the initial quantity specified when the parent request was first processed, e.g., at 216, minus any quantity that has already been matched and/or is currently pending in order book 124).

The matching engine 102 may than create an order identifier for the new child/native order that is stored in association with the earlier-stored parent data for the parent request (e.g., in data store 126).

At 228, the matching engine 102 generates a New Native Data Transaction Request Accepted message (which may also be referred to as a "New Order Accepted" message, "New Native Order Accepted" message, "Order Accepted" message, or similar) that indicates that the new native request/order has been accepted, and transmits this message via the sequenced message bus 111A. (As with other messages that are sent via the bus 111A, this New Native Data Transaction Request Accepted message may be received by all of the feature modules 150, and/or all of the other modules in the system 100, that are listening on the bus 111A, including feature modules 150/other modules in the system 100 that are not shown in FIG. 2A.) This New Native Data Transaction Request Accepted message may include the parent identifier of the parent request, the order identifier of the new child/native order, and the locate identifier for the new child/native order. This message is then communicated out via sequenced message bus 111A. In some embodiments, the New Native Data Transaction Request Accepted message is also used by the matching engine 102 upon acceptance of an unmanaged/native order, with the difference in how the New Native Data Transaction Request Accepted message is used or generated being only in how certain fields are populated. For example, the New Native Data Transaction Request Accepted message may include a "parent" field. When the matching engine 102 uses this message to report an unmanaged/native order, the "parent" field may be set by the matching engine 102 to have a null value (or zero), in contrast to the field being set to the value of the identifier of the corresponding parent request when a child/native order is processed.

In some embodiments, after accepting the child/native data transaction request, the matching engine 102 at 226 (or after 226 once the message at 228 has been communicated) may also perform match processing to determine if there is a match against other data transaction requests that are resting in order book 124. In an instance where the matching engine 102 determines that the accepted child/native data transaction request cannot be matched against any other resting native data transaction requests, the matching engine 102 may add the accepted child/native data transaction request to the order book 124. As a variation on the foregoing, the matching engine 102 may, at 226 (or after 226 once the message at 228 has been communicated), directly add the accepted data transaction request to the order book 124 (i.e., without performing match processing). In some embodiments, the handling of a child/native data transaction request by the matching engine 102 for match processing at 226 (or after 226 once the message at 228 has been communicated) is the same as for an unmanaged/native data transaction request. In other words, the matching engine 102 may treat, for purposes of match processing, unmanaged/native data transaction requests the same as child/native data transaction requests.

As with other messages on the sequenced message bus 111A, the various feature modules 150 may act on the New Native Data Transaction Request Accepted message after receiving it, in accordance with the data it contains. In the example shown in FIG. 2A, Feature Module A 200, which is the owner, may receive the New Native Data Transaction Request Accepted message at 228 and then update its own internal data store 140C with the identifier (order identifier) of the child/native order as indicated in the New Native Data Transaction Request Accepted message. At 236, Feature Module B 202, which may (even though it is not the owner of the parent request) perform activities related to the management of the parent request and so be "interested" in activity related to the child/native orders of that parent request, also updates its internal data store with information regarding the child/native order as indicated in the New Native Data Transaction Request Accepted message. In any case, at 234 and 236, Feature Module A 200 and Feature Module B 202 (along with other feature modules 150 not shown in FIG. 2A) may, upon receipt and analysis of the New Native Data Transaction Request Accepted message, take appropriate action/perform appropriate operations.

Note that the processing being performed by the various components shown and/or discussed in connection with in FIG. 2A (and in connection with the other drawings discussed herein) generally indicates a logical ordering of when the various operations are performed. Thus, for example, the communication of the message at 222 occurs logically after the message that is communicated at 218. However, the communication of the message at 222 does not logically occur after the processing performed at 220. Instead, 220 and 222 may be considered to occur logically in parallel (or one is not dependent on the other), regardless of when (temporally) the message at 222 is sent (before, during, or after such processing at 220). Similar logical and temporal timings are present throughout the description herein.

Returning to FIG. 2A, the order port 130 may also receive the New Native Data Transaction Request Accepted message. In some embodiments, the order port 130 may store an identifier (e.g., the order identifier) for the child data transaction request with the information (e.g., in data 140B) regarding the original parent request.

At 238, the order port 130 may generate and transmit a Restatement message to the client system 114. The Restatement message may be communicated by, for example, the OUCH protocol. The Restatement message 230 may include the order identifier of the child/native order that was accepted and may subsequently be used by the client system 114 to identify messages sent via outgoing data feed 112 (which will use the same order identifier). In some embodiments, the outgoing data feed 112 may be an ITCH data feed and the client system 114 may monitor the outgoing data feed 112 for ITCH messages related to the child/native order, by using the same order identifier as communicated in the Restatement message. As noted above, the Restatement message may include an order identifier for the child/native order; additionally, the Restatement message may include a client or user reference number (e.g., specified by the client system upon submission of the original request and included in the initial received request message(s)), an identifier for the relevant parent request, a quantity for the child order, and/or a price for the child order. (For brevity, it should be understood that the other Restatement messages discussed in this specification (as shown in and described with reference to FIG. 4, FIG. 5, FIG. 11, and FIG. 13) may also include one or more fields that include this data.) In certain examples, a Restatement Message may not be sent for messages that relate to orders with hidden properties. Thus, for example, if the parent request is for a reserve order, then no restatement message may be communicated in response to the message at 228. Instead, as discussed in connection with FIG. 2B, a message may be communicated later (e.g., in connection with reception of the Split Message by the order port 130).

It should be appreciated that, between the new parent processing at 216 and the order processing at 226 (including match processing), other messages or commands may have been processed by the matching engine 102. In other words, the processing performed at 216 and 226 may not be atomic.

As noted above, the matching engine 102 may perform matching processing at (or after) 226, which, if the child/native order cannot be matched, may result in the accepted child/native order being placed in the order book 124. But in instances where such matching processing does result in a match, then the matching engine 102 may perform additional processing and/or transmit additional messages (beyond those shown in FIG. 2A) to reflect that the match has been made.

5. Description of FIG. 2B

FIG. 2B is a sequence diagram showing a process that builds on the process shown in FIG. 2A. More specifically, FIG. 2B shows additional processing that may be performed after the processing shown in FIG. 2A, in an instance where the managed/parent order that is processed or otherwise "booked" in FIG. 2A has a reserve feature.

As noted above, the process of FIG. 2B is performed after the process shown in FIG. 2A is performed on a managed/parent order that has a reserve feature. In such an instance (i.e., when the subject of FIG. 2A is a managed/parent order that has a reserve feature), the process shown in FIG. 2A may include the following variations on what is shown in FIG. 2A and has been described above.

At 224, the New Child Data Transaction Request Command message may, in addition to the characteristics of this message described above with reference to FIG. 2A, include one or more fields indicate that the order represented by the message is hidden/not displayed (e.g., visibility field or the like where a "hidden" field that is set to true, a "displayed" field set to a value of "false," etc.).

At 228, the New Native Data Transaction Request Accepted message may, in addition to the characteristics of this message described above with reference to FIG. 2A, include one or more fields that indicate that the newly-accepted child/native data transaction request is hidden/not-displayed (e.g., it may include a "hidden" field that is set to true, or a "displayed" field set to a value of "false", etc.). This data may be used by the outgoing data feed 132 and/or the order port 130 to assist in determining how messages that are communicated to external systems should be handled. For example, if the message relates to a "hidden" order, then the outgoing data feed 132 may not report the action (e.g., because is hidden).

As noted above, at 234 in FIG. 2A, any of the feature modules 150 in the system 100 may have been listening on the message bus 111A and received the New Native Data Transaction Request Accepted message, which may include data regarding the accepted child/native order. Returning now to FIG. 2B, in an instance where the parent request that is "booked" in FIG. 2A has a reserve feature, the Reserve Feature Module 160 is one of the feature modules 150 that would have received the New Native Data Transaction Request Accepted message. Note that this is the case even in an instance where the Reserve Feature Module 160 is not the owner of the parent request; e.g., where one of the peg-related feature modules 164, 166, 168, 170 is the owner. In other words, in an instance where the Reserve Feature Module 160 was the owner of the parent request, the Reserve Feature Module 160 will have played the role of/performed the actions performed by Feature Module A 200 as shown in and described with reference to FIG. 2A; but in an instance where the Reserve Feature Module 160 was not the owner of the parent request, then the Reserve Feature Module 160 will have played the role of/performed the actions performed by Feature Module B 200 as shown in and described with reference to FIG. 2A.

At 250, the Reserve Feature Module 160 determines, based on the contents of the New Native Data Transaction Request Accepted message from 228 of FIG. 2A (e.g., based on its parent identifier, order identifier, hidden/displayed fields being populated, etc.), that the child/native data transaction request of the New Native Data Transaction Request Accepted message is associated with a parent request that has a reserve feature. This determination may be based on the reception of the new parent message 218. The Reserve Feature Module 160, responsive to and/or based this message, generates and transmits to the matching engine 102, via the command bus 111B, a Split Command message (which may also be referred to as a "Split Command") at 250. The Split Command is a command that indicates to the matching engine 102 that the matching engine 102 should cancel an amount of the indicated native order based on a max floor (e.g., the number of shares that are to be displayed) and generate a new order, which is set to visible, to be entered by the matching engine 102 with the canceled quantity. The max floor may, in some examples, indicate how many shares, for a given parent request, are to be associated with child orders that are "visible" (e.g., that are not hidden). In some examples, the amount that is removed or canceled from the hidden order may be additionally based on, for example, a random value. For example, if the cancelation is for 100, the matching engine 102 may automatically modify this amount by a randomly determined amount (e.g., within, for example, 10%). In some examples, this functionality of canceling some random amount may be handled by the Reserve Feature Module 160. Accordingly, the amount that is included in the Split Command that is sent to the matching engine 102 may already have been affected by the "random reserve" functionality described above.

At 252, the Split Command is processed by the matching engine 102. In response to the Split Command, the matching engine 102 may cancel the hidden child/native order down to the indicated quantity and also create a new child/native order. As reflected in connection with the above discussion of cancelation processing, this "canceling down" may include the matching engine 102 updating the data in the order book 124 that represents the hidden child/native order, by e.g. updating the value in the quantity field for the hidden child/native order. Accordingly, for example, if the hidden child/native order has a quantity of 1000 and the request was to have 50 "displayed" (e.g., the max floor) then the matching engine 102 will cancel 50 from the hidden child/native order and generate a new child/native order for 50 that will be visible in the order book 124. The matching engine may then process the newly created child/native order, with a new order identifier that has been generated by the matching engine 102, by performing match processing to determine if it matches against any contra sided orders that are resting in the order book. If matches are identified, then they may be processed (e.g., which may create further messages to report the match, etc.). If no matches are identified, then the newly created child/native order may be added to the order book and become a resting order.

Note that in some instances, the amount indicated in the Split Command received by the matching engine 102 may be different than the quantity removed from the hidden order and/or added to the new child/native order. This may occur due to the random reserve functionality discussed above, and/or because the quantity remaining in the hidden order is less than the indicated split quantity.

At 254, the results of executing the Split Command are reported out via the sequenced message bus 111A by the matching engine 102 generating and sending a Split message. The Split message may include the order identifier for the new (displayed) order, the cancel down amount (e.g., the amount displayed in the new child/native order and/or canceled from the native order that is hidden), the parent identifier, and/or other information.

At 256, the order port 130 may process the Split message from 254. This processing may include the order port 130 determining that a new order has been created and is now being displayed in the order book 124. This may also include the order port 130 generating a Restatement message and transmitting the Restatement message to the client system 114. This Restatement message may include data identical or similar to, mutatis mutandis, that discussed as included in the Restatement message at 238. In certain examples when the parent request is for a reserve order, the Restatement message at 238 is not transmitted to the client system 114 because e.g., because the order indicated in the message is "hidden." Instead, the client may be notified via the Restatement message at 256 that is for the "displayed" part of the client's reserve order. In some embodiments, a Restatement message may be communicated to the client upon reception of any or all of messages 506, 511, and 522 by the order port 130 (e.g., to inform the client of the identifier of the newly created child order). In some embodiments, Restatement messages are not sent for those orders that are hidden (e.g., in response to 506).

In some embodiments, a Restatement message may be communicated to the client when any type of new order has been added to the order book (e.g., whether a child/native or unmanaged/native order).

In some instances, there will be, following the processing of FIGS. 2A and 2B, data representing two child/native orders stored in the order book 124 that are associated with the originally-received (and now "booked") parent request. Specifically, stored in the order book 124 will be (a) a hidden child/native order (now with its quantity reduced, as described at 252), representing the hidden or "reserve" part of the client original request and (b) a child/native order representing the "visible" part of the original request. Both of these child/native orders may be associated with a corresponding parent request by having their identifiers maintained and stored by the matching engine 102 (e.g., in data store 126).

6. Description of FIG. 3

FIG. 3 is a sequence diagram that focuses on example operations that the Discretion Feature Module 162 may, in some embodiments, perform in connection with managing a booked managed/parent data transaction request that has a discretion feature.

In general, the Discretion Feature Module 162 provides functionality that allows orders that have been submitted to the matching engine 102 to function with "discretion" in that a match may be determined at other than the listed price of the order. In some embodiments, as will be described below, this is accomplished by having the Discretion Feature Module 162 submit a new IOC order to the matching engine 102 upon determining that a match could be made at a discretion price.

The processing shown in FIG. 3 may be performed after a parent request has been "booked." The processing shown in FIG. 3 may be performed where the Discretion Feature Module 162 is the "owner" of the parent request, or where it is not the owner (e.g., another one of the feature modules 150, such as the Reserve Feature Module 160, is the owner). In some embodiments, the parent request may have been booked in accordance with FIGS. 2A-2B; in an instance where the Discretion Feature Module 162 is the owner of the parent request, the Discretion Feature Module 162 may have played the role of/performed the actions performed by Feature Module A 200 as shown in and described with reference to FIGS. 2A-2B; in an instance where the Discretion Feature Module 162 is not the owner of the parent request, the Discretion Feature Module 162 may have played the role of/performed the actions performed by Feature Module B 202 as shown in and described with reference to FIG. 2A-2B. As discussed above, the Discretion Feature Module 162 allows for child orders to be matched at values other than the displayed price (e.g., a value) of the child order. Different types of discretion handling (e.g., limit, various peg types, with an offset or without, etc.) may be supported by the Discretion Feature Module 162.

In order to perform timely calculations of whether a child/native order that has discretion can match with other contra-sided orders, at 300 the Discretion Feature Module 162 may store, in its local data store (e.g., 140N), its own version of the order book 124 that is used by the matching engine 102; this may be referred to as the Discretion Feature Module's 162 "local order book" or "local order book data structure." This local order book is maintained within local memory for the Discretion Feature Module 162 and may be generated and maintained based on messages received, via the sequenced message bus 111A, from the matching engine 102 that reflect the state of the matching engine's 102 order book 124. In some embodiments, each action that modifies or otherwise affects the order book 124 that is stored at the matching engine 102 may result in a corresponding sequenced message that is transmitted by the matching engine 102 via the sequenced message bus 111A; such messages may then be picked up by any of the feature modules 150 that are interested. Using this information, the Discretion Feature Module 162 may process each message to construct and maintain (at 300) its local order book to mirror (wholly or in some respects) the state of the order book 124. In some embodiments, the local order book data structure may store only a portion of the data that is in order book 124. For example, just price, size, and the timestamp of each order may be stored. In other examples, order book 124 may be fully mirrored. In yet other embodiments, the local order book may include different information from what is stored in the matching engine's 102 order book 124, in addition to the information (or a subset thereof) that is stored in order book 124.

At 302, the Discretion Feature Module 162 receives one or more sequenced messages from the matching engine 102 via the sequenced message bus 111A.

At 304, the Discretion Feature Module 162 determines, responsive to and/or based on the one or more received messages, whether a trigger condition has been satisfied at 304. (A "trigger condition" may also be referred as a "triggering condition," "condition," or similar; and the satisfaction of a condition may also be referred to as a condition being "met," "triggered", "activated," "detected," or similar.) As one example, a trigger condition may be satisfied when the message(s) relates to a new native order that has been processed by the matching engine 102 and this new native order is contra to a child/native order that is being managed by the Discretion Feature Module 162. As a variation on what is shown with respect to 302 in FIG. 3, the Discretion Feature Module 162 may receive message(s) (via the incoming data feed 116) that reflect a move in market data (e.g., a change in the NBBO) that affects a possible discretion calculation; in such an instance, the determination of whether the trigger condition has been met can alternatively or additionally be based on this data received via the incoming data feed.

Note that there may be instances where multiple different child orders could trigger the generation of a Trade Now Command based on the same message being received and processed by any one of feature module(s) 150. As an example, a new order may be added to the order book and the message concerning its addition communicated at 302.

In such an example, a single parent request may have multiple children that each may (potentially) match with discretion against this new order. Similarly, multiple different parent requests may have children that may (potentially) match with discretion based on this new order (and the triggering condition). In connection with such situations, different approaches may be used. As a first option, only a single Trade Now Command may be communicated per message that is received at 302 and triggers the triggering condition at 304. Accordingly, if a new message is received via 302 that indicates a new order has been added to the order book, then the Discretion Feature Module 166 will only send one Trade Now Command based on this message. Additional messages that are received via the sequenced message bus may cause further Trade Now Commands to be communicated. For example, the message may be an execution message (e.g., Data Transaction Request Executed Message 318).

In some embodiments a second option may be used where the Discretion Feature Module 166 is configured to communicate multiple Trade Now Commands based on a single triggering of the trigger condition at 304. Thus, for example, if a new message is received via 302 that indicates a new order has been added to the order book, then the Discretion Feature Module 166 may communicate multiple Trade Now Commands for multiple child orders based on this single message. In some embodiments, the Discretion Feature Module 166 may only communicate one Trade Now Command per individual parent request for each triggering of the trigger condition (although multiple Trade Now Commands may be used if there are child orders of different parent requests).

With both the first and second option, the Discretion Feature Module 166 may determine an ordering and/or priority ranking for the child orders that are associated with parent requests that have discretion. In some embodiments, the priority ranking may be determined by using one or more properties of the relevant child orders and/or their associated parent requests. The following are elements that may be factored into the priority ranking: (a) the list price of the child order, (b) the timestamp and/or identifier that is associated with the child order (which may indicate a relative ordering with respect to when the child order was generated in comparison to other child orders), (c) the quantity of the child order and/or the overall quantity associated with the parent request, (d) the timestamp and/or parent identifier associated with the parent request, (e) whether the child order is hidden or visible, (f) the highest/lowest discretion price that is identified based on the discretion attribute that is associated with the parent request (e.g., prices that are more "favorable" to the newly added order may be prioritized higher), and/or (g) other properties that may be associated with the child orders and/or their parent request(s). Different priority determinations may be used in accordance with different embodiments and different priority determinations may be used in connection with different feature modules and/or within the same feature module—but for different securities. In some embodiments, the priority ranking may be randomly determined (or pseudo randomly).

When the Discretion Feature Module 166 is configured in accordance with the first option, the "highest" priority child order may be associated with the sent Trade Now Command at 308. In contrast, when the Discretion Feature Module 166 is configured with the second option, a Trade Now Command may be sent for each child order that satisfies the discretion calculation. In some embodiments, the child orders may be ranked and Trade Now Commands sent in accordance with decreasing priority until the quantity indicated in the new order that was received at 302 has been met by the sum of quantity associated with all of the child orders for which a Trade Now Command has been communicated (e.g., Trade Now Commands will be sent so as to fulfil the quantity indicated by the new order). As noted above, in some embodiments, there may be a one Trade Now Command limit per parent request and the child orders associated therewith.

If a trigger for a given child order has been met (e.g., it can affect a possible discretion calculation), then the processing moves to 306 where one or more discretion values (prices) are calculated. In some embodiments, the calculation of this price may also be based on market data (e.g., that may be provided from an external system via incoming data feed 116 that is received by the Discretion Feature Module 166). This calculation allows for identifying whether a potential match can be made between the child order of the parent request with the discretion feature and another contra-sided order.

At 308, if a potential match is identified, then the Discretion Feature Module 162 generated and transmits, via the command bus 111B, a Trade Now Command message (which may also be referred to as a "Trade Now Command"). The Trade Now Command can be viewed as a command to see if the matching engine 102 can match the child order, at the discretion price (or a price based on that price), to another order. The Trade Now Command may include an identifier for the child order, the parent identifier, the calculated discretion price (e.g., from 306), a Trade Now sequence number, and potentially the quantity to be matched. In some embodiments, the price that is included in the Trade Now Command message may be different than the one calculated by the Discretion Feature Module 162. For example, in some embodiments the previously calculated price may be modified as required under applicable regulations, and accordingly the price included in the Trade Now Command may be based on, but different than, the discretion price calculated by the Discretion Feature Module 162. In some embodiments, instead of a Trade Now Command being used at 308, the command may be a Match Now Command message (indicating a command to the matching engine 102 to e.g., determine if the indicated child order can match at the indicated price) instead; in some embodiments, this Match Now Command message may include the data (or portions thereof) mentioned above as included in the Trade Now Command.

At 309, the matching engine 102 receives the Trade Now Command and processes it; this processing may include validation processing and other processing. This validation may include determining if the child/native order represented in the Trade Now Command can match, at the calculated discretion price, to any contra-sided native order in the order book 124. In certain instances, this validation may fail because the contra-sided order (or any other potentially matching order) that the Discretion Feature Module 162 thought was available is no longer available (e.g., the contra-sided order matched with another order in the time the Discretion Feature Module 162 was performing its processing at the above discussed step). This validation may also fail if the child/native order represented in the Trade Now Command is no longer available. For example, another feature module 150 or another request may have caused it to be canceled or already matched. This validation may also fail if the Trade Now sequence number that is provided via the Trade Now Command does not coincide with the Trade Now sequence number that is locally stored with data of the parent request (e.g., in data store 126) that is associated with the child/native order presented in the Trade Now Command. If the validation fails, then the process of FIG. 3 stops and no reporting of the validation failure may be expressly sent to the Discretion Feature Module 162.

Based on the processing performed at 309, a Trade Now Status message is communicated at 310 that indicates the status of the processing of the Trade Now Command. Based on the value(s) of one or more parameters in the Trade Now Status message, the Trade Now Status message may indicate the following: "Out" to indicate that the child/native order is no longer available; "Not Booked" to indicate that the child/native order is in the order book; and "Booked" (which is discussed below) to indicate that there is still a booked child order within the order book 124. In other examples, the matching engine 102 may transmit a "No Match" message (or similar) that may be received and processed by the Discretion Feature Module 162 (e.g., to indicate that the Trade Now Command did not identify a potential trade). Of course, if no match is identified then the subsequent processing discussed below may not be performed.

If, at 309, the matching engine 102 does identify a potential match between the child order and a contra-sided order, the matching engine 102 will then cancel off a quantity of the child order that corresponds to a matched amount to the contra-sided order. For example, if the child order is for 500 shares and the contra-sided order is for 100, then the matching engine 102 will cancel 100 shares of the child order (e.g., reduce the quantity amount attribute of the child order from 500 to 400). Based on a successful validation (e.g. identification of a potential match), the Trade Now sequence number that is stored for the corresponding parent order will also be incremented.

At 311, the performed order cancelation (e.g., that 100 has been canceled from the pending child order) is communicated out via the sequenced message bus 111A as an Native Data Transaction Request Canceled message that includes the identifier for the child/native order and the number of shares that have been canceled from the child/native order by the matching engine 102. The Native Data Transaction Request Canceled message may be received by any of the feature modules 150, order port 130, outgoing data feed 132, which may then act upon the message as appropriate. For example, the Native Data Transaction Request Canceled message may be reported out via the outgoing data feed 132.

In some instances, the child order may still have quantity associated with it after the above amount has been canceled. In such cases, a further Trade Now Status message (with a status of "Booked") may be generated and transmitted by the matching engine 102 at 312. This Trade Now Status message may be used to indicate to interested feature modules 150 that there is still quantity associated with the child order. In some embodiments, the quantity that is still available may be included in the message. On the other hand, if there is no quantity associated with the child order, (e.g., the full quantity of the child order was canceled), then no further Trade Now Status message may be communicated at 312.

At 313, the Native Data Transaction Request Canceled message is received and processed by the Discretion Feature Module 162. Specifically, upon submitting the Trade Now Command, the Discretion Feature Module 162 may enter into a state where it is waiting for a "response" to the Trade Now Command; this Native Data Transaction Request Canceled message constitutes the response it was waiting for. Upon receiving this Native Data Transaction Request Canceled message and recognizing that the identifier included in the message matches the identifier that was subject the previously communicated Trade Now Command, the Discretion Feature Module 162 generates a New Child Data Transaction Request Command an specifies the type of order (via a field that is included in the New Child Data Transaction Request Command message) to be an immediate or cancel (IOC) order. The New Child Data Transaction Request Command may include one or more fields that indicate: (a) a quantity (e.g., which may match the canceled quantity indicated in the Native Data Transaction Request Canceled message) for the number of shares for which this IOC order is being placed; (b) the identifier for the corresponding parent request; (c) the price (e.g., the price communicated in the Trade Now Command); (d) the type of order (e.g., that it is an IOC order), and/or (e) other related data. In some examples, the Discretion Feature Module 162 may also increment the Trade Now sequence number (alternatively, the Trade Now sequence number may be incremented upon the receipt of the message at 318—or reception of a canceled message if the IOC order is canceled instead of executed). In some embodiments, the above recognition (e.g., to create an IOC order for the indicated parent request) may additionally, or alternatively, be based on matching the quantity indicated in the Native Data Transaction Request Canceled message (at 311) to the quantity included in the Trade Now Command (at 308) for the parent request indicated in those messages.

At 314, the Discretion Feature Module 162 transmits the New Child Data Transaction Request Command, via the command bus 111B, to the matching engine 102 for matching.

At 316, the matching engine 102 receives the New Child Data Transaction Request Command and performs match processing for the IOC order that is indicated by the New Child Data Transaction Request. This includes generating a new order identifier for the IOC order and updating any associated data in data store 126 in connection with the corresponding parent request (e.g., the IOC order is a new child of the indicated parent request). Note, that the new order identifier that is generated is different than the order identifier of the order for which the quantity was canceled (e.g., at 309 and communicated at 311). The matching engine 102 may then perform match processing to identify a match for the IOC order. Note that the matching processing that is performed may be identical or similar to when an unmanaged/native IOC order is being processed by the matching engine. Specifically, the matching engine 102 will either execute the IOC order (find a match) for the indicated quantity, at the indicated price, or fully cancel it the IOC order.

At 318, based on successful execution of the IOC order, the matching engine 102 will generate and transmit a status message (a Native Data Transaction Request Executed message, which may also be referred to as a "Native Data Transaction Request Execution," "Order Execution," "Order Executed," or "Execution" message, or similar) that indicates the IOC order has been "executed." This message will include the newly generated order identifier (e.g., which is different than the order identifier of the order that had the canceled quantity) and the identifier of the parent request. Other details regarding the execution may also be included (e.g., price, quantity, etc.) In some embodiments, the Native Data Transaction Request Executed message that is communicated at 318 may be the same message that is communicated when unmanaged/native orders are executed and may include similar order details (except that the parent id field may then be set to null or the like).

It will be appreciated that execution of the IOC order at 316 is not guaranteed as there may have been another order received and processed by the matching engine 102 that changed the state of the order book 124 between the processing performed at 309 and 316. In other words, the matching engine 102 continually receives commands (e.g., cancelations, modifications, etc.) and accordingly the order book 124 and the data transaction requests therein may be changing, even between the relatively short time frame (e.g., a very small fraction of a second) of when the processing for 309 is performed and the processing for 316 is performed. Accordingly, the contra-sided order that was previously validated as being present at 309 may have been matched against another order by the time match processing is performed at 316. In such cases, the IOC order may not be matched against a contra-sided order and may instead be canceled by the matching engine 102. In such cases, the message that is transmitted (e.g., at 318) for the IOC order by the matching engine 102 may be a "canceled" message In other words, rather than an Execution message at 318, a Native Data Transaction Request canceled message may be communicated at 318.

It will also be appreciated that the contra-sided order identified during 309 may be different than the contra-sided order that is actually matched at 316. Note that a result of an IOC order being canceled (e.g., failing to immediately execute) may be that there is now less quantity resting in the order book for the parent request than is intended (or no child order resting within the order book for the parent request). In other words, the processing shown in FIG. 3 may result in a child order being canceled at 309, and the subsequent IOC order being canceled as well (e.g., not executing) at 316. In such cases, the feature module 150 that is the owner (which may be the Discretion Feature Module 166) for the given parent request may subsequently generate and transmit a command message to the matching engine 102 to increase the total quantity that is resting within the order book data structure 124 for that parent request. In some examples, this command may be for a new child order to be added to the order book (e.g., the command message may include the same or analogous data as the New Child Data Transaction Request Command 224 from FIG. 2A). In other words, in some embodiments, if the quantity of a resting order is decreased by 200 as a result of 309 and the IOC order fails to execute, then a new order may be submitted for a quantity of 200 by sending a New Child Data Transaction Request Command to the matching engine that has the same order information as the canceled order. In some examples, the addition of further quantity for a child order of a given parent may be accomplished by replacing or modifying the current resting order by updating (e.g., increasing) the quantity of that order. In some examples, the feature module 150 responsible for increasing or re-adding an order with the previously canceled quantity (e.g., where the owner feature module 150 is not responsible) may be the feature module 150 that submitted the IOC order. Thus, for example, even if the Discretion Feature Module 162 is not the owner of a given parent request, it still may be responsible for re-adding quantity that was cancelled at 309.

After receiving the Native Data Transaction Request Executed message at 318, the Discretion Feature Module 162 may update its local data store to adjust the total quantity that is available for future child/native order(s) and/or data regarding the child orders for that parent request.

After receiving the Native Data Transaction Request Executed message at 318, the order port 130 may generate and transmit, at 320, a corresponding status message to client system 114 that includes the details of the execution that was triggered by the Discretion Feature Module 162. This status message transmitted at 320 may also be referred to as an Executed Message (or "Data Transaction Request Execution," "Order Execution," "Order Executed," or "Execution" message, or similar), though in some embodiments it would be in some respects different from the Native Data Transaction Request Executed Message of 318 as it would be formatted in accordance with the protocol(s) used by the client system 114 and order port 130 to communicate (e.g., OUCH) versus the protocol(s) used amongst the components 130, 166, 154, 102 of the distributed computing system 100 to communicate.

As with other messages discussed herein, other processing instances (e.g., outgoing data feed module 132) may also act upon the Native Data Transaction Request Executed message transmitted at 318. For example, the outgoing data feed module 132 may generate a message that includes details of the Execution message (e.g., the orderID, the quantity matched, etc.) and communicate such a message using, for example, the ITCH protocol.

It will be appreciated that the processing of canceling and then generating a new IOC order may assist in preventing third parties from knowing that the child order (e.g., the one with the quantity canceled therefrom) is one that is able to match with discretion. This is because the order identifier that is reported out (e.g., via the outgoing data feed 132) for the cancelation message (e.g., based on the message at 311) is different from the order identifier for the Execution message (e.g., at 318) and thus passive listeners that receive messages via the outgoing data feed 132 may not be able to easily determine the existence of a discretion order as the two messages are associated with different order identifiers.

As a variation on what is shown in FIG. 3, the Split functionality employed by the Reserve Feature Module 160 may be used in conjunction with the Trade Now Command. For example, upon reception of a Trade Now Command and validation that a match exists, the matching engine 102 may execute operations in accordance with a Split Command, wherein the operations include canceling the indicated quantity from the resting child order and generating a new native order (with a new order identifier) that is immediately matched against the contra-sided order. Other variations in implementation are also possible depending on a particular application or implementation needs.

7. Description of FIG. 4

FIG. 4 is a sequence diagram that focuses on example operations that a peg feature module (Peg Feature Module 400) may, in some embodiments, perform in connection with managing a parent request that has a peg feature. The Peg Feature Module 400 may be any of the peg feature modules 164, 166, 168, 170 shown in FIG. 1B, or some other type of peg-related feature module. In some embodiments, as described below, the Peg Feature Module 400 may operate by issuing commands (e.g., by sending command messages to the matching engine 102) to replace pending child orders with new child orders when a peg that is being monitored by the Peg Feature Module 400 requires an adjustment in price.

The processing shown in FIG. 4 may be performed after a parent request has been "booked." In some embodiments, the parent request may have been booked in accordance with FIGS. 2A-2B. In some instances, the Peg Feature Module 400 may be the owner of the parent request and have played the role of/performed the actions performed by Feature Module A 200 as shown in and described with reference to FIGS. 2A-2B; however, in such an instance, the initial price used by Peg Feature Module 400 (e.g., Feature Module A 200) when submitting the child/native data transaction request at 224 will be a pegged price that the Peg Feature Module 400 calculates. In other instances, the Peg Feature Module 400 may not be the owner of the parent request and may have played the role of/performed the actions performed by Feature Module B 202 as shown in and described with reference to FIGS. 2A-2B. In in such an instance, the process of monitoring the pegged price, and the functionality associated therewith, may be performed when Peg Feature Module 400 (i.e. Feature Module B 202) receives the New Native Data Transaction Request Accepted at 228.

As noted above, the peg feature modules 164, 166, 168, 170 perform actions such as adjusting the prices (and/or other attributes) of child/native data transactions (e.g., via replacing the child/native data transaction request with a new child/native data transaction request that has a new and adjusted price) after they are submitted to the matching engine 102 and stored in the order book 124. In some embodiments, each of the peg feature modules 164, 166, 168, 170 in the system 100 may monitor data irrespective of whether there is an active parent request that is being handled by that peg feature module. This is because if one of the feature modules receives indication of a new parent request that while need a child order, then the feature module will be able to calculate the pegged price based on the data that is already stored in the feature module (rather than waiting for additional data to arrive and calculate the pegged price). In some embodiments, a peg feature module may store data (e.g., in 140N) that is needed for calculating the relevant peg. For example, the Midpoint Peg Feature Module 168 may monitor for messages that relate to calculating the midpoint (e.g., the best bid and best offer). Other types of data may be stored depending on the type of peg that is being calculated.

Returning to FIG. 4, with the child/native data transaction request submitted and resting within the order book 124, the Peg Feature Module 400 monitors, at 402, the sequenced message bus 111A and/or other data feeds, such as incoming data feed 116, for messages that relate to the particular peg used for the resting child/native data transaction request. The messages that may be of interest include those that relate to other data transaction requests and may include market data, last sale data (e.g., an execution messages, similar to 318), acceptance messages for new orders (e.g., New Native Data Transaction Request Accepted messages, such as shown in 228), and other messages related to other data transaction requests.

At 404, the Peg Feature Module 400 determines, based on the content of one or more messages it has received, whether a triggering condition has been activated. The nature of the triggering condition may vary based on the type of peg. For example, the trigger for a midpoint peg will be when a calculated midpoint can change (e.g., based on the NBBO).

As with 304 in FIG. 3, there may be multiple child orders that are subject to being replaced based on the new data receives via 402. In such cases, the Pegging Feature Module may prioritize (according to a priority ranking) the child orders that are going to be replaced. In some embodiments, the priority ranking of the child order(s) may be based on price/display/time priority. The following elements may be factored into the priority ranking of determining the order in which the Child Replace Command 406 is communicated to the matching engine: (a) the list price of the child order, (b) the timestamp and/or identifier that is associated with the child order (which may indicate a relative ordering with respect to when the child order was generated in comparison to other child orders if new identifiers are always generated with a higher/lower number), (c) the quantity of the child order and/or the overall quantity associated with the parent request, (d) the timestamp and/or parent identifier associated with the parent request, (e) whether the child order is hidden or visible, (f) the highest/lowest discretion price that is identified based on the discretion attribute that is associated with the parent request (e.g., prices that are more "favorable" to the newly added order may be prioritized higher), and/or (g) other properties that may be associated with the child orders, their parent request(s), and/or data on the client (e.g., the client ID, the type of customer associated with the parent request, whether the child order is displayed or not, etc.). In some embodiments, only the timestamp or order identifier (either of which may be used to indicate "time" for an order) may be used to rank the various child orders. Such an approach may facilitate maintaining the relative ordering of those child orders that are pegged (which may affect future matching of such replaced orders—e.g., due to price/display/time prioritization). In some embodiments, the priority ranking may be randomly determined (or pseudo randomly).

If the trigger condition for the Peg Feature Module 400 is satisfied/met/activated, then the Peg Feature Module 400 calculates a new price for the peg that will be used for the new child order that will replace the existing child order. In other words, a new matching value (which as previously noted may also be referred to as a "match value") at which the new child order will match is calculated. The specifics of how the pegged price is calculated may vary depending on the nature of the particular peg. Details of the different pegging types and the calculation of the various pegs are discussed in connection with FIG. 1B.

Once the new price (or other attribute) is calculated, the Peg Feature Module 400 then generates and transmits, via the command bus 111B, a Child Replace Command message (which may also be referred to as a "Child Replace Command") at 406 to the matching engine 102. This Child Replace Command will include the total number of shares currently on the order, and the total number of shares after the replace. This Child Replace Command will be used, as described below, to replace the existing child/native data transaction request that is resting in the order book 124 with a new child/native data transaction request with an updated value for the pegged parameter (e.g., a new price). In certain instances, the price that is included in the Child Replace Command may be further modified due to specific regulations and may thus be different than, but still based on, the price calculated by the Peg Feature Module 400. In some examples, the Child Replace Command may be similar or the same as a "Replace Command" that is used to replace unmanaged/native orders. Note that there may be instances where multiple replace commands may be triggered based on reception of a single message (at 402). In such cases, the Peg Feature Module 400 will transmit the Child Replace Command message for the child order that is first in priority (as discussed above), and then select the child order that is next in priority, and send a Child Replace Command message for that child order, etc. Note that in some embodiments, the operation of the Peg Feature Module 400 and the (potential) communication of multiple Child Replace Command messages in connection with multiple child orders is different from the Discretion Feature Module 162 where only one command is communicated at a time and/or per message that is received via the sequenced message bus 111A.

At 408, the Child Replace Command is received by the matching engine 102. The Child Replace Command may be viewed as a combination of a full cancel command and a new order command. Upon reception, validation processing may be performed. This may include verifying that the old child data transaction request is still valid (e.g., that it is still resting in the order book 124 and has not, for example, been matched against a contra-side order and removed). The validation may, in some examples, include comparing the current total number of shares included in the Child Replace Command with the total number of shares that is included with the pending child order that is to be replaced. The validation based on the number of shares may be used in a manner similar to the child and Trade Now sequence numbers discussed herein that are used to ensure that the command being processed by the matching engine is "current" with respect to the state of the order book (or the specific child order being referenced). For example, if some quantity of shares was matched to the resting child order that caused the total quantity of that child order to change (e.g., between when the feature module 400 received a message that triggered the Child Replace Command at 406), then the replace command may be dropped (e.g., ignored) by the matching engine 102. This is because the command that was issued from the feature module was based on an old view of the pending child order. The feature module that issued the replace command may then determine that it was dropped when another message is sent (which is not a replace command) that affects that child order (e.g., such as an execution command that identifies the child order by its identifier). Accordingly, the quantity attribute of the child order is used as a validation check to ensure that the "view" the feature module has of the child order resting in the order book is accurate. Note, the quantity attribute that is used as a validation check may be more efficient than using the child sequence number for validation (e.g., the number of collisions that may occur (invalid commands) may be decreased).

Once validated, the matching engine 102 may replace the old child/native data transaction request with a new child data transaction request as represented in the Child Replace Command. In some embodiments, the new child/native data transaction is a new order (e.g., it has a new order identifier or the like). The old child/native data transaction request may be canceled (by performing cancelation processing) and such canceled data may be later cleaned up (by performing cleanup processing).

At 410, after the new child/native data transaction request has been generated, match processing may be performed by the matching engine 102 for the new child data transaction request. Thus, in certain instances, the new child data transaction request may be viewed as a new data transaction request that is processed in a manner similar to unmanaged/native data transaction requests. Match processing may then include determining, for example, if the new price for the replaced order makes the replaced order matchable against any other contra-sided orders.

In some embodiments, the processing performed at 408 and 410 (including the determination of whether a match exists) is an atomic operation. This may also include the sending of the Replaced message at 412 (which will be described below).

At 412, a Replaced message (which may also be referred to as an "Order Replaced" or "Data Transaction Request Replaced" message) is communicated via the sequenced message bus 111A. The Replaced message may include the order identifier of the replaced child/native data transaction request (the old identifier or "OldID"), the order identifier of the new child/native data transaction request (the new identifier or "NewID"), and possibly the identifier for the associated parent request. In certain embodiments, the Replaced message that is used at 412 is also used when a unmanaged/native data transaction request is replaced (e.g., with the parent field in the message set to null). This Replaced message may be picked up by any of the feature modules 150 (including the Peg Feature Module 400), which may then update in its local storage the order identifier for the child/native order of the indicated parent request. Note that if multiple feature modules 150 are involved in managing the indicated parent request, then they too will receive this message and then subsequently update the identifier of the child/native request (e.g., to remove reference to the OldID, and include a reference to the NewID). As an example, the Discretion Feature Module 162 (not shown in FIG. 4) may also be active for this parent request; in such an instance, the Discretion Feature Module 162 will receive the Replace message and recognize the old identifier (possibly in conjunction with the parent identifier that may be included in the replace message) as being the identifier of an order that it is responsible for and then update that old identifier to the new identifier in its local storage. In certain examples, the Replaced message may function as a message that informs any of the processing instances that the order with the "OldID" has been canceled or removed from the order book. Accordingly, in some examples, unlike other cancelations that are performed by the matching engine 102, no express "cancelation" message may be sent when an order is replaced as discussed herein—e.g., because the Replace Message "acts" as such a message.

In some embodiments, upon receiving the new identifier, the feature modules 150 may also clean up any data or outstanding requests associated with the old identifier (e.g., performing cleanup processing). For example, the Discretion Feature Module 162 may have communicated a Trade Now command that references the old identifier (as shown at 308). But the corresponding old child/native request may have been replaced before the Trade Now command was processed by the matching engine 102. In such an instance, the reception of the Replace message at 412 may act as a notification to the Discretion Feature Module 162 that the Trade Now command failed (e.g., it was dropped by the matching engine 102 and not acted upon as the validation failed). Based on this notification, the Discretion Feature Module 162 may also clean up (e.g., perform cleanup processing) any old data related to the old identifier and/or replace the old identifier with the new identifier in its local storage (and/or add the new identifier to its local storage after deleting any references to the old identifier).

At 414, the order port 130 may receive and process the Replaced message and may transmit a corresponding Restatement message to the client computer system 114. This Restatement message may include the identifier for the new child/native order. In some embodiments, the order port 130 is configurable by clients to not send or not send Restatement messages. In such an embodiment, and if the order port 130 is configured to not send Restatement messages, the order port 130 would not send the Restatement message at 414. In some embodiments, a Restatement message may not be sent if the old and/or new child/native data transaction requests are/were hidden on the order book 124.

In some embodiments, match processing 410 may result in a match being identified. In such circumstances, the match may be reported (via a sequenced message on the sequenced message bus 111A) in response to identification of the match (e.g., via Native Data Transaction Request Executed Message such as shown at 318). Such a message may then be received by the order port and used to notify the client system 114 of a match (e.g., using an Execute message as shown at 320). In some embodiments, the outgoing data feed module 132 may also receive and process the message and generate a message (e.g., an ITCH message) for the outgoing data feed.

8. Description of FIG. 5

FIG. 5 is a sequence diagram that focuses on example operations that the Reserve Feature Module 160 shown in FIG. 1A may, in some embodiments, perform in connection with the management of a booked managed/parent data transaction request that has a reserve feature.

The processing shown in FIG. 5 may be performed after a parent request has been "booked." In some embodiments, the parent request may have been booked in accordance with FIGS. 2A-2B. The processing shown in FIG. 5 may be performed where the Reserve Feature Module 160 is the owner of the parent request, or where it is not the owner. In an instance where the Reserve Feature Module 160 is the owner of the parent request, it may have played the role of/performed the actions performed by Feature Module A 200 as shown in and described with reference to FIGS. 2A-2B; in an instance where the Reserve Feature Module 160 is not the owner, it may have played the role of/performed the actions performed by Feature Module B 202 as shown in and described with reference to FIGS. 2A-2B.

As described with reference to FIGS. 2A-2B, at the end of the processing of FIG. 2B, two child/native orders associated with the booked parent request may be stored/resting in the order book 124, with one of the orders hidden and the other visible.

The process of FIG. 5 may begin at 510, with the matching engine 102 performing match processing involving orders resting in the order book 124, which may include the above-mentioned two child/native orders. At 510, the performing of the match processing by the matching engine 102 may include the matching engine determining that the visible child/native order matched (or partially matched) against another contra-sided order, and matching/executing the visible child/native order accordingly.

At 512, in response to the matching engine 102 performing the above-described match processing at 510, the matching engine 102 may generate a Native Data Transaction Request Executed message, and transmit this message via the sequenced message bus 111A. This Native Data Transaction Request Executed message of 512 may include the same or analogous information, mutatis mutandis, as that included in the Native Data Transaction Request Executed message described with reference to 318 in FIG. 3.

At 514, the Reserve Feature Module 160 processes the Native Data Transaction Request Executed message. This message may act as a trigger for further processing by the Reserve Feature Module 160 at 516. In particular, the Reserve Feature Module 160 may be responsible for ensuring that an appropriate quantity that is associated with the overall parent request continues to be visible for child orders of that parent request. Accordingly, upon recognizing that the previous visible child/native order has now matched and is no longer in the order book 124 (or, in the case of a partial match, that the remaining quantity of that child/native order that is in the order book 124 is below a threshold amount), Reserve Feature Module 160 may, as a result of the processing performed at 516, generate and transmit a new Split Command message at 518 to create a new order with the indicated quantity (e.g., in similar manner to how the Split Command message at 250 is generated and transmitted, with this Split Command message at 518 including analogous data as that described above as included in the Spit Command message at 250).

At 520, the Split Command message is received and processed by the matching engine 102. This processing may include match processing based on the received Split Command message, and/or be the same as or similar to the processing performed at 252 in FIG. 2B.

At 522, the matching engine 102 communicates the results of executing the Split Command via the sequenced message bus 111A at 522 by sending a Split message that includes the new identifier for the newly created child/native order that has been added to the order book. The message that is generated and communicated at 522 may be similar to or the same as that discussed in connection with 254 in FIG. 2B.

At 524, the Split message is received by the order port 130 and a Restatement message may be generated by the order port 130 and then communicated by the order port 130 to the client system 114 that is associated with the parent request. The Restatement message may include information such as the identifier of the new order that has been created, and/or other information. In some examples, the order port 130 may use the parent identifier that is included in the Split message to lookup associated information of the client who is associated with the order and then determine where the message should be sent. In other examples, because individual order ports 130 may be dedicated to specific clients, the destination of the Restatement message may already be known by the order port 130 and so a lookup in response to the receipt of the Split message is not required. In any event, a Restatement message at 524 may be communicated to the client system 114 based on the data contained in the Split message communicated at 522.

In some instances, the Split Command that is sent by the Reserve Feature Module 160 at 518 may not reflect the current state of the child order(s) maintained by the matching engine 102. If a Split Command does not reflect the current state of such child order(s), then the matching engine 102 may drop or otherwise ignore the Split Command. The determination of whether the data reflected in the Split Command reflects the current state of the order book may be based on the quantity indicated in the Split Command and/or the child sequence number (discussed in greater elsewhere herein) that is maintained by the matching engine 102 and stored by the Reserve Feature Module 160. If the sequence numbers do not match, then at 520 the matching engine 102 may drop the Split Command (e.g., not process it). In some embodiments, the matching engine 102 may adjust the split amount based on the current state of the hidden portion. For example, if the Reserve Feature Module 160 believes that there is 1000 left in the hidden child/native order, but there is really only 500 remaining and the cancel down is requested to 500 (which is already the current quantity), the matching engine 102 may drop the Split Command message or, alternatively, process the Split Command message, but cancel down to 0. In other words, different functionality may be incorporated into the matching engine 102 (or other components of the system 100) based on specific implementation needs. Accordingly, processing of the Split Command message (i.e., processing of the split command indicated by the Split Command message at 518) may function with validation (e.g., that is based on quantity and/or the child sequence number), no validation (e.g., split even if the view by the feature module of the children is out of date) or some combination thereof (e.g., best effort to carry out split).

9. Description of FIGS. 6 and 7

FIGS. 6 and 7 are sequence diagrams showing example processing that may be performed in the system 100 of FIG. 1A in some embodiments, related to the cancelation of a parent request. More particularly, FIG. 6 shows example processing where the cancelation is initiated by the feature module 150 that is the "owner" of a parent request, and FIG. 7 shows example processing where the cancelation of a parent request is triggered by a request from a client.

Referring to FIG. 6, the processing of FIG. 6 may be performed after a parent request has been "booked," such that at least one child/native data transaction request corresponding to the parent request is pending in the order book 124 that is managed by the matching engine 102. In some embodiments the parent request may have been booked in accordance with FIGS. 2A-2B, and Feature Module A 600 of FIG. 6 may be the owner of the booked parent request and have played the role of/performed the actions performed by Feature Module A 200 as shown in and described with reference to FIG. 2A-2B.

At 602, Feature Module A 600 receives one or more sequenced messages (or other messages from other sources, such as market data, which may not have been sequenced by the sequencer 120). At 604, Feature Module A 600 determines, based on the received messages, if a trigger condition for cancelation of the booked parent request is met. For example, a sequenced message may be received by the Feature Module 600 that indicates one of the child orders of a parent request has been executed for the full amount of the quantity of that child order (e.g., no remaining quantity on the child order). In such a case, Feature Module A 600 may be required act to cancel the parent request (as there are no pending child data transaction requests left). Other examples that may trigger the condition for cancelation of a parent request at 605 may include one or more data transaction requests violating a collar (e.g., the child order would be priced outside of the collar) or other conditions that would cause the child order to be no longer valid.

As with the processing discussed in connection with 304 and 404 in FIGS. 3 and 4, there may be instances when multiple children or parent requests may be subject to the trigger condition processing. In such cases, the same or similar discussion relating to how to prioritize the messages communicated from feature module 600 may be applied. In some embodiments, the parent requests may be prioritized based on their timestamp/parent identifier such that older parent requests are prioritized first.

In any event, once the cancelation condition is triggered, then Feature Module A 600 generates and transmits, via the command bus 111B, a Parent Cancel Command message (which may also be referred to as a "Parent Cancel Command") at 606. The Parent Cancel Command may include the parent identifier and the parent locate identifier of the parent request. In some embodiments, the Parent Cancel Command may include information that allows the matching engine 102 to distinguish between cancelations as a result of an execution and those triggered otherwise. For example, the Parent Cancel Command may include a list of one or more locate identifiers for the child orders of the parent request.

Other types of flags or the like may be included in the Parent Cancel Command that may adjust how the matching engine 102 carries out the Parent Cancel Command.

The Parent Cancel Command is received at 608 and the matching engine 102 uses the parent locate identifier to retrieve the data on the parent request and its associated child/native orders (assuming any are left) and begins processing the Parent Cancel Command. As shown in FIG. 6, the processing from 608 to 616 is performed atomically.

At 610, the matching engine 102 generates and transmits, via the sequenced message bus 111A, a Parent Cancel message. This message is used to inform other feature modules that the matching engine 102 has received the Parent Cancel Command and will be processing it. This message may be picked up by the feature modules 150, which may then act accordingly (e.g., to clean up any additional data related to this parent request that is being canceled). For example, Feature Module A 600 may receive the message and act accordingly. This may include, for example, suspending processing for any child orders for the indicated parent identifier. The message may also act as a verification back to Feature Module A 600 that the Parent Cancel Command at 606 was received by the matching engine. In some instances, the Parent Cancel message generated and transmitted at 610 may include the quantity (e.g., a number of shares) that remain associated with the parent request. In the case of a full cancel, the number may be 0. In the case of a partial cancel, the number may be greater than 0, but less than the prior total quantity associated with the indicated parent request.

At 612, the matching engine 102 cancels the child/native data transaction requests that are associated with the parent request (e.g., those that are still pending in the order book 124). In certain examples, this may include using the parent identifier included in the received command to lookup or otherwise determine each child/native data transaction request that is associated with the indicated parent request. This data (e.g., the children) may be retrieved from, for example, data store 126 that may store data on all (e.g., prior or pending) parent requests and any child orders associated with such requests. For example, the order identifiers (and possibly the order locate data) of each child order that is associated with the parent requests may be determined from data store 126 and then used to lookup the child orders that are stored in the order book 124. The matching engine 102 may then perform cancelation processing for the looked-up child orders. In some embodiments, cancelation processing for the child orders is performed by first determining a priority ranking for all of the pending children of the given parent request. Once the children are sorted according to the priority rank, then the cancelation process may proceed by starting from the child order with least priority (e.g., the least price/time) and proceeding through to the child order with the highest priority. Each child order may then be canceled until a summed total quantity of the remaining child orders satisfies the cancelation request (e.g., is equal to or less than, the quantity value included in the parent cancel command message).

Note that if the Parent Cancel Command is the result of a full execution (e.g. there are no children remaining), then 612 and 614 may be skipped as there are no children. Similarly, if there are no pending child orders for the parent request that is being canceled, then 612 and 614 may be skipped.

At 614, for each of the canceled child/native data transaction requests, a Native Data Transaction Request Canceled message (such messages may also be called "Cancel" messages herein) is generated by the matching engine 102 and transmitted, via the sequenced message bus 111A, indicating cancelation of the data transaction request that is a child of the parent request indicated in the Parent Cancel Command.

At 616, the matching engine 102 may mark the parent request as canceled (e.g., via performing cancelation processing on the parent request) and/or performing cleanup processing on the parent request to remove the remaining data associated with the parent request from memory. Correspondingly, the matching engine 102 generates and transmits, via the sequenced message bus 111A, a Parent State message with a status of "Out." This Parent State message indicates that the parent request (and data associated therewith) has been canceled/removed from the matching engine 102 and is no longer being processed (e.g., that the Parent Cancel command has been executed by the matching engine 102).

As discussed elsewhere in this specification, including in the description of FIGS. 7, 8, 9, 10, 11, 12, and 14, the Parent State message may indicate one of a plurality of different statuses that indicate the status the parent request. These include a status of: "Out," "Partial Cancel", "Suspend", "Modified," "Pending Cancel," and other statuses as required. In some embodiments, the Parent State message includes an identifier parameter/field, whose value indicates the parent request to which a given instance of the Parent State message pertains. Alternatively or additionally, in some embodiments, the Parent State message includes a status parameter/field, whose value indicates the status (e.g., "Out," Partial Cancel," "Suspend," "Modified") of the parent request to which a given instance of the Parent State message pertains; when it is described herein that a given Parent State message indicates a status for a given parent request, in such embodiments the status is indicated by the value of that status parameter/field.

Returning to FIG. 6, it will be appreciated that the Parent Cancel message sent at 610 and the Parent State message sent at 616 are in some respects similar, in that e.g., they both relate to processing of a parent cancelation by the matching engine 102. However, the Parent Cancel message at 610 acts as a confirmation (and notification to the feature modules 150) that the matching engine 102 has received the Parent Cancel Command at 606 and is acting accordingly. The Parent State message at 616, in contrast, acts as a message indicating that the processing (including cancel processing) for the Parent Cancel Command by the matching engine 102 is complete. Indeed, the communication of the Parent State message at 616 (or whichever message in that atomically performed operations is communicated "last") may act as an indication that the operations that have been performed atomically are complete. Accordingly, other feature modules 150 can respond to the Parent Cancel message at 610, the Parent State message at 616, or both when acting on the Parent Cancel Command and the fact that the associated parent request is canceled. For example, Feature Module A 600 may receive the Parent Cancel message (at 610) and, in response, cease processing new actions in connection with that parent request (e.g., such as not submitting new child orders or changes to existing child orders for the indicated parent identifier, etc.). However, Feature Module A 600 may not delete or remove data related to the indicated parent request and its children (e.g., references to the parent request and its children, such as identifiers); rather, Feature Module A 600 may wait until reception of the Parent State message at 616 to take action to delete or remove this data from its data store (e.g., performing cleanup processing). Accordingly, the processing that is shown at 618 as performed by Feature Module A 600 may occur upon in response to reception of the Parent Cancel message (at 610), in response to reception of the Parent State message (at 616), or both.

While elements 608-616 are shown in a particular order in FIG. 6, it will be appreciated that in some embodiments the actions shown in FIG. 6 may be performed in different orders than the order shown in FIG. 6 (e.g., where the Parent Cancel message at 610 is sent after the Cancelation messages at 614, etc.). It should also be appreciated that the processing performed at 618 may occur at the same time of the processing that occurs between 608 and 616. In other words, the processing of 618 may overlap in time with the atomic operation (of 608-616) that is being performed by the matching engine 102. This is because the feature modules 150 may receive the Parent Cancel message 610 before the Parent State message at 616 is sent. In other instances, the entirety of the processing performed between 608 and 616 is performed prior to the reception/processing that is performed at 618.

Upon reception of the Parent State message, the order port 130 may also clean up its data related to the now-canceled parent request (e.g., by performing cleanup processing) and also generate and transmit an Order Canceled message (which may also be referred to as a "Data Transaction Request Canceled" message) to client system 114. The contents of this Order Canceled message may include, for example, why the parent request was canceled (e.g., it violated a collar or other error). In some embodiments, the cancelation message may not be sent if the cancelation of the parent request is the result of a full execution of the parent request as the client system 114 will be/have been notified via an execution message, which may have been sent when the child order was executed (e.g., the sequenced messages at 602 may have included an executed order message).

Turning now to FIG. 7, a process for managing a cancelation that is initiated from the client system 114 is shown. The processing of FIG. 7 may be performed after a parent request has been "booked," such that at least one child/native data transaction request corresponding to the parent request is pending in the order book 124 that is managed by the matching engine 102. In some embodiments the parent request may have been booked in accordance with FIGS. 2A-2B, and Feature Module A 700 of FIG. 7 may be the owner of the booked parent request and have played the role of/performed the actions performed by Feature Module A 200 as shown in and described with reference to FIG. 2A-2B.

At 702, a Cancelation Request message is transmitted from the client system 114 to the distributed computing system 100 via the order port 130. The Cancelation Request message may include a client reference number for the request that is being canceled and, optionally a number of shares to cancel down to. In some embodiments, the share amount may default to zero. A non-zero amount may indicate that this request is a partial cancel request.

At 704, the order port 130 will receive the Cancelation Request message, and then look up the request that is associated with the client reference number provided in the Cancelation Request message. If the Cancelation Request message is associated with a parent request (e.g., instead of an unmanaged/native data transaction request), then the order port 130 will generate and transmit, via the command bus 111B, a Parent Cancel Command (which may also be referred to as a "Parent Cancel Command message") at 706. The order part 130 may generate this Parent Cancel Command such that it includes the parent identifier, the parent locate identifier, and the number of shares that the parent request is to be canceled down to. If the number of shares is greater than 0, then "cancelation" may be viewed as a partial cancelation. However, if the number of shares is 0 (e.g., the number of shares that will remain), then the cancelation may be viewed as a full cancel. The same Parent Cancel Command may be used in both cases. The order port 130 may also verify that the new total quantity specified by the Cancelation Request message from the client is not more than the current quantity of the parent request (e.g., a negative quantity to cancel may be an invalid value).

Alternatively, the client reference number may be associated with a native data transaction request. In this case, the order port 130 may generate a Cancelation Command message for that unmanaged/native data transaction request that is then submitted to the matching engine 102 for processing. This type of processing allows the managed nature of the orders to remain relatively opaque to the client (e.g., as they may reference both parent requests and unmanaged/native request with their corresponding client reference numbers that are associated with corresponding requests).

The Parent Cancel Command is received by the matching engine 102 at 708 and the matching engine 102 begins to process the Parent Cancel Command.

When the Parent Cancel Command is for a full cancelation, the processing that is performed by, and the messages that are communicated by, the components 130, 150, 102 of the distributed computing system 100 at 708, 710, 712, 714, 716, 718, 720 is the same or analogous (and the messages communicated are the same and/or have the same or analogous content), mutatis mutandis, as discussed in connection with FIG. 6 in 608, 610, 612, 614, 616, 618, 620. In other words, 708, 710, 712, 714, 716, 718, 720 may correspond to, respectively, 608, 610, 612, 614, 616, 618, 620.

However, when the Parent Cancel Command is for a partial cancelation, the processing of canceling the child orders at 712 may be different than as described above with respect to 612. Specifically, the number of shares that is to be left over is determined by the matching engine and then the child orders are canceled by the matching engine 102, starting with the child order with the least priority until the new total quantity (e.g., specified in the Parent Cancel Command) remains in the remaining child orders. Example techniques for prioritizing the child orders may include price/display/time, display/size/price/time, or display/size/time, or other combinations that use the different values that are associated with attributes of the child orders (e.g., price, display, time, size, etc.).

For example, assuming orders that are visible are prioritized ahead of orders that are hidden (e.g., the display property of the order), and there is a displayed child order for 100 and a hidden order for 500 (e.g., the reserve), and the cancelation request is to request a cancelation down to 300, then 300 of the hidden order will be canceled leaving the 100 displayed child order (unchanged) and 200 for the hidden child order. At 714, the cancelation of the 300 from the hidden order may be reported (e.g., as a Native Data Transaction Request Canceled message). Accordingly, the quantity (e.g., shares) from the child orders of the parent request may be canceled down to the total quantity that is indicated in the Parent Cancel Command message. Note that as the displayed child order for 100 is unchanged, no Native Data Transaction Request Canceled message is generated in connection with this order. However, a Native Data Transaction Request Canceled Message(s) message for the hidden order may be generated and transmitted (e.g., as in 714). The Native Data Transaction Request Canceled message may indicate the number of shares that have been canceled or the number of shares remaining with the order.

At 716, the matching engine 102 may generate and transmit a Parent State message. In the case of a partial cancelation, this Parent State message may have a status of "Partial Cancel" indicating that only some of the shares associated with the parent request have been canceled. In the case of a full cancelation (e.g., there is no remaining quantity associated with the parent request), then the Parent State message may have a status of "Out." Note that in the case of a full cancelation, that cleanup processing may be performed on the data associated with the parent request—in addition to any cleanup and cancelation processing performed in connection with each of the child orders for the parent request.

At 720 the order port 130 may receive the messages communicated via the sequenced message bus 111A and correspondingly generate and transmit, to the client system 114, an Order Canceled message to notify the client that the cancelation has been processed and the orders have been canceled. In the case of partial cancels, this message may indicate how many shares are remaining in connection with the parent request and/or how many have been canceled.

10. Description of FIG. 8

FIG. 8 is a sequence diagram showing example processing that may be performed in the system 100 of FIG. 1A in some embodiments. More particularly, FIG. 8 shows example processing for the cancelation of a parent request, where the cancelation is initiated by the Parent Cancel Feature Module 174.

As discussed in connection with FIG. 1A, a type of feature module 150 that may be included in some embodiments in the distributed computing system 100 is a Parent Cancel Feature Module 174. The Parent Cancel Feature Module 174 is somewhat different than certain other types of feature modules as it is not the owner of parent requests. Rather, the job of the Parent Cancel Feature Module 174 is to monitor the parent requests and determine when/if they should be canceled. In some embodiments, the Parent Cancel Feature Module 174 may be configured to only issue full cancels for corresponding parent requests (e.g., not partial cancels as with client issued cancelations).

The processing of FIG. 8 may be performed after one or more parent requests have been "booked," such that corresponding child/native data transaction requests are pending in the order book 124. In some embodiments the parent requests may have been booked in accordance with FIGS. 2A-2B.

At 802, the Parent Cancel Feature Module 174 may monitor the sequenced message bus 111A (or other data feeds) (i.e., may receive one or more messages via the sequenced message bus 111A and/or other data feeds) for determining whether to cancel any of the booked parent requests.

At 804, the Parent Cancel Feature Module 174 determines whether a triggering condition is satisfied for the parent requests that are being monitored (which may be all of the booked parent requests). The triggering conditions may be checked based on messages received via the sequenced message bus 111A (or other data feed), may be internally monitored (e.g., based on a timer that is locally maintained by the Parent Cancel Feature Module 174), or some combination thereof. The following are examples of conditions that may trigger the Parent Cancel Feature Module 174 at 804.

As with the processing discussed in connection with 304 and 404 in FIGS. 3 and 4, there may be instances when multiple children or parent requests may be subject to the trigger condition processing. In such cases, the same or similar discussion relating to how to prioritize the communication and/or generation of messages based on such triggering may be applied in connection with the processing performed by the Parent Cancel Feature Module 174. In some embodiments, the parent requests may be prioritized based on their timestamp/parent identifier such that older parent requests are prioritized first.

A parent request may have a maximum time in force (e.g., specified when the client first submits the details for the request), which specifies the time that the parent request may be active within the distributed computing system 100. The time may be based on when the original parent request is sequenced or otherwise processed by the matching engine 102 (e.g., 218 in FIG. 2A) or may be based on some other event (e.g., when the first child request corresponding to the parent request is added to the order book 124). The Parent Cancel Feature Module 174 may track the time in force of each parent request and then trigger a cancelation when the time in force condition is met or exceeded. For example, the Parent Cancel Feature Module 174 may maintain one or more timers that each track how long a given parent request has been active. Such timers may be maintained internally within the Parent Cancel Feature Module 174 and updated/maintained based on the internal real-time clock (RTC) of the computing device on which the Parent Cancel Feature Module 174 is executing. In some embodiments, time updates (e.g., timestamp information) may be provided the sequenced messages 802 and used to update the timers that are locally maintained within the Parent Cancel Feature Module 174 and/or otherwise determine how long a given parent request has been pending. Upon expiration of the timer for a given parent request, cancelation for that parent request may be triggered.

Another condition for triggering the Parent Cancel Feature Module 174 may be if the total quantity of shares of the child orders fails to exceed some threshold amount (e.g., falls below a threshold). Another example may be if a parent request that is being managed by one of the peg feature modules 164, 166, 168, 170 has replaced its child data transaction request more than a threshold number of times (e.g., 1000 or 10000, etc.). Another example may be if a parent request has been suspended for more than a threshold amount of time.

Accordingly, different events may cause the Parent Cancel Feature Module 174 to determine that a trigger condition has been met at 804. At 806, in response to and/or based on the determination that the trigger condition has been met, the Parent Cancel Feature Module 174 may generate a Parent Cancel Command and transmit the Parent Cancel Command via the command bus 111B to the matching engine 102. As with the other Parent Cancel Commands, this message may include the parent identifier and the parent locate identifier; and this Parent Cancel Command will include information that indicates that the remaining quantity will be 0 (e.g., that this cancel will be a full cancel). In some embodiments, the Parent Cancel Commands from the Parent Cancel Feature Module 174 will always be for full cancelations (e.g., not partials). However, in other examples partial cancels may be issued from the Parent Cancel Feature Module 174.

The remaining processing that is performed by order port 130, feature modules 700 and 154, and matching engine 102 of the distributed computing system 100 at 808, 810, 812, 814, 816, 818, and 820 is the same or analogous to, mutatis mutandis, the processing as described in connection with FIG. 6 in 608, 610, 612, 614, 616, 618, 620 (e.g., when a full cancel is performed), and the messages (and the contents thereof) communicated in connection with such processing is also the same or analogous, mutatis mutandis. In other words, 808, 810, 812, 814, 816, 818, 820 may correspond to, respectively, 608, 610, 612, 614, 616, 618, 620.

As discussed above in connection with FIGS. 6, 7, and 8, different techniques for canceling parent requests are discussed. In general, each of these distinct sequences of operations may include a determination of some triggering condition, after which information is communicated to the matching engine 102 to carry out corresponding cancelation processing. The cancelation processing that is performed in connection with these different techniques may include partially canceling a data transaction request by, for example, reducing a quantity value of the data transaction request or by completely removing the data transaction request from the order book (e.g., by deleting it). In the case of FIG. 6, the triggering condition is processed in 604; in the case of FIG. 7, the triggering condition can be viewed as the reception of a cancelation message from client system 114 at 703 (e.g. the request from the client); in the case of FIG. 8, the triggering condition is processed at 804.

11. Description of FIG. 9

FIG. 9 is a sequence diagram showing example processing that may be performed in the computing system 100 of FIG. 1A in some embodiments. More particularly, FIG. 9 shows example processing for the suspension of a parent request.

A suspension for a parent request may occur within the system 100 in response to changing conditions within the market or other parameters. For example, if a parent request includes a child order that is pegged and the market (e.g., the order book 124) enters a crossed state, then the system may suspend the parent request. In some embodiments, suspend actions for parent requests may be controlled or determined by the feature module that is the owner of the given parent request.

Turning more specifically to FIG. 9, Feature Module A 900 is the owner of a parent request that has been "booked" in the system 100 and is associated with one or more corresponding child orders that are pending within the order book 124 that is being maintained by the matching engine 102. In some embodiments, the parent request may have been booked in accordance with FIGS. 2A-2B, and Feature Module A 900 may have played the role of/performed the actions performed by Feature Module A 200 as shown in and described with reference to FIGS. 2A-2B At 902, Feature Module A 900 receives and processes messages from the sequenced message bus 111A and/or other messages that may not be sequenced (such as market data from incoming data feed 116).

At 904, based on the received messages, Feature Module A 900 checks if a triggering condition is satisfied to trigger suspension of the parent request that the Feature Module A 900 is the owner of. In some embodiments, a triggering condition for a suspension may be activated based on internally monitored data (e.g. a timer or the like). Accordingly, either internal data or externally provided data may be used to determine when a suspension may be triggered for a parent request that is being handled by Feature Module A 900.

As with the processing discussed in connection with 304 and 404 in FIGS. 3 and 4, there may be instances when multiple children or parent requests may be subject to the trigger condition processing. In such cases, the same or similar discussion relating to how to prioritize the communication and/or generation of messages based on such triggering may be applied in connection with the processing performed by Feature Module A 900. In some embodiments, the parent requests may be prioritized based on their timestamp/parent identifier such that older parent requests are prioritized first.

At 906, in response to determination that the triggering condition has been satisfied, Feature Module A 900 generates and transmits, via the command bus 111B, a Parent Suspend Command message (which may also be referred to as a "Parent Suspend Command") to the matching engine 102. The Parent Suspend Command may include the parent identifier and the parent locate identifier. As noted above, the Parent Suspend command many also include the child sequence number that is being maintained for this parent request by the Feature Module A 900. In some embodiments, once the Parent Suspend Command is transmitted from Feature Module A 900, there is no further record of the command until the reception of the message at 908. This is because, as discussed elsewhere herein, the transmitted command is not "in" the system 100 until it has been received by the matching engine 102, sequenced by the sequencer 120, and/or communicated back out via the sequenced message bus 111A. However, in certain other embodiments, the Feature Module A 900 may store a record or other indication that a Parent Suspend Command has been communicated and this parent will (or should) be suspended.

The matching engine 102 validates (e.g., that the child sequence number included in the command is correct) the received Parent Suspend Command and begins processing the Parent Suspend Command by sending out a Parent Suspend message at 908 via the sequenced message bus 111A. In certain instances, this Parent Suspend message may include the parent identifier and be received by feature modules 150 that may then perform processing based on that message (e.g., stop processing actions in connection with the parent request associated with the suspension).

At 910, the matching engine 102 determines those child orders that are associated with the parent request (e.g., by looking up the parent request by using the parent locate and determining each child order associated with the parent request) indicated by the Parent Suspend Command and performs cancelation processing for any open child orders that are pending in the order book 124.

At 912, for each canceled child order, the matching engine 102 may generate and communicate a Native Data Transaction Request Canceled message out via the sequenced message bus 111A. In some embodiments, the feature modules 150 (including Feature Module A 900) will receive the message communicated at 912 and mark the indicated child order as canceled for that parent request (e.g., perform cleanup processing to remove data associated with that child order data store 140N). In some embodiments, feature modules 150 may ignore the Native Data Transaction Request Canceled. In some embodiments, feature modules 150 may mark (e.g., in data store 140N) the child orders as being suspended (e.g., instead of deleting data for such child orders).

After canceling the child orders, the matching engine 102 may perform cleanup processing for the child orders and the parent request.

At 914, the matching engine 102 may update the parent data structure storing data for the parent request to reflect that the parent request is now suspended and generate and send out, via the sequenced message bus 111A at 904, a Parent State message, with the status field of the Parent State message set to "Suspend." As shown in FIG. 9, the processing that is performed from 908, 910, 912, and 914 may be an atomic operation for the matching engine 102.

At 916, the Parent State message may be received by Feature Module A (the owner of the now suspended parent request) and mark the parent request as being suspended by updating data in local data store 140 of Feature Module A for the indicated parent request. For example, the local data store 140 may have a field for the parent request that indicates the state of the parent request. Accordingly, upon reception of the parent state message at 914, the field may be updated to reflect the current state of the indicated parent request. In some embodiments, any time any of the feature modules 150 receives any of the parent state messages discussed herein, this field may be updated to reflect the parent state of the indicated parent request. In some embodiments, only owners of a parent request may track and store this information in their local data store 140.

At 918, other feature modules 154 may also receive the Parent State message. Such feature modules may be those that are not owners for the indicated parent request. In certain embodiments, upon receiving the Parent State message, the feature modules may perform cleanup processing for data related to this now suspended parent request. In other embodiments, upon receiving the Parent State message, the feature modules may update data in the respect local data stores to indicate that the parent request is suspended (e.g., similar to Feature Module A 900).

In some embodiments, the order port 130 may receive the Parent State message and then generate and transmit, at 920, an Order Status message to the client system 114 indicating that parent request has been suspended (e.g., notifying the client system 114 that the indicated parent request, which may be identified using the client identifier for that parent request, has been suspended and, in certain examples, a reason for the suspension). In other examples, no message is communicated to the client system 114 when a parent request enters a suspend state. The order port 130 may also, in some embodiments, update the local data store 140B to reflect that the parent request is now in a suspended state.

In some embodiments, the processing that is shown at 916, 918, and 920 may be performed in response to receiving the Parent Suspend Message 908, receiving one or more of the Native Data Transaction Request Canceled Message(s) at 912, and/or receiving the Parent Stats Message communicated at 914. In some embodiments, reception of the Parent Suspend Message 908 may cause Feature Modules 154 and/or 900 update their respective local data stores 140 that the parent request is being suspended (which may then be used to halt any further operations for that parent request). Then, upon reception of the Parent State Message communicated at 914, the data for the parent request in the data store of Feature Modules 154 may be deleted from the local data store (e.g., via cleanup processing).

Following the operations shown in FIG. 9, parent requests may be unsuspended (e.g., enabled) as discussed in connection with FIG. 10 or canceled as discussed in connection with FIGS. 6-8 (e.g., via the Parent Cancel Feature Module 174, via a client request, etc.). For example, the Parent Cancel Feature Module 174 may maintain a timer that tracks the amount of time that the parent request has been suspended. If this timer expires (e.g., reaches a threshold), then the Parent Cancel Feature Module 174 may issue a Parent Cancel Command as described in connection with FIG. 8.

12. Description of FIG. 10

FIG. 10 is a sequence diagram showing exampling processing that may be performed in the system 100 of FIG. 1A in some embodiments. More particularly, FIG. 10 shows example processing for the resumption of a parent request that has been suspended.

The operations of FIG. 10 may be performed after the "booking" and then suspension of a parent request. Feature Owner Module A 1000, shown in FIG. 10, is the "owner" feature module for the parent request that will be resumed. In some embodiments, the booking of the parent request may have occurred in accordance with FIG. 2A-2B (in which case Feature Module A 1000 of FIG. 10 may have played the role of/performed the actions performed by Feature Module A 200 as shown in and described with reference to FIGS. 2A-2B); and/or, in some embodiments, the suspension of the parent request may have occurred in accordance with FIG. 9 (in which case Feature Module A 1000 of FIG. 10 may have played the role of/performed the actions performed by Feature Module A 900 as shown in and described with reference to FIG. 9).

At 1002, Feature Module A 1000 may monitor the sequenced message bus 111A and/or other data feed messages (e.g., from incoming data feed 116) and determine that a trigger condition for resuming the suspended parent request has been met. In some embodiments, Feature Module A 1000 may internally determine the resumption process should be triggered. For example, a timer may be internally maintained by Feature Module A 1000 and used to determine when a resumption process should be triggered.

Based on determining that the parent request should be resumed, Feature Module A 1000 proceeds with adding a child order for the parent request that is being resumed in a manner similar to that discussed in connection with FIG. 2A. More specifically, once the resumption condition is met, then, at 1004, Feature Module A 1000 may generate and transmit, via the command bus 111B and to the matching engine 102, a New Child Data Transaction Request Command message that will result in addition of a new child order for the parent request. This message may have the same or similar content, mutatis mutandis, as the message discussed in connection with 224 in FIG. 2A.

At 1006, the New Child Data Transaction Request Command is received. Based on the message received at 1006, the matching engine 102 generates a new order ID for the new child order and performs order processing for the new child order. This processing may be similar to, mutatis mutandis, the processing discussed in connection with 226 in FIG. 2A. In some embodiments, based on reception of this request, the matching engine 102 may update the parent data structure to indicate that the parent request for this message is no longer suspended. Alternatively, the parent request data structure may not keep a field for the parent state.

At 1008, the matching engine 102 generates and submits, to the sequenced message bus 111A, a New Native Data Transaction Request Accepted message that includes the parent identifier of the parent request and the order ID of the newly generated child/native order. This message may have the same or similar content, mutatis mutandis, as the message discussed in connection with 228 in FIG. 2A.

In some embodiments, the matching engine 102 may also generate and transmit a Parent State message to indicate that the parent request is no longer suspended (e.g., the opposite of the message communicated at 914). The parent state message may specify "Active", "Resume," or the like to indicate that the previously suspended parent request is no longer suspended. In some embodiments, the New Native Data Transaction Request Accepted message may be used by feature modules that receive that message to infer that the parent identifier for the new child is no longer suspended (e.g., an no explicit resume message may be communicated).

At 1012 and 1014, Feature Module A 1000, and other features modules N 154, may receive the message communicated from 1008. In response to this message, the features modules may perform further actions in a manner similar to that discussed in connection with 234 and 236 in FIG. 2.

At 1016, the order port 130 may receive the New Native Data Transaction Request Accepted message. The order port 130 may process this message an determine that the parent request is no longer suspended. Based on this determination, the order port 130 may generate and transmit, to the client system 114, an Order Status message that indicates that the parent request is no longer suspended. However, in some embodiments, the suspend/resume states may not be communicated to the client system 114. In some embodiments, the order port 130 may also update its local data store 140B to reflect that the parent request associated with this new order is no longer suspended.

Note that the Order Status message communicated to the client system 114 at 1016 may be different than the Restatement Message 238 communicated to the client system 114 in FIG. 2. The difference in processing performed with respect to, for example, reception of the New Native Data Transaction Request Accepted Message in FIGS. 2A and 10 may be due to the stored state of the parent request at the data store 140B of the order port 130. In FIG. 10, the order port 130 may have stored in the local data store 140B that the parent request for which the newly accepted order is associated with is suspended. In such a case, the order port 130 may determine that no restatement message may be communicated for this "new" order because it is not new from the perspective of the client. Rather, the order port 130 may generate and transmit a message that the client request associated with the parent request has been resumed (as the client system 114 may have earlier received a status message indicating suspension of their request at 920 in FIG. 9). However, in some embodiments, a restatement message may be communicated to the client system (e.g., to inform the client system of the new order identifier for the newly created order associated with the now resumed parent request).

13. Description of FIG. 11

FIG. 11 is a sequence diagram showing example processing that may be performed in the system 100 of FIG. 1A in some embodiments. More particularly, FIG. 11 shows example processing to replace an existing (i.e., booked) parent request with a new parent request.

In some instances, as will be described below, the processing of FIG. 11 may result in a different feature module becoming the owner of the new parent request. In other words, if a first feature module that was the owner of the booked parent request, a second (different) feature module may be the owner of the new parent request that is replacing the "booked" parent request). The changing/replacement of the feature module that is the owner of a parent request may occur if a client decides to, for example, add or remove a feature (e.g., discretion) from a reserve order or if a client decides to change the peg type for an order, etc., such that the order that is replacing the booked order may require a different owner feature module from the booked order.

On the other hand, it is possible to replace a booked parent request with a new parent request while having the same feature module as the owner of both the booked parent request and the new parent request (i.e., without changing the feature module that is the owner). For example, a request from a client may initially have both a pegging (handled by one of the pegging feature modules 164, 166, 168, and 170) and a discretion feature (handled by Discretion Feature Module 162). However, the client may decide to remove the discretion feature while maintaining the same pegging feature. In such a case, the feature module that is the owner of the first parent request (one of the pegging feature modules) will also be the feature module that is the owner of the second parent request. In some embodiments, even where the feature module that is the owner remains unchanged, the process that is shown in FIG. 11 will be performed. In other words, the original parent will be replaced with a new parent request (with the same owner feature module). Further, all of the native orders that are children of the original parent will be canceled, and processing/generating native orders that are children of the new parent request will then be performed as discussed elsewhere herein.

In any event, as will be described in further detail below, the processing as visually depicted in FIG. 11 is focused on instances where a different feature module replaces of the feature module that is the owner of the initial parent request. As noted, the processing shown in FIG. 11 may be performed after a parent request has been "booked." In some embodiments, the parent request may have been booked in accordance with FIGS. 2A-2B. In such an instance, Feature Module B 1102 shown in FIG. 11 (which is the "old owner") may have played the role of/performed the actions performed by Feature Module A 200 as shown in and described with reference to FIGS. 2A-2B (as Feature Module A 200 plays the role of "owner" during the booking described in FIGS. 2A-2B).

At 1110, the client system 114 submits a Replace Request message. This Replace Request message may be an OUCH message (e.g., part of the OUCH protocol) communicated using the SOUP protocol and include a client reference number for an existing parent request that is being handled by the distributed computing system 100. The Replace Request message at 1110 may also include attributes that will be used to define or determine what type of request (e.g., or an unmanaged/native order or a parent request, and what features are associated with such a parent request), is now to be associated with the client request that is subject of the Replace Request message. For example, the Replace Request message may specify a reserve amount (indicating that the Reserve Feature Module 160 will be associated with this request) or may specify a type of peg (e.g., a market peg) indicating that the market peg processing request will be used with the new parent request. Other attribute data may also be included in the Replace Request message. This data will be used to determine how the system 100 should process the Replace Request message.

The Replace Request message is received and then processed by the order port 130 at 1112. This processing may include, for example, the order port 130 using the provided client reference number to look up (e.g., from data store 140B) order information for the parent request (old parent request) that is to be replaced. The information retrieved may include the parent identifier and/or the parent locate identifier.

Continuing at 1112, in some embodiments, the order port 130 may also process the attribute data included in the Replace Request message in order to determine the type of parent request for the new parent request (or, more generally, how the Replace Request message from the client should be handled by the system 100). This processing may be the same or similar to the processing that is performed as part of 212 in FIG. 2A, mutatis mutandis, and may include determining the type of feature module that is to be the owner for the new parent request. This processing may also include determining what other feature modules may be associated with the new parent request (even if they will act in a non-owner fashion with request to the new parent request).

Continuing at 1112, in some embodiments, the order port 130 may perform validation processing on the Replace Request message (and/or the information contained therein) to ensure that the type of replace that has been requested is valid. For example, certain types of replace actions may not be allowed by the distributed computing system 100 (e.g., from a specific feature module to another type of feature module). As another example, the validation checks may assist in ensuring that all the necessary data is included in the replace request in order for the parent request to be carried out by the distributed computing system 100.

Note that the processing that is performed at 1112 may include determining: (a) whether the current request that is associated with the client reference number is for a parent request or is associated with an unmanaged/native request; and (b) whether the "new" request that is specified in the replace request from the client will be for a parent request or an unmanaged/native request. The distributed computing system 100 may perform different processing depending on the nature of this determination. Specifically, when both the current and new requests are for parent requests, then the processing shown in FIG. 11 may be performed. When the current request is for an unmanaged/native request to a new parent request, then the processing shown in FIG. 12 may be performed. When the current request is for a parent request and to a new unmanaged/native request, then the processing shown in FIG. 13 may be performed. Accordingly, the processing that is performed at 1112, 1204, 1304 may be the same or similar, with the differences between the three figures being the different actions that are taken in response to different types of replace requests and/or different types of existing parent requests.

Returning to FIG. 11, at 1114, after determining that the Replace Request message from the client will result in a new parent request that will be handled by a new feature module, the order port 130 generates and submits a Parent Replace Command message (which may also be referred to as a "Parent Replace Command"), via the command bus 111B, to the matching engine 102; and this Parent Replace Command is received by the matching engine 102. The Parent Replace Command may include (a) the identifier of the current parent request (e.g., that will be replaced), (b) the locate identifier of the current parent request, (c) data (e.g., an identifier for a feature module) that identifies which feature module will assume ownership of to be created parent request, and (d) additional data the identifies all of the feature modules that will operate in connection with this parent request may also be included (which may be similar to that included in a new parent request as communicated in 214 in FIG. 2A).

As shown in FIG. 11, the processing of 1116, 1118, 1120, 1122, 1124, and 1126 is performed as an atomic operation. As with other atomic operations discussed herein, the order in which these operations are performed may vary from implementation to implementation (for example 1126 may occur before 1124).

At 1116, the matching engine 102 performs operations for processing the replacement. This processing may include the matching engine 102 generating a new parent identifier and adding it to the local data store 126 (e.g., the parent request data structure) of the matching engine 102.

At 1118, after creation of the new parent identifier, the matching engine 102 generates and transmits, via the sequenced message bus 111A, a Parent Replace message that may include (a) the newly generated parent identifier, (b) the old parent identifier, (c) data (e.g., a feature module identifier) that identifies which feature module will be the owner for the newly generated parent request, (d) data for how to create the child orders (e.g., price information, quantity information, etc.), (e) other data to assist non-owner feature modules that will be associated with this new parent request (e.g., data that identifies the features of the parent request, such as reserve, discretion, etc.), and/or (f) a flag to indicate whether this Parent Replace Message should be reported, by the order port 130, back to the client system 114.

The sequenced Parent Replace message from 1118 that was communicated via the sequenced message bus 111A may be received and processed by Feature Module B 1102 that was the owner of the old parent request, Feature Module A 1100 that is the owner of the new parent request, and the order port 130. Feature Module B 1102 may act upon this Parent Replace message based on the parent identifier included therein. Feature Module A 1100 may act up on the parent replace message based on the owner attribute data (e.g., which may be an identifier or a single character that is used to uniquely identify each feature module). The processing performed at 1128 and 1129 is discussed below and may be performed at any time after the Parent Replace message is received by feature modules 1100, 1102.

At 1119, the order port 130 may also act upon the Parent Replace message communicated at 1118. The order port 130 may perform the following actions upon reception of the Parent Replace message: (a) generating an Order Replaced message (which may be an OUCH Order Replace message) and communicating the message to the client system 114, and (b) updating the previous data associated with the original customer identifier with the identifier of the new parent request in the order port's 130 local data store 140B. The Order Replaced message communicated at 1119 may act as a confirmation to the Client system 114 that the previously submitted Replace Request message has been processed by the system 100 and may include, in some embodiments, the identifier of the new parent request. In certain embodiments, the flag included in the Parent Replace message may be set so as to indicate that the order port 130 should generate and transmit an Order Replaced message at 1119 that acts as a confirmation to the client system 114 that the Replace Request message from 1110 has been received. FIG. 14 includes an example of where the flag is set for a Parent Replace message (at 1416) so that the order port 130 does not generate a corresponding message for client system 114.

At 1120, matching engine 102 retrieves the data for all of the child orders of the old parent request and performs cancelation processing for each pending child order that is associated with the parent request.

At 1122, Native Data Transaction Request Canceled message(s) are generated for each order that is canceled by the matching engine 102. The messages are transmitted, via the sequenced message bus 111A. In some embodiments, the order port 130 may not communicate such cancelations to the client system 114. This may occur, for example, if the original request from the client (at 1110) was for a replace and thus the client system 114 (and client) may not be expecting a cancelation message, but rather would be expecting a replace message (which is communicated at 1119). In other examples, however, such cancelation messages may be communicated to client system 114.

At 1124, the matching engine 102 performs cleanup processing to remove the remaining data regarding the old parent request. This may include deleting or freeing up memory in its data store 126 (e.g., that is used to store the parent identifiers, reference to child orders, etc.). The matching engine 102 also generates a Parent State message at 1126 indicating the old parent request is now removed from the matching engine. The Parent State message may include the old parent identifier and have the status field set to "Out") and transmits the Parent State message via the sequenced message bus 111A.

Returning to 1128, feature module A 1100 (the new owner) may receive, from the sequenced message bus 111A, the Parent Replace message communicated at 1118. Feature Module A 1100 may determine, based on the contents of the Parent Replace message, that it is the owner of the new parent request and perform new parent processing.

As a result of the processing performed at 1128, at 1132, Feature Module A 1100 may generate and transmit, via the command bus 111B, a New Child Data Transaction Request Command message to submit a new child order to the order book. This request may be similar in nature to that discussed in connection with 224 in FIG. 2A. It will be appreciated that while 1132 is shown occurring after, for example, the Parent State (Out) message of 1126, that the New Child Data Transaction Request Command may be generated any time after reception of the Parent Replace message of 1118 by Feature Module A 1100 (the "new" owner feature module). In any event, the New Child Data Transaction Request Command is received by the matching engine 102 and will be processed after the matching engine has finished processing the Parent Replace Command from 1114.

At 1134, the matching engine 102 performs processing for creating a new child order (e.g., including generating a new order identifier) and/or performing order and/or matching processing at 1134 (e.g., entering it into the order book, determining if a match is present, or the like)—e.g., similar to 226 in FIG. 2A.

At 1136, the matching engine 102 generates, based on the processing performed at 1134, a New Native Data Transaction Request Accepted message, and transmits this message via the sequenced message bus 111A. This New Native Data Transaction Request Accepted message may have the same or analogous contents, mutatis mutandis, as the message from 228 in FIG. 2A; and/or this message may include the newly generated order identifier and/or the identifier of the new parent request.

At 1129, Feature Module B 1102 (the feature module owner for the old parent request) may perform cleanup processing and release (e.g., delete) data associated with the old parent request. In various embodiments, this clean up processing may be performed upon receipt of/in response to (a) the Parent Replace message at 1118, (b) the Parent State message at 1126, or (c) both of said messages (e.g., Feature Module B 1102 may perform some processing based on the message from 1118 and finish processing based on the message from 1126).

At 1138, the order port 130 may generate, in response to and/or based on the New Native Data Transaction Request Accepted message of 1136, a Restatement message, and then communicate the Restatement message to the client computer system 114.

While the example shown in FIG. 11 illustrates changing the owner for the new parent request, in some instances the new parent request may be handled by the same owner. As an example, if a parent request includes both reserve and a midpoint peg, with the midpoint feature module being the owner, then a replace message that removes reserve functionality may stay with the original owner (the midpoint feature module). In such an example, the processing shown in FIG. 11 may differ in that the owner feature module (e.g., the midpoint feature module) may resubmit the child orders that are canceled as part of the processing shown in FIG. 11.

14. Description of FIG. 12

FIG. 12 is a sequence diagram showing example processing that may be performed in the system 100 in some embodiments. More particularly, FIG. 12 shows example processing for the replacement of an existing parent request (e.g., that has already been "booked") with a new unmanaged/native data transaction request (e.g., that does not have a corresponding parent request).

As the processing of FIG. 12 begins, Feature Module A 1200 shown in FIG. 12 is the owner of the existing parent request that will be replaced. In some embodiments, the existing parent request of FIG. 12 may have been booked in accordance with FIGS. 2A-2B. In such an instance, Feature Module A 1200 may have played the role of/performed the actions performed by Feature Module A 200 as shown in and described with reference to FIGS. 2A-2B.

At 1202, client system 114 submits a Replace Request message. As noted above, the messages communicated from the client system 114 at 1110, 1202, and 1302 may be the same Replace Request Message—except in each instance the values for the fields of the message may be different and/or the state of the data transaction request that is being replaced may be different (e.g., a parent request or an unmanaged/native data transaction request). The message may include a client reference number for the existing parent request and additional data that will be used to define or determine what type of request is associated with this Replace Request message. In this instance in FIG. 12, the additional data may include data for the new unmanaged/native order (e.g., price, quantity, etc.).

In response to reception of the Replace Request message from the client system 114, at 1204, the order port 130 may look up the information regarding the booked parent request (i.e., the request that is being replaced) based on the client reference number contained in the message. The order port 130 may also determine (e.g., based on the information obtained from this lookup) that the booked request associated with this customer reference identifier is for a parent request (e.g., instead of being a native request). The order port 130 may also look up or otherwise retrieve data that is stored in association with the booked request (e.g., the parent identifier of the booked request, the parent locate identifier, etc.). The order port 130 may also determine that the Replace Request message indicates a request to replace the booked request (which the order port 130 may have determined is for a book parent request) with an unmanaged/native request.

At 1206, the order port 130 generates and transmits, via the command bus 111B, a Parent Replace Command to the matching engine 102. This Parent Replace Command may include the same or analogous data, mutatis mutandis, as the Parent Replace Command discussed at 1114 in FIG. 11; and/or this Parent Replace Command may include (a) the parent identifier of the old (i.e., current/booked) parent request, (b) the parent locate identifier, and (c) a value of "none," zero, or null for the "new owner feature module" parameter/field (with the none/zero/null value indicating that no owner feature module will replace the current owner feature module).

At 1208, the matching engine 102 receives the Parent Replace Command and begins processing the same by generating a new parent identifier that will be used in connection with a "temporary" parent request.

As noted above, determination of parent identifiers and order identifiers may come from the same pool of numbers (e.g., a pool of unique values, each of which may be assigned to different data transaction request including parent requests and native orders, that is handled by the matching engine 102). For example, the pool may be an increasing integer each time an identifier number is created (e.g., 1, 2, 3, etc.). Accordingly, the parent identifiers and order identifiers are all unique (e.g., a parent request will not have the same identifier as any of the unmanaged/native or child/native orders).

Turning back more specifically to FIG. 12, in this example a parent identifier is created even though a new parent request will not be used in connection with the order that is replacing the existing parent request. A possible benefit of this approach is that other functionality (e.g., the processing discussed in FIG. 11) that is similar may be leveraged for increased efficiency and robustness of the overall system. The creation of this "new" parent request may be temporary in nature and thus this new parent request may be thought of as a temporary parent request. As discussed in further detail below the identifier that is generated for the "temporary" parent request may also be used for the to be created unmanaged/native order. Note that the temporary parent request having the same identifier as the newly created unmanaged/native order may be an exception to the above rule that all of the identifiers are unique. This is because the temporary parent request is not used for managing any orders and the temporary parent request is removed by the time the operations shown in FIG. 12 have been completed.

At 1210, a Parent Replace message is communicated out via the sequenced message bus 111A. This message may include (a) the parent identifier of the old parent request, (b) the parent identifier of the "temporary" parent request, (c) attribute data of none (to indicate that no feature module will be the owner of this parent request—e.g., because it will become an unmanaged/native order), and (d) a flag to indicate whether this Parent Replace Message should be reported, by the order port 130, back to the client system 114.

At 1212, the matching engine 102 performs cancelation processing to cancel any pending child data transaction requests of the old parent request.

At 1214, each of the cancelations may result in a Native Data Transaction Request Canceled Message that is sent out over the sequenced message bus 111A. As with the cancelation messages discussed in connection with FIG. 11, these may be ignored by the order port 130 and not communicated to the system 114. In other examples, the order port 130 may communicate such cancelations to the client. In some embodiments, the order port 130 maintains a list of child orders for each parent request and may thus remove (e.g., delete) that information upon reception of the cancelation messages sent at 1214.

At 1216, the matching engine 102 may perform cleanup processing for the old parent request (e.g., stored in data store 126).

At 1218, the matching engine 102 communicates, via the sequenced message bus 111A, a Parent State message related to the old parent request. This Parent State message may include the identifier of the old parent request and have a status parameter set to a value of "Out."

At 1220, the matching engine 102 creates a new unmanaged/native data transaction request. As alluded to above in connection with 1208, the order identifier for this new data transaction request (i.e., order) may be set to the already generated identifier for the "temporary" parent request. However, in some embodiments a new order identifier (e.g., that is different than the one created for the "temporary" parent request) may be generated. This order identifier (an order identifier for a native/unmanaged order—sometimes called a "native order identifier" herein) may be sequential with the identifier generated for the temporary parent request.

In some examples, the parameter values for newly generated unmanaged/native data transaction request may be based on information contained in the Parent Replace Command. For example, the price, quantity and other data may have been provided in the Replace Request message from the client system 114. In some embodiments, parameter values for this new native data transaction request may be determined from parameter values from one or more of the canceled child data transaction requests. For example, if the now-canceled child request was for 200 @ $50, then the new unmanaged/native data transaction request may be for the same quantity and amount.

At 1222, once the details of the new unmanaged/native order are generated, the matching engine 102 communicates a New Native Data Transaction Request Accepted Message, via the sequenced message bus 111A. This message will include details of the newly created unmanaged/native order (e.g., similar to 228 in FIG. 2A) indicating that the matching engine has accepted this new order. The message that is communicated may the same as other messages sent upon acceptance of a new order (e.g. whether child orders of a parent request or native orders with no parents). As noted above, the orderID of the newly added order will be the newly generated parent identifier that was created at 1208.

While the identifier for the new unmanaged/native order may be the same as the temporary parent request, in some embodiments, a new identifier for the new unmanaged/native order may be generated. For example, the identifiers generated for the "temporary" parent request and the new unmanaged/native order will be sequential with one another. For example, if the identifier for the "temporary" parent request is 4, then the identifier for the new unmanaged/native order may be 5 (or vice versa). In some embodiments, the sequence of numbers or other identifiers may be other than increasing by a 1 or the like. For example, the identifiers may be generated using a hash function or the like or may be increased by 3 each time (or another number), or other logical ordering. Accordingly, sequences other than increasing by 1 or the like are contemplated in connection with the techniques discussed herein.

In some embodiments, the matching engine 102 may perform match processing for the new unmanaged/native data transaction request. In other embodiments, the matching engine 102 may, in some instances, add the new data transaction request to the order book 124 without performing matching processing; this may be possible if relevant parameter values (e.g., the quantity and/or price) for the new data transaction request are the same as from the child data transaction request that was just canceled at 1212.

At 1224, the matching engine 102 may clean up any leftover data from the temporary parent request that was created (e.g., performing cleanup processing).

At 1226, the matching engine 102 communicates, via the sequenced message bus 111A, a Parent State message for the temporary parent request using a status of "Out." In other words, the matching engine 102 will communicate that the parent status for the "temporary" parent request is now canceled (set to "Out"). The message may include the identifier of the temporary parent request and a null value for a field that is used to identify which feature module 150 is the owner for this parent request (e.g., to indicate that there is no owner).

As indicated in FIG. 12, the processing from 1208-1226 is performed atomically by the matching engine 102.

Based on the messages communicated via the sequenced message bus 111A (e.g., in response to 1210 or 1218), feature module A 1200 and order port 130 may perform processing and take action. At 1228, Feature Module A 1200 may receive the Parent Replace message communicated at 1210 and perform processing for cleanup processing to delete data for the now-replaced parent request. This cleanup may occur also (or alternatively) in response to reception of the Parent State message (which includes the identifier for the now-replaced parent) sent at 1218.

At 1230, the order port 130 may receive and process the sequenced messages concerning the replacement (e.g., from 1210, 1214, 1218, and/or 1222). At 1232, once one, some, or all of the messages related to the replacement have been received, the order port 130 will generate an Order Replace message (which indicates that the subject of the Replace Request message of 1202 has been replaced) and communicate the Order Replace message to the client system 114.

Note that default functionality of the order port 130 may be to relay order accept messages (e.g., 1222) to the client. In this case, however, the order that has been added is not really a "new" order. Instead it is a replace. Accordingly, in response to reception of the message from 1222, the order port 130 will know that order identifier in New Native Data Transaction Request Accepted message is the same as the new parent identifier from the Parent Replace Message at 1210. Based on the identifiers matching, the order port 130 will generate and provide an Order Replaced message at 1232 to communicate to the client system 114. In addition, the order port 130 may also know to ignore the Parent Replace message communicated at 1210 because the order port 130 has determined (e.g., based on the Parent Replace message not specifying an owner feature module) that the existing parent request will not be replaced with a new parent request. Thus, unlike the situation in FIG. 11, the Parent Replace message at 1210 may not be used by the order port 130 to trigger sending an Order Replaced message to the client system 114. Rather, the Order Replaced message may be communicated based on reception of the New Native Data Transaction Request Accepted message at 1222.

15. Description of FIG. 13

FIG. 13 is a sequence diagram showing example processing that may be performed in the system 100 of FIG. 1A in some embodiments. More particularly, FIG. 13 shows example processing for the replacement of an existing unmanaged/native data transaction request with a new managed/parent request.

The processing shown in FIG. 13 may occur after an unmanaged/native data transaction request has been "booked" in the system 100 (and has been added to the order book 124 of the matching engine 102). As this booked data transaction request is an unmanaged/native data transaction request, none of the feature modules 150 would be the owner for it as the processing of FIG. 13 begins.

At 1302, client system 114 submits a Replace Request message. The Replace Request message may include a client reference number for the booked data transaction request and attributes that will be used to define or determine the type of parent request that will replace the booked request.

At 1304, the order port 130 receives the Replace Request message and processes it to look up order information based on the provided client reference number. The order port 130 will also determine that the booked data transaction request is an unmanaged/native request and that it will be replaced with a parent request. In conjunction with the determination that a parent request will replace the native request, the order port 130 will also determine which feature module will be responsible for the new parent request (which in this example will be Feature Module A 1300).

At 1306, the order port 130 generates a New Parent Request Command message and transmits the message via the command bus 111B. In some embodiments, this message may include (a) the same or analogous information, mutatis mutandis, as the New Parent Request Command described at 214 in FIG. 2A, (b) data to identify the existing data transaction request (the order identifier for the currently existing order that is being replaced), (c) the locate information for that identifier, and/or (d) data that identifies the type of parent request that will be created and/or which feature module will be the owner of the new parent request.

At 1308, the matching engine 102 receives the New Parent Request Command and determines how the message should be processed. This includes performs processing/operations to generate/instantiate a new parent request that will replace the booked unmanaged/native order. In some embodiments, this may include actions such as (a) generating a new identifier for the parent request, (b) storing information in data store 126 regarding the new parent request, (c) generating or determining a parent locate identifier (e.g., based on where data for the parent request will be stored within the data store 126 or the like), and/or (d) performing new parent processing that is the same as or similar to, mutatis mutandis, the new parent processing that occurs at 216 in FIG. 2A.

At 1310, based on the new parent data and processing/operations performed at 1308, the matching engine 102 generates and communicates, via the sequenced message bus 111A, a New Parent message that includes details for the newly-generated parent request. In some embodiments, this New Parent message may include (a) the identifier for (for the to be replaced booked native order), (b) the locate identifier for the native order, (c) the identifier for the new parent request, (d) the locate information for the new parent request, and/or (e) information that is same as or similar to, mutatis mutandis, the information included in the New Parent message of 218 in FIG. 2A (with the additional information regarding the old native order being included). In other words, the replacement of the unmanaged/native order with the new parent request may be similar in some respects to receiving, processing, and adding a new parent request as discussed in connection with FIGS. 2A and/or 2B.

At 1312, the matching engine 102 may retrieve data for the booked native request and perform cancelation processing for it.

Note that while the New Parent Request Command that is communicated at 1306 is the same command as that communicated in connection with, for example, 214, that the values in certain fields are different (e.g., unlike 214, in 1306 an order identifier and order locate are included that refer to an unmanaged/native order). Accordingly, based on the contents of the New Parent Request Command communicated at 1306, the matching engine 102 recognizes that processing this command will also require canceling the indicated pending unmanaged/native order specified in the New Parent Request Command. In other words, unlike the processing shown in FIG. 2A, the New Parent Request Command results in not only the generation of a new parent request (e.g., 1208), but also the cancelation of an existing unmanaged/native order (e.g., 1212). Thus, in certain respects, the New Parent Request Command communicated at 1306 may be viewed as resulting in similar types of operations being performed by the matching engine 102 to when a Parent Replace Command is processed—except in this case an unmanaged/native order is being replaced instead of a parent request (as is shown in FIG. 12).

At 1314, the matching engine 102 may generate and communicate, via the sequenced message bus, a Native Data Transaction Request Canceled message at 1314. Note that the order port 130 will not relay the cancelation message to the client because the order port knows that this order is associated with a replace (due to the reception of the message at 1310). This may be determined by matching the order identifier for the canceled order with the order identifier included in the new parent message communicated at 1310. Instead of communicating a cancelation message, the order port 130 will perform cleanup processing at 1322 with respect to any data regarding the now-canceled unmanaged/native order.

As shown in FIG. 13, the processing performed from 1308 to 1314 is performed atomically by the matching engine 102.

At 1316, Feature Module A 1300 receives New Parent message (from 1310) via the sequenced message bus 111A and determines, based on the contents of the message, that it is to be the owner of the new parent request. The new parent processing performed here may be the same as or similar to, mutatis mutandis, that performed at 220 in FIG. 2A; and thus data for the new parent request may be generated and stored (e.g., in the local data store for the Feature Module A 1300).

The order port 130 also receives the communicated New Parent message. At 1320, the order port 130, in response to/based on the New Parent message, generates and communicates a Replace message to client system 114. The order port 130 may also update/add to its internal data (140B) regarding the details of the new parent request (e.g., the parent locate identifier, the parent identifier, etc.). Note that instead of sending an accept message based on the new parent message (as with the example shown in FIG. 2A), the order port 130 will send a Replace message at 1320 as the New Parent message includes the old identifier information of the replaced unmanaged/native order. This indicates that the old unmanaged/native order has been replaced and it is not (from the perspective of the client system 114) a "new" order (e.g., as is shown in FIG. 2A). Instead it is an order that "replaced" a previous order. Thus, the processing and the message that is communicated to the client system 114 may be based on a combination of the message(s) received from the matching engine 102 and the task or message initially received by the order port 130 (e.g., at 1302).

At 1318, based on the new processing performed by Feature Module A 1300 at 1316, Feature Module A 1300 generates and transmits, via the command bus 111B, a New Child Data Transaction Request Command message to the matching engine 102. This message may include all of the order details needed to create a new order for the matching engine at 1324. This message may include (a) the parent identifier of the parent request, and/or (b) the same or similar content, mutatis mutandis, as the message discussed in connection with 224 in FIG. 2A.

After accepting the new child order at 1324, the matching engine 102 generates and transmits at 1326, via the sequenced message bus, a New Native Data Transaction Request Accepted message that indicates acceptance of the order. This message includes the parent identifier of the parent request. In some embodiments, this message may be used to inform other components in the system 100 (including feature modules 150 and order port 130) that the replace task has been completed (or that the new parent request, and at least one child, is now active). For example, the processing shown in FIG. 2B may be performed. Alternatively, or in addition, other feature modules may act upon the reception of the message that is communicated at 1326.

At 1328, the order port 130 may receive the New Native Data Transaction Request Accepted message that includes the identifier of the parent request and the identifier of the newly accepted child order. The order port may generate and communicate a restatement message to client system 114 with information on the newly accepted child order. The processing performed in connection with may be similar to 238 in FIG. 2A and/or 1138 in FIG. 11.

In some embodiments, the matching engine 102 may also perform matching processing at 1324, or after 1324, (e.g., entering it into the order book, determining if a match is present, or the like)—e.g., similar to 226 in FIG. 2A.

16. Description of FIG. 14

FIG. 14 is a sequence diagram showing example processing that may be performed in the system 100 of FIG. 1A in some embodiments. More particularly, FIG. 14 shows example processing to change the owner feature module for an existing/booked parent request.

In certain instances, it may be advantageous to change which feature module is an owner of a parent request. As one particular example of this, the Late Open Feature Module 172 (which handles orders that are late on-open orders) may be the initial owner of a parent request. Upon completion of processing for late on-open orders, the Late Open Feature Module 172 may be configured determine what feature module should now be the owner and replace the Late Open Feature Module 172 as owner for this parent request. This determination may be based on the parameters of the parent request and what features (if any) are associated with the current parent request.

In both the processing of FIG. 14 and the processing of FIG. 11, a new feature module may take ownership of an existing parent request; however, the processing of FIG. 14 differs from the processing of FIG. 11 in certain respects in that the determination to change (e.g., replace) an existing parent request with a new parent request (that has a different owner) may be made by a feature module 150 (or other module besides the order port 130). In other words, the triggering of the change in ownership may be triggered by other than a request communicated from a client system 114.

As the processing of FIG. 14 begins, Feature Module A 1400 shown in FIG. 14 is the owner of the existing/booked parent request whose owner will be replaced; and, as will be described below, Feature Module B 1402 shown in FIG. 14 is the feature module that replaces Feature Module A as the owner of the existing/booked parent request. In some embodiments, the existing/booked parent request of FIG. 14 may have been booked in accordance with FIGS. 2A-2B. In such an instance, Feature Module A 1400 may have played the role of/performed the actions performed by Feature Module A 200 as shown in and described with reference to FIGS. 2A-2B. Alternatively or additionally, in some embodiments (as discussed above), Feature Module A 1400 may be the Late Open Feature Module 172.

At 1410, Feature Module A 1400, which is the current owner feature module for the existing/booked parent request, determines which other feature module 150 should become the owner for the pending parent request. In some embodiments, this determination may be based on messages received by Feature Module A 1400 from the sequenced message bus 111A and/or messages from other sources (e.g., incoming data feed 116). For example, the matching engine 102 may communicate a message indicating that the late-open process is complete. In a case where the Late Open Feature Module 172 is the owner, it may receive this message and trigger the processing in 1410. In some embodiments, the determination may be based on, for example, data that is stored internally to Feature Module A 1400. For example, the data may be stored in the local data store 140 of the feature module—with an internal timer that is maintained by the owner feature module Feature Module A 1400 or the like.

At 1412, Feature Module A 1400 communicates, via the command bus 111B, a Parent Restatement Command message that includes the determined new owner and the identifier of the pending/booked parent request. Note the Parent Restatement Command may be somewhat similar in functionality to a Parent Replace Command (i.e., 1114 and 1206). In some implementations, Parent Restatement Commands are designed so as to be generated and transmitted by feature modules (e.g., internally processed) and Parent Replace Commands are designed so as to be generated and transmitted by order port 130 (e.g., in response to received client requests).

The Parent Restatement Command communicated at 1412 is received by the matching engine 102. At 1414, the matching engine 102, in response to the Parent Restatement Command message, generates new parent request data (e.g., a new parent identifier, locate identifier, etc.) to create/instantiate the new parent request.

At 1416, the matching engine 102 generates and transmits, via the sequenced message bus 111A, a Parent Replace message that includes (a) the identifier of the old parent request (i.e., the existing/booked parent request), (b) the identifier for the new parent request, (c) data to identify the owner feature module that will become the new owner (e.g., Feature Module B 1402), and a flag that is used to indicate to the order port 130 to ignore or not relay the Parent Replace message to the client system 114. The Parent Replace message communicated at 1416 may be the same message communicated 1210 in FIGS. 12 and 1118 in FIG. 11—except with different values for the various fields of the message. It will be appreciated that the other messages communicated over the sequenced message bus 111A and/or the command bus may also include such a flag to thereby inform the order port 130 (or other processing instances in the system 100) whether to inform the client system 114 of the message it just received.

At 1418, the matching engine 102 performs cancelation processing for any child orders for the old parent request.

At 1420, the matching engine 102 may communicate, for each cancelation, a Native Data Transaction Request Canceled message containing information regarding that cancelation out via the sequenced message bus 111A.

At 1422, the matching engine 102 generates and communicates, via the sequenced message bus 111A, a Parent State message for the old parent request with a status of "Out."

As shown in FIG. 14, the processing performed at 1414-1422 is performed atomically by the matching engine 102. As with the other processing that is discussed as being performed atomically herein, the ordering of the specific steps may be varied depending on application need and whether a given element requires data from a preceding element (e.g., a new parent identifier is generated before it is included in a sequenced message).

At 1424, Feature Module A 1400 may receive the Parent Replace message (from 1416) and/or the Parent State message (from 1422) and, responsive to one or both of said message, may clean up any old data regarding the old parent request.

At 1426, Feature Module B 1402 may receive the Parent Replace message with the new order identifier and determine that it is the owner based on the owner information included in the Parent Replace message. Feature Module B 1402 may then generate and transmit, via the command bus 111B, a New Child Data Transaction Request Command message to the matching engine 102 at 1428. This New Child Data Transaction Request Command message may include the same or similar content, mutatis mutandis, as the message discussed in connection with 224 in FIG. 2A.

At 1430, the matching engine 102 may receive the New Child Data Transaction Request Command message and perform order processing to add a new child/native order to the order book. In some embodiments, match processing may also be performed for the newly created child order. In some embodiments the processing performed by the matching engine 102 at 1430 may be the same as or similar to, mutatis mutandis, the processing performed at 226.

At 1432, the matching engine 102 generates a New Native Data Transaction Request Accepted message and transmits the message via the sequenced message bus 111A. This New Native Data Transaction Request Accepted message may include the same or similar content as the, mutatis mutandis, the New Native Data Transaction Request Accepted message from 228, including e.g. the identifier of the new parent request for the added new child/native order.

As with other New Native Data Transaction Request Accepted Messages that are communicated on the sequenced message bus 111A, the order port and/or other processing instances (e.g., other feature modules) may receive this message and take further actions (e.g., generating new orders in the case of feature modules or reporting the new child/native order to the client computer system 114 as shown in 238 in FIG. 2A).

As noted above, the processing of FIG. 14 may in some embodiments be used for orders that are classified as late "on open" orders. As a variation on what was previously described, in some embodiments, the Late Open Feature Module 172 may continue to perform actions/operations that are consistent with an owner role even after the late open process is completed. In such a case, the Late Open Feature Module 172 may determine that an existing parent request does not have any other features (e.g., discretion or the like) and thus the Late Open Feature Module 172 may kept itself as the "owner" feature module for the existing parent request (and any child orders that are currently pending for that parent request). In other words, the Late Open Feature Module 172 may maintain ownership of a parent request (and the associated child orders) even if its "job" (e.g., managing the late open process) is fulfilled.

17. Description of FIG. 15

FIG. 15 is a block diagram of an example computing device 1500 (which may also be referred to, for example, as a "computing device," "computer system," or "computing system") according to some embodiments. In some embodiments, the computing device 1500 includes one or more of the following components: one or more processors 1502 (which may be referred to as "hardware processors" or individually as a "hardware processor"); one or more memory devices 1504; one or more network interface devices 1506; one or more display interfaces 1508; and one or more user input adapters 1510. Additionally, in some embodiments, the computing device 1500 is connected to or includes a display device 1512. As will explained below, these elements (e.g., the processors 1502, memory devices 1504, network interface devices 1506, display interfaces 1508, user input adapters 1510, display device 1512) are hardware devices (and are comprised of electronic circuits/circuitry) that are configured to perform various functions for the computing device 1500. In some embodiments, these components of the computing device 1500 may be collectively referred to as computing resources (e.g., resources that are used to carry out execution of instructions and include the processors (one or more processors 1502), storage (one or more memory devices 1504), and I/O (network interface devices 1506, one or more display interfaces 1508, and one or more user input adapters 1510). In some instances, the term processing resources may be used interchangeably with the term computing resources. In some embodiments, multiple instances of computing device 1500 may arranged into a distributed computing system.

In some embodiments, each or any of the processors 1502 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), or a Field Programmable Gate Array (FPGA) circuit. In some embodiments, each or any of the processors 1502 uses an instruction set architecture such as x86 or Advanced RISC Machine (ARM).

In some embodiments, each or any of the memory devices 1504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software instructions that are executed on or by processors 1502). Memory devices 1504 are examples of non-transitory computer-readable storage media. Memory devices 1504 that are located within the computing device 1500 may be called local memory and distinguished from external memory in that access to local memory does not require communicating with other computing device via the network interface devices 1506.

In some embodiments, each or any of the network interface devices 1506 (a) includes one or more circuits such as a baseband processor and/or a wired or wireless transceiver, and (b) implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). A transceiver may comprise circuitry for a transmitter and a receiver. In some embodiments, the transmitter and receiver of a transceiver may share a common housing and may share some or all of the circuitry in the housing to perform transmission and reception; in some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1506 may include ports or other connections that enable such connections to be made and communicate data electronically among the various components of a distributed computing system. For example, the sequencer module 120 and matcher module 122 may in some embodiments communicate with one another using an electronic data network even though they are executing on the same hardware processor (e.g., the same processing core). Also, any of the communication that is described in this specification as occurring via the data subsystem 110 (e.g., the sequenced bus 111A and/or the command bus 111B) may occur via an electronic data network.

In some embodiments, each or any of the display interfaces 1508 is or includes one or more circuits that receive data from the processors 1502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1512, which displays the image data. Alternatively, or additionally, in some embodiments, each or any of the display interfaces 1508 is or includes, for example, a video card, video adapter, or graphics processing unit (GPU).

In some embodiments, each or any of the user input adapters 1510 is or includes one or more circuits that receive and process user input data from one or more user input devices (not shown in FIG. 15) that are included in, attached to, or otherwise in communication with the computing device 1500, and that output data based on the received input data to the processors 1502. Alternatively or additionally, in some embodiments each or any of the user input adapters 1510 is or includes, for example, a PS/2 interface, a USB interface, a touchscreen controller, or the like; and/or the user input adapters 1510 facilitates input from user input devices (not shown in FIG. 15) such as, for example, a keyboard, mouse, trackpad, touchscreen, etc.

In some embodiments, the display device 1512 may be a Liquid Crystal Display (LCD) display, Light Emitting Diode (LED) display, or other type of display device. In embodiments where the display device 1512 is a component of the computing device 1500 (e.g., the computing device and the display device are included in a unified housing), the display device 1512 may be a touchscreen display or non-touchscreen display. In embodiments where the display device 1512 is connected to the computing device 1500 (e.g., is external to the computing device 1500 and communicates with the computing device 1500 via a wire and/or via wireless communication technology), the display device 1512 is, for example, an external monitor, projector, television, display screen, etc.

The computing device 1500 may be arranged, in various embodiments, in many different ways. In various embodiments, the computing device 1500 includes one, or two, or three, four, or more of each or any of the above-mentioned elements (e.g., the processors 1502, memory devices 1504, network interface devices 1506, display interfaces 1508, and user input adapters 1510). Alternatively, or additionally, in some embodiments, the computing device 1500 includes one or more of: a processing system that includes the processors 1502; a memory or storage system that includes the memory devices 1504; and a network interface system that includes the network interface devices 1506. Alternatively, or additionally, in some embodiments, the computing device 1500 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1502 and the network interface devices 1506; or the single SoC (or the multiple SoCs) may include the processors 1502, the network interface devices 1506, and the memory devices 1504; and so on. Further, the computing device 1500 may be arranged in some embodiments such that: the processors 1502 include a multi- (or single)-core processor; the network interface devices 1506 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 1504 include a RAM and a flash memory. As another example, the computing device 1500 may be arranged in some embodiments such that: the processors 1502 include two, three, four, five, or more multi-core processors; the network interface devices 1506 include a first network interface device that implements Ethernet and a second network interface device that implements WiFi and/or Bluetooth; and the memory devices 1504 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the matching engine 102, sequencer module 120, matcher module 122, processing instances, any of the feature modules 150, order port 130, outgoing data feed 132, client system 114, order book(s) 124, data store 126, and data stores of any of the feature modules 150, each of which will be referred to individually for clarity as a "component" for the remainder of this paragraph, are implemented using an example of the computing device 1500 of FIG. 5. In such embodiments, the following applies for each component: (a) the elements of the 1500 computing device 1500 shown in FIG. 15 (i.e., the one or more processors 1502, one or more memory devices 1504, one or more network interface devices 1506, one or more display interfaces 1508, and one or more user input adapters 1510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1504 (e.g., in various embodiments, in a volatile memory device such as a RAM or an instruction register and/or in a non-volatile memory device such as a flash memory or hard disk) and all actions described herein as performed by the software modules are performed by the processors 1502 in conjunction with, as appropriate, the other elements in and/or connected to the computing device 1500 (i.e., the network interface devices 1506, display interfaces 1508, user input adapters 1510, and/or display device 1512); (c) alternatively or additionally, to the extent it is described herein that the component processes and/or otherwise handles data, in some embodiments, such data is stored in the memory devices 1504 (e.g., in some embodiments, in a volatile memory device such as a RAM and/or in a non-volatile memory device such as a flash memory or hard disk) and/or is processed/handled by the processors 1502 in conjunction, as appropriate, the other elements in and/or connected to the computing device 1500 (i.e., the network interface devices 1506, display interfaces 1508, user input adapters 1510, and/or display device 1512); (d) alternatively or additionally, in some embodiments, the memory devices 1502 store instructions that, when executed by the processors 1502, cause the processors 1502 to perform, in conjunction with, as appropriate, the other elements in and/or connected to the computing device 1500 (i.e., the memory devices 1504, network interface devices 1506, display interfaces 1508, user input adapters 1510, and/or display device 1512), each or any combination of actions described herein as performed by the component and/or by any software modules described herein as included within the component.

Consistent with the preceding paragraph, as one example, in an embodiment where plurality instances of the computing device 1500 are used to provide a distributed computing system, memory devices 1504 of one or more of the instances may store a dual-sided data structure (e.g., an order book) and parent request data structure. Different processors 1502 of different instances may execute different ones of feature modules 150 (such as those 160, 162, 164, 166, 166, 168, 170, 172, 174 shown in FIG. 1B), the matching engine 102, and the other modules 130, 132 in the system 100. The modules mentioned in the preceding sentence may communicate via respective network interface devices 1506.

The hardware configurations shown in FIG. 15 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 15, (e) via other hardware arrangements, architectures, and configurations, and/or via combinations of the technology described in (a) through (e).

18. Technical Advantages of Described Subject Matter

The following paragraphs describe technical advantages that may be realized in accordance with various embodiments discussed herein.

In some embodiments, a distributed computing system is provided that executes a plurality of different types of feature modules that handle processing for parent requests/managed orders. In the distributed computing system, communications between a matching engine and the different feature modules are performed using a command bus (to provide commands to the matching engine) and a sequenced message bus (that provides messages from the matching engine). This implementation (i.e., the use of the command bus and sequenced message bus) allows feature modules to directly respond to and act upon sequenced messages provided via the sequenced message bus without relying on an intermediary system or process, which has the effects of reducing latency in the distributed computing system and improving the overall efficiency in the distributed computing system.

In the architecture for the distributed computing system 100 described herein, feature modules (that are configured to/programmed to handle different kinds of functionality) are included within the distributed computing system (this architecture is referred to below as the "described architecture"). The described architecture is different from prior architectures wherein the functionality handled by the feature modules in the described architecture would be handled by a separate/distinct system outside of the distributed computing system (these prior architectures are referred to herein as "prior architectures"). One example of such a prior architecture is the architecture that is used for the Nasdaq Stock Market that involved the use of the external Routing and Special Handling (RASH) system. The described architecture achieves latency improvements (e.g., which may be significant) over prior architectures. In some illustrative examples, the described architecture achieves latency of between 4-8 microseconds per operation (e.g., the amount of time it takes for a command to be communicated from a feature module and processed by the matching engine 102). For example, in the described architecture the submission of a Parent Cancel Command at 606 and the subsequent initial processing at 608 may be performed in around 4-8 microseconds. In contrast, the analogous processing in prior architectures (e.g., when running in the same type of environment/on the same hardware) could require at least 40-50 microseconds per operation. Accordingly, the described architecture results in latency improvements (e.g., by about an order of magnitude) over prior architectures. It will be understood that other example latency times may be achieved as a result of using different hardware (e.g., faster/slower processors, memory, network technology, etc.) in connection with implementing the described architecture and/or the prior architecture.

In addition to the per-operation latency improvements noted in the preceding paragraph, the described architecture provides for further, more-granular performance improvements. In some instances, feature modules perform processing in response to changes in the data within the distributed computing system's order book. Because in the feature modules in the described architecture are included within the distributed computing system itself (as opposed to being external to the distributed computing system), the feature modules receive information regarding the changes to the order book more quickly than prior architectures. And as the feature modules can act on such changes more quickly, the total amount of time it takes for the distributed computing system on the whole to respond to a change in order book data is decreased. This manifests as decreased latency and overall enhanced performance for the distributed computing system. And this has a particularly positive impact on the performance of the distributed computing system in regards to resting orders that are subject to frequent and numerous status changes, such as discretion and pegged orders.

In some examples, implementing the functionality within the feature modules described herein allows those features modules to act upon and use data that would not otherwise be available. In particular, not all of the data communicated from the matching engine (or other sources in some examples) may be available to systems that are external to the distributed computer system. For example, not all of the data (e.g., messages communicated via the sequenced message bus) relating to changes or the status of the order book(s) in the matching engine may be provided to external systems. In the case of a discretion or pegging feature modules, more accurate, detailed, and/or up-to-date data can be advantageous as it may be used to improve the responsiveness, accuracy, and/or efficiency of the functionality provided by the pegging or discretion feature modules. Due to receiving messages off the sequenced message bus, the pegging or discretion feature modules can update their respective local data stores (e.g., a local version of an order book) so as to, for example, calculate possible discretion matches or initiate replacement commands for pegged orders. The data that the pegging and discretion feature models may be substantially similar to the data that is actually within order book. Such data may not be made available to external systems and thus implementing pegging or discretion functionality within the distributed computer system may be a technical advantage over prior architectures (e.g., where the functionality of the discretion feature module is provided externally to the distributed computing system). This technical advantage of receiving and using "better" data may be combined with the technical advantage that the data regarding the order book can be processed by the discretion or pegging feature modules more quickly (e.g., because it takes less time to be communicated to the discretion or pegging feature module from the matching engine) than prior architectures.

In some embodiments, the distributed computing system allows processing in the matching engine to remain efficient while also allowing for more complex processing/behaviors for parent requests to be handled by feature modules that are distributed among other computing resources of the distributed system. With this type of implementation, the throughput of the matching engine of the distributed computing system may be relatively unaffected while at the same time the distributed computing system may offer processing of increased complexity via the different types of feature modules. In other words, the amount of time it takes the matching engine to process, for example, any of the Commands discussed herein and/or the amount of time to perform match processing may be relatively unaffected, while at the same time the increased complexity of handling parent requests may be supported by the distributed computing system of the described architecture.

In some examples, separating the functionality of the feature modules from the matching engine provides for increased extensibility of the overall distributed computer system. This extensibility may be realized by providing (and allowing) further new or updated functionality for managed orders or parent requests (e.g., in feature modules) without modifying or impacting (e.g., significantly) how the matching engine operates and/or the performance of the matching engine 102 (e.g., the sequencer and/or the matcher).

Another technical advantage that is achieved by distribution of the processing between the feature modules and the matching engine (e.g., onto separate computing resources) is that such embodiments may allow for increased parallelization and/or scalability of the system. Parallelization is provided because each individual feature module may be able to process data relevant to parent and/or child requests at the same time as the matching engine is performing other processing (possibly in connection with the same child or parent request). Thus, for example, when any or all of the functionality provided by the feature modules is separate (i.e., is implemented on separate computing resources) from the matching engine, such different feature modules may all perform processing while the matching engine continues to perform its processing (e.g., performing match processing, etc.). The described architecture also allows for the system to be scaled to satisfy handling an increasing number of requests. For example, new feature modules may be added to handle more parent requests while maintaining the performance of the matching engine.

The described architecture also provides for technical advantages over other types of implementations that implement the functionality provided by the feature modules within the matching engine (as opposed to in separate modules in the described architecture). A technical advantage over such other types of implementations relates to the amount of time (sometimes called book latency) it takes to process and/or book newly submitted orders (which includes both unmanaged/native and managed/native orders) by the matching engine. In the described architecture, the book latency for entering orders into the system is relatively similar (e.g., on average) to architectures that may only handle booking unmanaged orders. In contrast, book latency in other types of implementations that include the functionality for the feature modules within the matching engine may adversely result in increased book latency. The increased book latency in such implementations may be due to the increased amount of code, or corresponding operations performed by such code, needed to run the matching engine. In other words, the increased complexity of such other implementations may adversely make the matching engine slower (e.g., cause a decrease in throughput) as the time from when a command is received by the matching engine to when it is processed and/or reported out via the sequenced bus may be increased. Increased latency of such other implementations may also be due to the time the matching engine must spend in determining how to book (and/or manage) managed orders (due to the complexity in how such orders, as discussed herein, may be processed). For example, software code for discretion or pegging may need to be run frequently to keep orders that have those features up to date. The extra time it takes to book (and manage) such orders may then result in slowing down the time it takes to book other new orders that are communicated to the matching engine. Such orders may end up being queued up to wait until the matching engine finishes with the more complex processing associated with an order that has, for example, pegging. Note that while it may take less time to fully process a managed order in such other types of implementations, that the overall performance of the system may be decreased. Such a decrease in performance may be reflected in an increase in book latency (e.g., on average). Such a result may be based on the matching engine handling millions or billions of requests per day. Thus, even small increases in latency on a per order basis can add up to slowing down the overall throughput of the system (e.g., increasing book latency) and decreasing performance. Such technical problems may be at least partly addressed through use of the described architecture as the complex processing associated with parent requests is moved to separate feature modules that may be executed on other computing resources.

Another technical advantage of the described architecture over systems that implement the functionality of one or more (or all) of the feature modules within the matching engine may be that the described architecture decreases the complexity of the code base for the matching engine. This then advantageously results in making the software code for the matching engine (and also the feature modules) more manageable to maintain, test, and/or use.

Another technical advantage of the described architecture is that certain existing messages, commands, code bases, and the like may be leveraged to provide the functionality described herein. For example, orders that are included into the order book may be treated the same by the matching engine (for purpose of matching and the like) regardless of whether such orders are unmanaged/native orders or managed/native orders. An example of this advantageous aspect is shown in, for example, when orders are canceled. In such cases, the same message is communicated out over the sequenced message bus regardless of whether an unmanaged/native order or a managed/native order has been canceled. This allows an existing cancelation message to be used (e.g., that is already used in connection with the cancelation of unmanaged/native orders) to provide functionality for when managed/native orders are canceled. Similarly, the functionality of the described architecture may leverage the same or similar commands or messages to provide different functionality to the system. For example, the various parent replace operations discussed herein (e.g., in connection with FIGS. 11-13) may use similar or the same messages/commands in connection with achieving the described functionality. For example, the same Parent Replace command is used in both FIGS. 11 and 12 to provide different replace functionality. Accordingly, the implementation of the described architecture provides for technical advantages in that resources may be reused or recycled to achieve the functionality described herein.

The technical advantages discussed in connection with the described architecture may be realized by implementing a matching engine that does not include (e.g., within the same computer process) the functionality that is provided by any one or all of the feature modules described herein. The distributed approach of the described architecture discussed herein can thus be a technical advantage over other implementations that provide the functionality of the feature modules (e.g., reserve, discretion, pegging, and/or the like) within the matching engine.

In some embodiments, the matching engine may perform two or more operations or tasks in an atomic manner. For example, deleting data for a parent request and deleting data for all child orders may be performed in an atomic manner. These tasks may be performed atomically by the matching engine to ensure that commands communicated to the matching engine are acted upon promptly. This type of implementation may be a technical advantage over other types of implementations where, for example, such tasks are not executed in an atomic manner. For example, a first command may be received to cancel a parent request, followed by a second command to cancel a first child order of the parent request, and a third command to cancel a second child order of the parent request, etc. A possible issue with this approach is that the matching engine may operate on, for example, the second child order between the time the first command is processed and the time the third command is processed. Atomic execution (performing operations atomically as discussed herein) of such tasks ensures that no other commands are processed by the matching engine between the parent and child cancelations. In additional to providing determinism in the described architecture, performing certain multiple operations atomically may result in more efficient operation of the system. This is because the matching engine may perform multiple operations in response to a single command without having to wait for individual commands for each one of the operations (e.g., a separate cancel child command for each child of a parent request). Accordingly, performing certain multiple operations atomically may also improve the overall efficiency of the system. Such advantageous atomic operations may be performed in connection with processing Parent Replace (and Parent Restatement) commands, Parent Suspension Commands, Parent Cancel Commands, and others. The use of atomically performed operations in connection with such commands can facilitate quickly removing data transaction requests from the order book data structure without waiting for individual commands for each child/native data transaction request to be received and processed by the matching engine. Accordingly, the described architecture can improve the efficiency and performance of the overall system in connection with such operations.

In some embodiments, plural operations may not be performed in an atomic manner and may instead use two or more commands to carry out a task. An example of when this occurs in the described architecture is with the discretion feature module and the communication with the matching engine to carry out matching/executing an order with discretion. In such a case, multiple separate commands are individually processed by the matching engine to result in an order that is executed with discretion. The multiple commands include, first transmitting a match now command, followed by an IOC command. The first command is used to identify (or confirm) a potential discretion match (via the match now command) and the second command (via the IOC command) is used to attempt to cause a match This type of architecture of splitting the identification of a potential discretion match and the actual match can be a technical advantage over using one command to do both. In particular, the approach discussed in connection with the described architecture of transmitting multiple commands may provide for increased privacy, prevent information leakage, and preserve anonymity of the party that is associated with the parent request (or more specifically the child order that is associated with the parent request) that is operating with discretion. More specifically, if one command is used is may be easier for third parties to determine the previously booked child order is acting with discretion. This type of information leakage may be disadvantageous, which is at least partly addressed by the implementation of discretion in the described architecture.

In some embodiments, the described architecture may use different types of checks to validate commands communicated to the matching engine from the different types of feature modules. Such validation checks may increase the integrity or efficiency of processing performed by the matching engine. In some embodiments, validation of one or more commands may be based on a sequence number that is increased for each child data transaction that is added for a corresponding parent request. In some embodiments, validation of one or commands may be based on a separate Match Now sequence number that is increased for each Match Now Command issued in connection with a corresponding parent request. In some embodiments, validation of one or commands may be based on the quantity value included in a command to change a different attribute of a resting data transaction request. The separate validation checks may be selected to provide for validation of the one or more selected commands while also decreasing (in comparison to using a single type of validation check) a number of possible validation check failures. In some examples, such validations can be used to provide increased robustness in the distributed computing system by preventing or guarding against duplicate processing of messages. For example, if a message communicated from a feature module is duplicated by the underlying electronic network infrastructure of the distributed computing system, then the matching engine may ignore or drop the duplicated message due to the validation failing (e.g., sequence number used to validate that message would already have been used). This type of implementation thus helps to prevent duplicate processing of messages and promotes efficiency in processing by the matching engine.

Additional technical advantages embodied in the subject matter of this specification beyond those outlined above may be apparent to the skilled person.

19. Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

20. Additional Applications of Described Subject Matter

Although examples are provided herein with respect to the trading of equities (i.e., equity securities/stock), the technology described herein may also be used, mutatis mutandis, with any type of asset, including but not limited to other types of financial instruments (e.g., bonds, options, futures), currencies, cryptocurrencies, and/or non-financial assets. Further, although examples are provided herein with respect to electronic trading platforms, the technology described herein may also be used, mutatis mutandis, with other types of distributed computing systems, including but not limited to telecommunication networks, payment processing systems, industrial control systems, parallel scientific computation systems, smart contract systems, transaction processing systems, distributed databases, and/or other types of distributed systems.

Although process steps, algorithms or the like, including without limitation with reference to FIGS. 2-14, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computing system comprising:
   a plurality of computing devices that communicate by using an electronic data network, the plurality of computing devices including at least a first computing device, each of the plurality of computing devices including at least one hardware processor;
   the first computing device configured to execute a matching engine, which includes a sequencer;
   the plurality of computing devices configured to execute, across different ones of the plurality of computing devices, a plurality of processing instances including at least a first feature processing instance;
   the matching engine comprising instructions that, when executed by the at least one hardware processor of the first computing device, cause the at least one hardware processor of the first computing device to perform operations comprising:
   maintaining a dual-sided data structure, with each side of the data structure containing at least one pending data transaction request, with at least one data transaction request being included on the first side of the dual-sided data structure, the first data transaction request being associated with a parent request that has a parent identifier;

the first feature processing instance comprising instructions that, when executed by at least one hardware processor of the plurality of computing devices, cause the at least one hardware processor of the plurality of computing devices to perform operations comprising:
in response to detection of a triggering condition, generate and transmit, to the matching engine using a command bus, a parent suspend message that includes the parent identifier;
the matching engine comprising instructions that, when executed by the at least one hardware processor of the first computing device, cause the at least one hardware processor of the first computing device to perform operations comprising:
based at least in part on reception of the parent suspend message via the command bus:
(a) generating and transmitting, via a sequenced message bus, a parent suspend message that includes the parent identifier;
(b) performing cancelation processing for any data transaction requests stored in the dual-sided data structure that are associated with the parent request; and
(c) generating and transmitting, via the sequenced message bus, a parent state message that indicates that the parent request has been suspended.

2. The distributed computing system of claim 1, wherein the matching engine further comprises instructions that, when executed by the at least one hardware processor of the first computing device, cause the at least one hardware processor of the first computing device to perform operations comprising:
maintaining a parent request data structure that includes: (1) data for the association between the at least one data transaction request and the parent request; and (2) a child sequence number.

3. The distributed computing system of claim 2, wherein the parent suspend message includes an expected child sequence number.

4. The distributed computing system of claim 3, wherein the matching engine further comprises instructions that, when executed by the at least one hardware processor of the first computing device, cause the at least one hardware processor of the first computing device to perform operations comprising:
validating the parent suspend message by comparing the expected child sequence number included in the parent suspend message with the child sequence number stored in the parent request data structure; and
updating the child sequence number stored in the parent request data structure based on validation of the parent suspend message,
wherein (a)-(c) are additionally based on determining that the expected child sequence number is valid.

5. The distributed computing system of claim 4, wherein the matching engine further comprises instructions that, when executed by the at least one hardware processor of the first computing device, cause the at least one hardware processor of the first computing device to perform operations comprising:
based on determination that the expected child sequence number included in the parent suspend message is not valid, dropping the parent suspend message.

6. The distributed computing system of claim 4, wherein a local version of the child sequence number is stored with the first feature processing instance.

7. The distributed computing system of claim 2, wherein the matching engine further comprises instructions that, when executed by the at least one hardware processor of the first computing device, cause the at least one hardware processor of the first computing device to perform operations comprising:
incrementing the child sequence number based on creation of a new data transaction request that is associated with the parent request.

8. The distributed computing system of claim 1, wherein the matching engine further comprises instructions that, when executed by the at least one hardware processor of the first computing device, cause (a)-(c) to be performed atomically.

9. The distributed computing system of claim 1, wherein the matching engine further comprises instructions that, when executed by the at least one hardware processor of the first computing device, cause the at least one hardware processor of the first computing device to perform operations comprising:
generating and transmitting, for each of the any data transaction requests that are canceled, a canceled message that includes the identifier for that data transaction request and parent identifier.

10. The distributed computing system of claim 1, wherein:
the first feature processing instance comprises instructions that, when executed by at least one hardware processor of one of the plurality of computing devices, cause the at least one hardware processor of one of the plurality of computing devices to perform operations comprising:
determining that a resume condition has been satisfied; and
based on the determination of the resume condition, generating and transmitting, via the command bus and to the matching engine, at least one command to create a new data transaction request that is associated with the parent request as a child,
wherein the matching engine further comprises instructions that, when executed by the at least one hardware processor of the first computing device, cause the at least one hardware processor of the first computing device to perform operations comprising:
based on reception of the at least one command to create the new data transaction request, generating a new order identifier for the new data transaction request;
communicating, via the sequenced message bus, a new data transaction request accepted message that includes the new order identifier and the parent identifier; and
performing matching processing for the new data transaction request against contra-sided data transaction requests that are stored in the dual-sided data structure.

11. The distributed computing system of claim 1, wherein a second feature processing instance comprises instructions that, when executed by at least one hardware processor of one of the plurality of computing devices, at least one hardware processor of one of the plurality of computing devices to perform operations comprising:
based on reception of the parent suspend message or the parent state message, start a timer; and
upon expiration of the timer, generate and transmit, via the command bus and to the matching engine, a parent cancel command.

12. A method implemented in a distributed computing system that includes a plurality of computing devices that communicate by using an electronic data network, each of the plurality of computing devices including at least one hardware processor, the method comprising:
- executing a matching engine, which includes a sequencer, on a first computing device of the plurality of computing devices;
- executing, across different ones of the plurality of computing devices, a plurality of different processing instances including at least a first feature processing instance executing on at least one hardware processor of the plurality of computing devices;
- at the matching engine, maintaining a dual-sided data structure, with each side of the data structure containing at least one pending data transaction request, with at least one data transaction request being included on the first side of the dual-sided data structure, the first data transaction request being associated with a parent request that has a parent identifier;
- at the first feature processing instance, in response to detection of a triggering condition, generate and transmit, to the matching engine using a command bus, a parent suspend message that includes the parent identifier;
- at the matching engine:
  - based at least in part on reception of the parent suspend message via the command bus:
    - (a) generating and transmitting, via a sequenced message bus, a parent suspend message that includes the parent identifier;
    - (b) performing cancelation processing on any data transaction requests stored in the dual-sided data structure that are associated with the parent request; and
    - (c) generating and transmitting, via the sequenced message bus, a parent state message that indicates that the parent request has been suspended.

13. The method of claim 12, further comprising:
- at the matching engine, maintaining a parent request data structure that includes: (1) data for the association between the at least one data transaction request and the parent request; and (2) a child sequence number.

14. The method of claim 13, wherein the parent suspend message includes an expected child sequence number.

15. The method of claim 14, further comprising:
- at the matching engine:
  - validating the parent suspend message by comparing the expected child sequence number included in the parent suspend message with the child sequence number stored in the parent request data structure; and
  - updating the child sequence number stored in the parent request data structure based on validation of the parent suspend message,
- wherein (a)-(c) are additionally based on determining that the expected child sequence number is valid.

16. The method of claim 13, further comprising:
- at the matching engine, incrementing the child sequence number based on creation of a new data transaction request that is associated with the parent request.

17. The method of claim 12, wherein (a)-(c) are atomically performed at the matching engine.

18. The method of claim 12, further comprising:
- at the first feature processing instance:
  - determining that a resume condition has been satisfied; and
  - based on the determination of the resume condition, generating and transmitting, via the command bus and to the matching engine, at least one command to create a new data transaction request that is a child of the parent request,
- at the matching engine:
  - based on reception of the at least one command to create the new data transaction request, generating a new order identifier for the new data transaction request;
  - communicating, via the sequenced message bus, a new data transaction request accepted message that includes the new order identifier and the parent identifier; and
  - performing matching processing for the new data transaction request against contra-sided data transaction requests that are stored in the dual-sided data structure.

19. A non-transitory computer readable storage medium storing instructions for use with a distributed computing system, the distributed computing system including a plurality of computing devices that communicate by using an electronic data network, each of the plurality of computing devices including at least one hardware processor, the stored instructions comprising instructions that are configured to cause at least on hardware processor to perform operations comprising:
- executing a matching engine, which includes a sequencer, on a first computing device of the plurality of computing devices;
- executing, across different ones of the plurality of computing devices, a plurality of different processing instances including at least a first feature processing instance executing on at least one hardware processor of the plurality of computing devices;
- maintaining, at the matching engine, a dual-sided data structure, with each side of the data structure containing at least one pending data transaction request, with at least one data transaction request being included on the first side of the dual-sided data structure, the first data transaction request being associated with a parent request that has a parent identifier;
- in response to detection of a triggering condition at the first feature processing instance, generating and transmitting, to the matching engine using a command bus, a parent suspend message that includes the parent identifier;
- at the matching engine:
  - based at least in part on reception of the parent suspend message via the command bus:
    - (a) generating and transmitting, via a sequenced message bus, a parent suspend message that includes the parent identifier;
    - (b) performing cancelation processing on any data transaction requests stored in the dual-sided data structure that are associated with the parent request; and
    - (c) generating and transmitting, via the sequenced message bus, a parent state message that indicates that the parent request has been suspended.

20. The non-transitory computer readable storage medium of claim 19, wherein the performed operations further comprise:
- at the matching engine:
  - maintaining a parent request data structure that includes: (1) data for the association between the at least one data transaction request and the parent request; and (2) a child sequence number;

validating the parent suspend message by comparing an expected child sequence number included in the parent suspend message with the child sequence number stored in the parent request data structure; and updating the child sequence number stored in the parent request data structure based on validation of the parent suspend message, wherein (a)-(c) are additionally based on determining that the expected child sequence number is valid.

* * * * *